(12) United States Patent
Kozyrev et al.

(10) Patent No.: US 11,688,948 B2
(45) Date of Patent: Jun. 27, 2023

(54) LOW-BAND UWB CONFORMAL ANTENNA

(71) Applicant: Rockwell Collins, Inc., Cedar Rapids, IA (US)

(72) Inventors: Alexander B. Kozyrev, Iowa City, IA (US); James B. West, Cedar Rapids, IA (US); Jiwon L Moran, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 69 days.

(21) Appl. No.: 17/225,458

(22) Filed: Apr. 8, 2021

(65) Prior Publication Data

US 2022/0328970 A1    Oct. 13, 2022

(51) Int. Cl.
    *H01Q 11/10*     (2006.01)
    *H04B 1/18*     (2006.01)
    *H01Q 3/34*     (2006.01)

(52) U.S. Cl.
CPC .............. *H01Q 11/10* (2013.01); *H01Q 3/34* (2013.01); *H04B 1/18* (2013.01)

(58) Field of Classification Search
CPC . H01Q 1/28; H01Q 3/34; H01Q 11/10; H01Q 11/105; H01Q 21/24; H04B 1/18
See application file for complete search history.

(56) References Cited

U.S. PATENT DOCUMENTS

| | | | | |
|---|---|---|---|---|
| 3,911,442 A | * | 10/1975 | Hatch | H01Q 21/0031 343/754 |
| 3,921,176 A | | 11/1975 | Shanafelt et al. | |
| 5,274,390 A | | 12/1993 | Breakall | |
| 5,648,786 A | * | 7/1997 | Chung | H01Q 1/28 343/770 |
| 6,703,975 B1 | * | 3/2004 | Freeman | H01Q 1/286 343/705 |
| 6,768,456 B1 | * | 7/2004 | Lalezari | H01Q 21/205 342/373 |
| 9,831,559 B2 | | 11/2017 | West et al. | |
| 10,056,922 B1 | * | 8/2018 | Tsvelykh | H01P 1/20345 |
| 10,892,796 B1 | * | 1/2021 | West | H04B 1/405 |
| 2005/0012655 A1 | * | 1/2005 | Lalezari | H01Q 25/02 342/368 |
| 2009/0102705 A1 | * | 4/2009 | Obermeyer | G01S 13/9029 343/705 |
| 2014/0097986 A1 | * | 4/2014 | Xue | H01Q 3/34 342/372 |
| 2014/0210486 A1 | * | 7/2014 | Dijkstra | H01Q 21/08 324/612 |
| 2019/0393921 A1 | | 12/2019 | Sengupta et al. | |
| 2020/0259259 A1 | | 8/2020 | Pfeiffer et al. | |

\* cited by examiner

*Primary Examiner* — Ab Salam Alkassim, Jr.
*Assistant Examiner* — Leah Rosenberg
(74) *Attorney, Agent, or Firm* — Suiter Swantz pc llo

(57) ABSTRACT

A log periodic antenna system with conformal radiating elements includes a feed layer with phase shifters and filters associated with each radiating element. The filters may be low-pass or band-pass filters. The log periodic conformal radiating elements produce superior gain and bandwidth, and reduce directionality of the antenna at least along a radial axis of the antenna. Sets of conformal radiating elements are disposed on opposing sides of the antenna, or periodically around the surface of the antenna, to further reduce directionality.

18 Claims, 70 Drawing Sheets

LOW-BAND UWB CONFORMAL ANTENNA

BACKGROUND

Conformal, aerodynamic low-band open communications systems (0.7 GHz-2.0 GHz) are not scalable in gain and beamwidth. Existing wraparound antennas, low profile/aerodynamic antennas for curved fuselage platforms are very low in realized gain and narrow in instantaneous bandwidth; typically, only a few percent of instantaneous bandwidth is practically achievable. It would be desirable to have a conformal antenna system with greater than 0 dBi gain and less than −10 dB insertion loss over a 3:1 instantaneous bandwidth, and that is ultra-wide band in operation. A log periodic array of low profile microstrip patches is attractive; however, microstrip radiating elements have multiple higher-order resonances which limit the bandwidth of the entire array as simultaneous excitation of these modes is responsible for the distortion of radiation pattern at higher frequencies.

Existing conformal radiating elements that utilize desirable material parameters and dimensions are generally too narrow-band relative to the needed a 3:1 instantaneous bandwidth. Individual ultra-wide band radiating elements used in ½-wave sampled arrays are typically too thick for aerodynamic application, particularly for UHF-S band frequencies. Broad-band UHF-S band radiating elements are physically thick and challenging to implement.

SUMMARY

In one aspect, embodiments of the inventive concepts disclosed herein are directed to a log periodic antenna system with conformal radiating elements. A feed layer includes phase shifters and filters associated with each radiating element. The filters may be low-pass or band-pass filters. The log periodic conformal radiating elements produce superior gain and bandwidth, and reduce directionality of the antenna at least along a radial axis of the antenna.

In a further aspect, sets of conformal radiating elements are disposed on opposing sides of the antenna, or periodically around the surface of the antenna, to further increase omnidirectional coverage.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
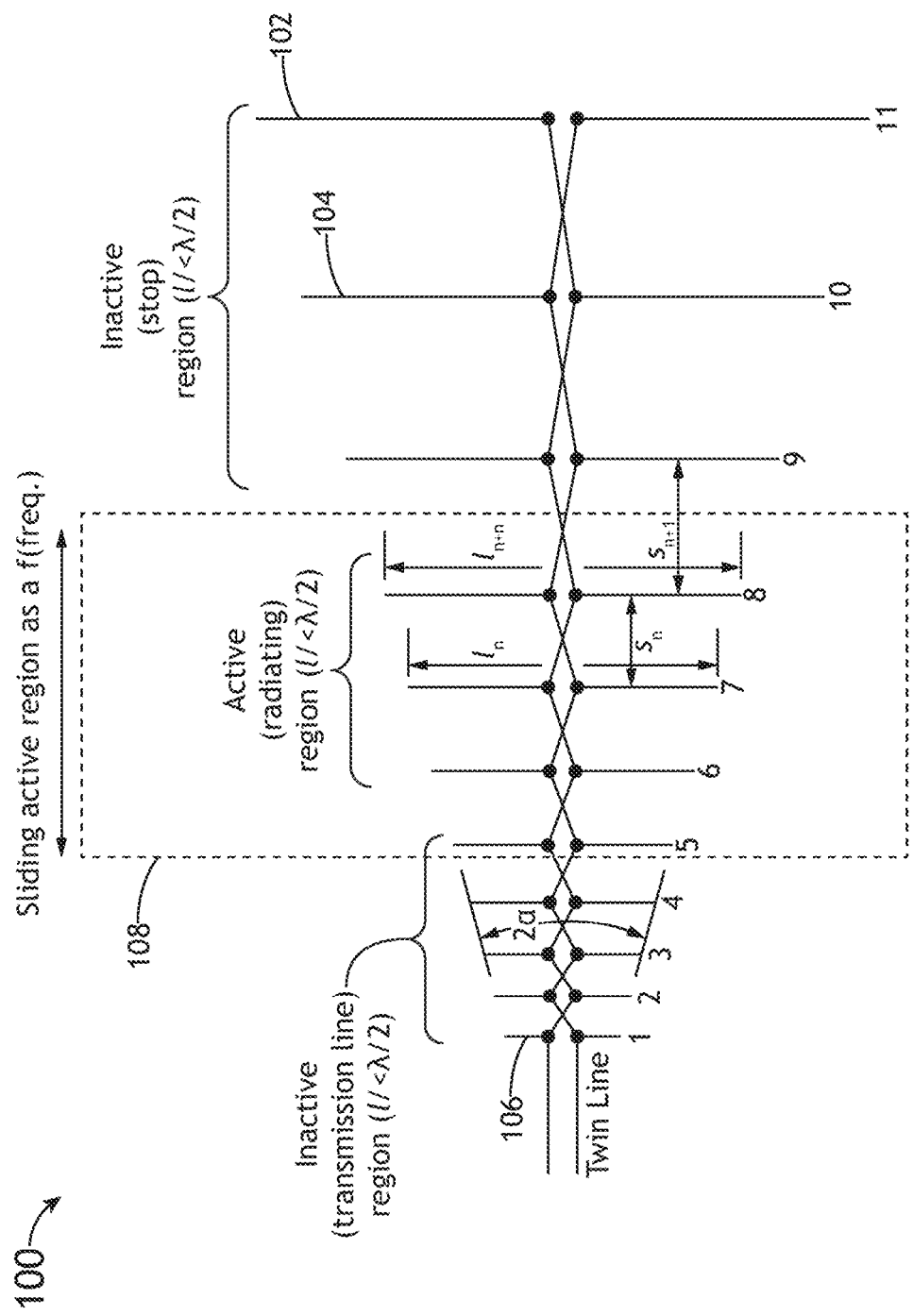
FIG. 1 is a schematic view of an exemplary embodiment of a log periodic antenna.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a log periodic antenna system with conformal radiating elements. A feed layer includes phase shifters and filters associated with each radiating element. The filters may be low-pass or band-pass filters. The log periodic conformal radiating elements produce superior gain and bandwidth, and reduce directionality of the antenna at least along a radial axis of the antenna. In a further aspect, sets of conformal radiating elements are disposed on opposing sides of the antenna, or periodically around the surface of the antenna, to further reduce directionality.

Referring to FIG. 1, a schematic view of a log periodic antenna 100 is shown. Log periodic antennas 100 comprise a plurality of radiating elements 102, 104, 106, each configured to transmit and/or receive signals in a particular frequency range. Traditionally, the log periodic antenna 100 has an active region 108 defined by the current frequency of the signal being transmitted and/or received. Each radiating element 102, 104, 106 is associated with one of a plurality of driving elements, each driving element configured for operation in a distinct sub-band of the entire operating range of the log periodic antenna 100 corresponding to an active region 108. The entire log periodic antenna 100 may be actively driven.

Existing passive feed is realized as a crisscrossed feed to add 180° phase shift between radiating elements 102, 104, 106. Adjacent radiating elements 102, 104, 106 are out of phase to minimize parasitic interaction. Larger and longer radiating elements 102, 104, 106 radiating with an inter-element phase shift may produce and end-fire radiation pattern.

Figure 2:
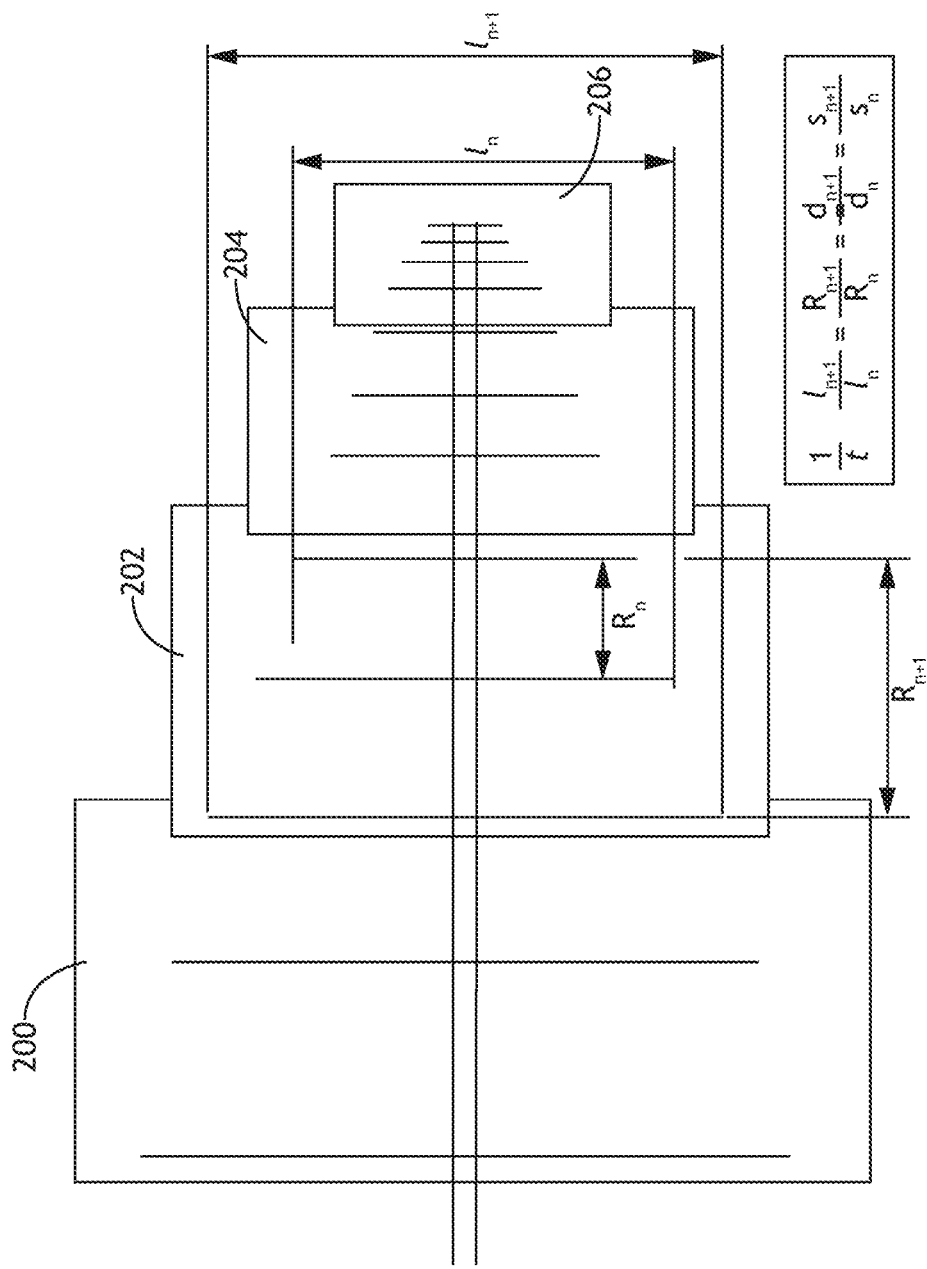
FIG. 2 is a schematic view of an exemplary embodiment of a log periodic antenna.

Referring to FIG. 2, a schematic view of a log periodic antenna is shown. Sub-segments 200, 202, 204, 206 of the array may be driven coherently or non-coherently; coherent for tridiagonal ultra-wide band directional comm, etc., modes; non-coherent for broadband white noise jammer application.

Stepped artificial magnetic conductors may be used to realize an extremely low profile conformal ultra-wide band array with horizontal polarization. Each stepped artificial magnetic conductor may be tuned for individual radiating elements or sub-segments 200, 202, 204, 206, each corresponding to a frequency range.

Figure 3:
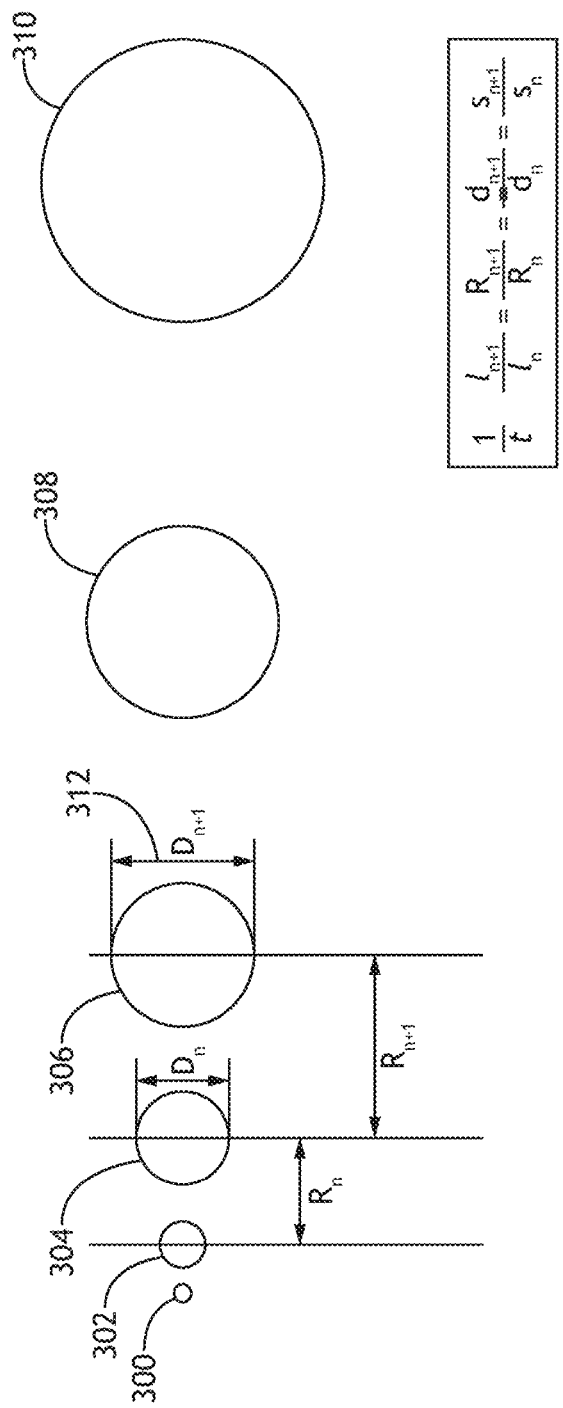
FIG. 3 is an exemplary embodiment of log periodic radiating elements.

Referring to FIG. 3, an exemplary log periodic radiating elements 300, 302, 304, 306, 308, 310 is shown. The radiating elements 300, 302, 304, 306, 308, 310 each have a diameter 312 defined by the intended frequency band in which the specific radiating element 300, 302, 304, 306, 308, 310 is configured to operate. Furthermore, the radiating elements 300, 302, 304, 306, 308, 310 are separated by an inter-element separation 314 ($R_n$) defined by the operating bands of the antenna and a scaling factor τ such that:

$$\frac{1}{\tau} = \frac{l_{n+1}}{l_n} = \frac{R_{n+1}}{R_n} = \frac{d_{n+1}}{d_n} = \frac{s_{n+1}}{s_n}$$

Log periodic arrays may be Implemented with many types of radiating elements 300, 302, 304, 306, 308, 310, including dipoles, patches, slots, helical, spirals, horns, dipoles above ground, dielectric resonator antennas (DRA), etc. Both normal and end-fire radiation is possible. The elements can be of any polarization state. Additionally, sub-band polarization diversity can be implemented for sub-channel isolation as needed; for example, one of two adjacent sub-bands (channels) may be used for information transmission, while the other sub-band (channel) may be used for noise jamming.

Conformal log periodic creates many challenges that the concepts herein address. It is desirable to use very low-profile conformal antenna elements for air vehicle aerodynamic and low visual signature considerations. Such low profile microstrip patch type antennas typically have a very narrow uni-model instantaneous bandwidth. This narrow bandwidth creates two problems: 1) many elements are required to cover the total instantaneous bandwidth required, and 2) narrow band printed antenna elements suffer from a series of undesirable parasitic electromagnetic modes, each of which can initiate spurious radiation in an undesirable main. The key inventive concept of this disclosure as described is a novel passive or active antenna log periodic feed typology that extinguishes these undesirable modes through frequency selectivity, while at the same time adjusting the element-by-element amplitude and phase for optimal UWB radiation performance.

Linear array topologies allow for degrees in freedom in gain and beamwidth along the axis of the array while retaining a desirable wide field-of-view or beamwidth in the plane perpendicular to the fuselage.

Figure 4:
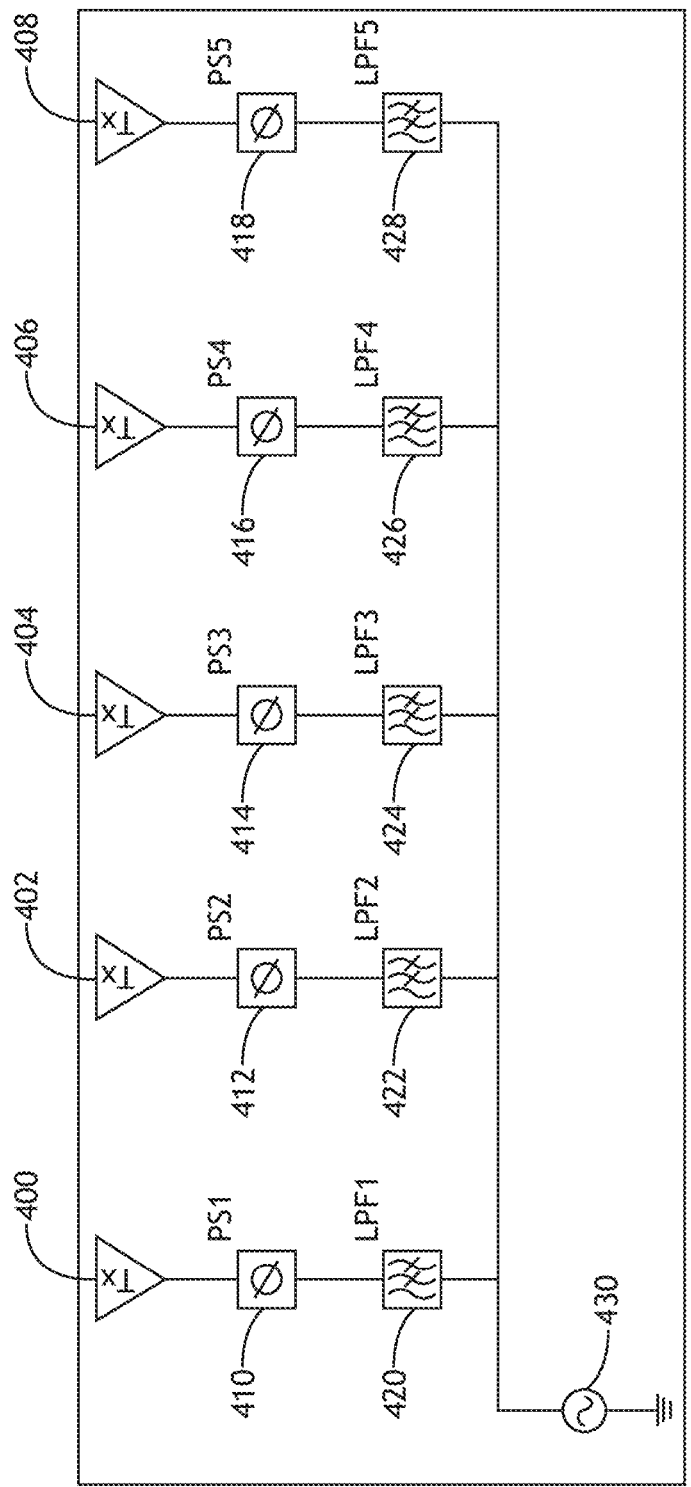
FIG. 4 shows a diagram of feed layer circuitry for a log periodic antenna according to an exemplary embodiment.

Referring to FIG. 4, a diagram of feed layer circuitry for a log periodic antenna according to an exemplary embodiment is shown. The feed layer is configured to drive a plurality of log periodic radiating elements 400, 402, 404, 406, 408. Each radiating element 400, 402, 404, 406, 408 is associated with a unique phase shifter 410, 412, 414, 416, 418 and a unique filter 420, 422, 424, 426, 428. Each phase shifter 410, 412, 414, 416, 418 and filter 420, 422, 424, 426, 428 may be physically or electronically tuned according to the corresponding log periodic radiating element 400, 402, 404, 406, 408. The phase shifters 410, 412, 414, 416, 418 steer the resulting beam as necessary.

In at least one embodiment, the filters 420, 422, 424, 426, 428 may be low-pass filters. Low-pass filters 420, 422, 424, 426, 428 are used to isolate a fundamental mode and suppress unwanted higher-order modes. The cut-off frequency of low-pass filters 420, 422, 424, 426, 428 increases along the array.

In at least one embodiment, the filters 420, 422, 424, 426, 428 may be band-pass filters. Band-pass filters 420, 422, 424, 426, 428 are used to isolate a desired mode and suppress unwanted higher-order modes. The pass-band of band-pass filters 420, 422, 424, 426, 428 shifts toward higher frequencies along the array.

Inter element tau scaled spacing is relaxed to reduce mutual coupling between the radiating elements 400, 402, 404, 406, 408. The feed layer enables frequency dependent amplitude tapering in the resulting signals. Amplitude tapering can be implemented with low-pass filters to reduce direct injection and reception of spurious signals. The frequency selective nature of the feed layer suppresses spatially coupled higher order modes between the tau scaled radiating elements 400, 402, 404, 406, 408.

In at least one embodiment, the feed layer comprises a complex multi-port, matched filter structure that may be implemented as either a passive or active RFIC op-amp-like topologies to realize the active filters.

Figure 5A:
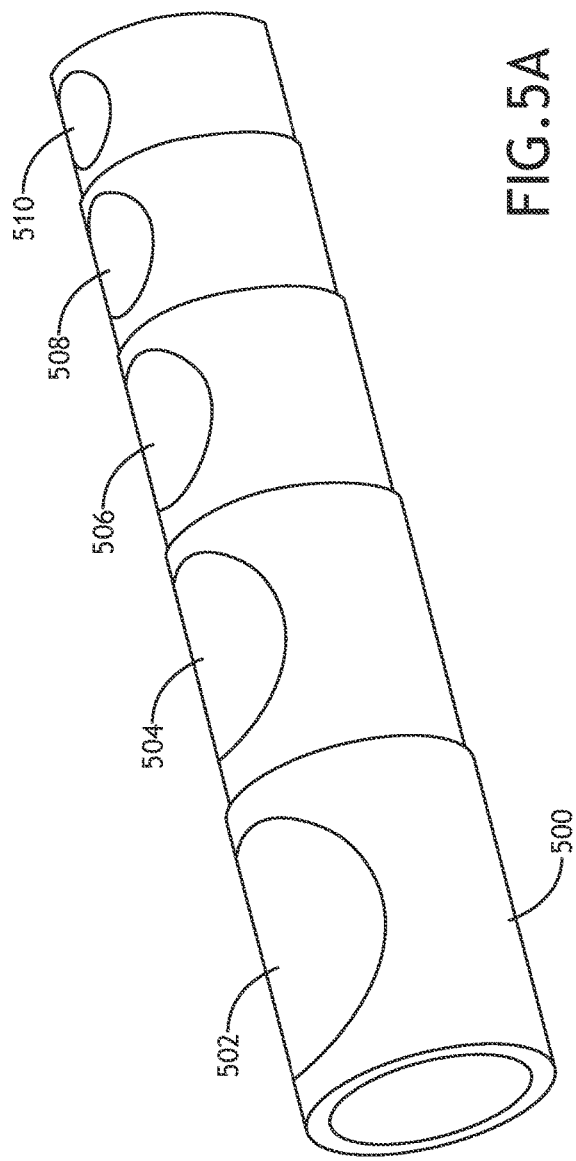
FIG. 5A shows a perspective view of an antenna with conformal log periodic radiating elements according to an exemplary embodiment.
Figure 5B:
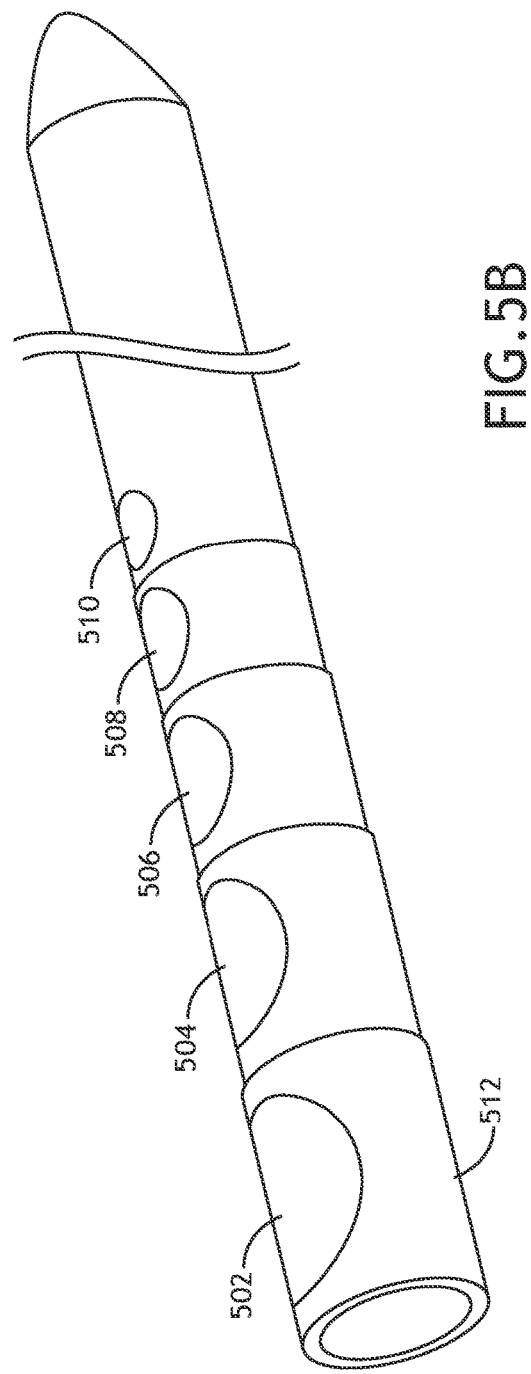
FIG. 5B shows a perspective view of an antenna with conformal log periodic radiating elements according to an exemplary embodiment.

Referring to FIGS. 5A and 5B, perspective views of antennas 500, 512 with conformal log periodic radiating elements 502, 504, 506, 508, 510 according to an exemplary embodiment are shown. The radiating elements 502, 504, 506, 508, 510 generally conform to the shape of the antenna 500, 512 structure. In at least one embodiment, the antenna 500, 512 structure may comprise diminishing radii associated with each radiating element 502, 504, 506, 508, 510. Conformal log periodic radiating elements 502, 504, 506, 508, 510 provide an antenna structure with higher gain and bandwidth than available with existing low-profile antennas. Furthermore, the conformal radiating elements 502, 504, 506, 508, 510 produce a broader field of view than existing log periodic arrays.

It may be appreciated that exemplary antennas 500 shown include truncated fuselage tubes (FIG. 5A) and elongated fuselage tubes (FIG. 5B), but other embodiments are envisioned with a log periodic array of radiating elements 502, 504, 506, 508, 510 driven by a feed layer architecture described herein. In one exemplary embodiment of an array of five radiating elements 502, 504, 506, 508, 510, a first radiating element 502 is approximately 16.38 cm in diameter and is fed by a pin approximately 2.799 cm from its shortest edge; a second radiating element 504 is approximately 12.85 cm in diameter, is fed by a pin approximately 2.195 cm from its shortest edge, and the distance from the feed pin to the previous feed pin is approximately 19.51; a third radiating element 506 is approximately 10.08 cm in diameter, is fed by a pin approximately 1.722 cm from its shortest edge, and the distance from the feed pin to the previous feed pin is approximately 14.925; a fourth radiating element 508 is approximately 7.9 cm in diameter, is fed by a pin approximately 1.351 cm from its shortest edge, and the distance from the feed pin to the previous feed pin is approximately 11.71; and a fifth radiating element 510 is approximately 6.2 cm in diameter, is fed by a pin approximately 1.059 cm from its shortest edge, and the distance from the feed pin to the previous feed pin is approximately 9.19. Such an antenna 500 may have a bandwidth of 0.7 GHz-2 GHz, greater than 5.0 dBi gain, and less than −10 dB return loss.

It may be appreciated that excitation patterns applied to radiating elements 502, 504, 506, 508, 510 disposed on a truncated antenna 500 may produce substantially similar radiation patterns as compared to elongated antennas 512. In at least one embodiment, excitation patterns may be adjusted depending on platform type.

Figure 6:
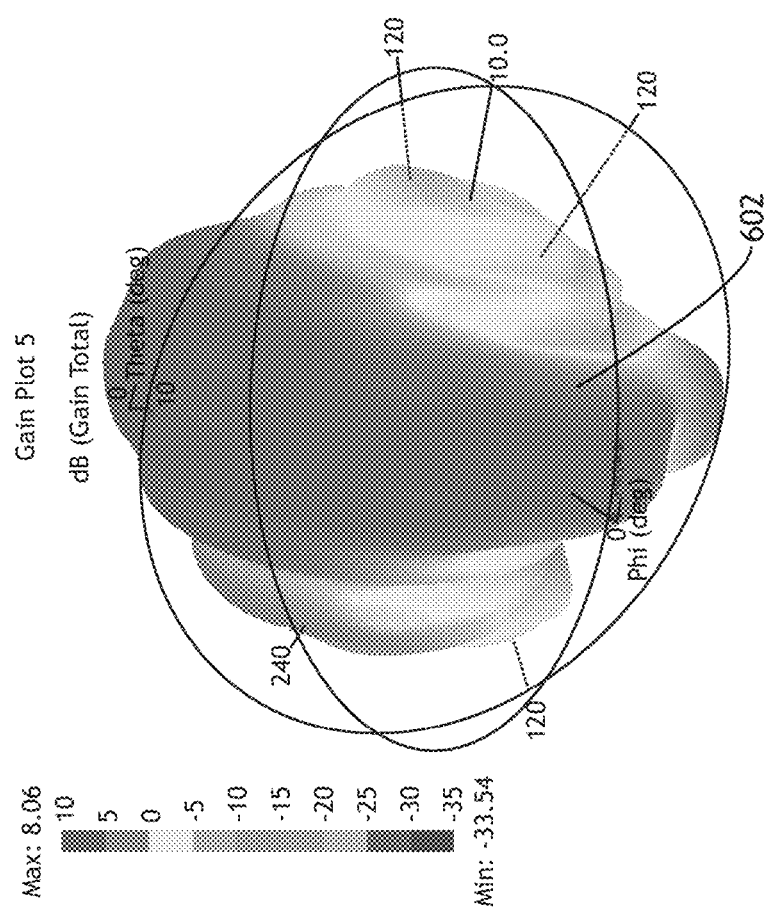
FIG. 6 shows a perspective view of an antenna according to an exemplary embodiment and a radiation pattern.
Figure 6:
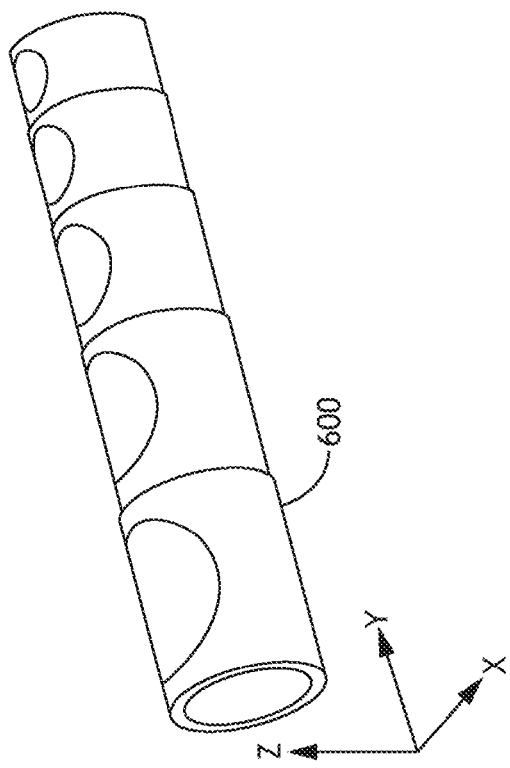
Figure 7A:
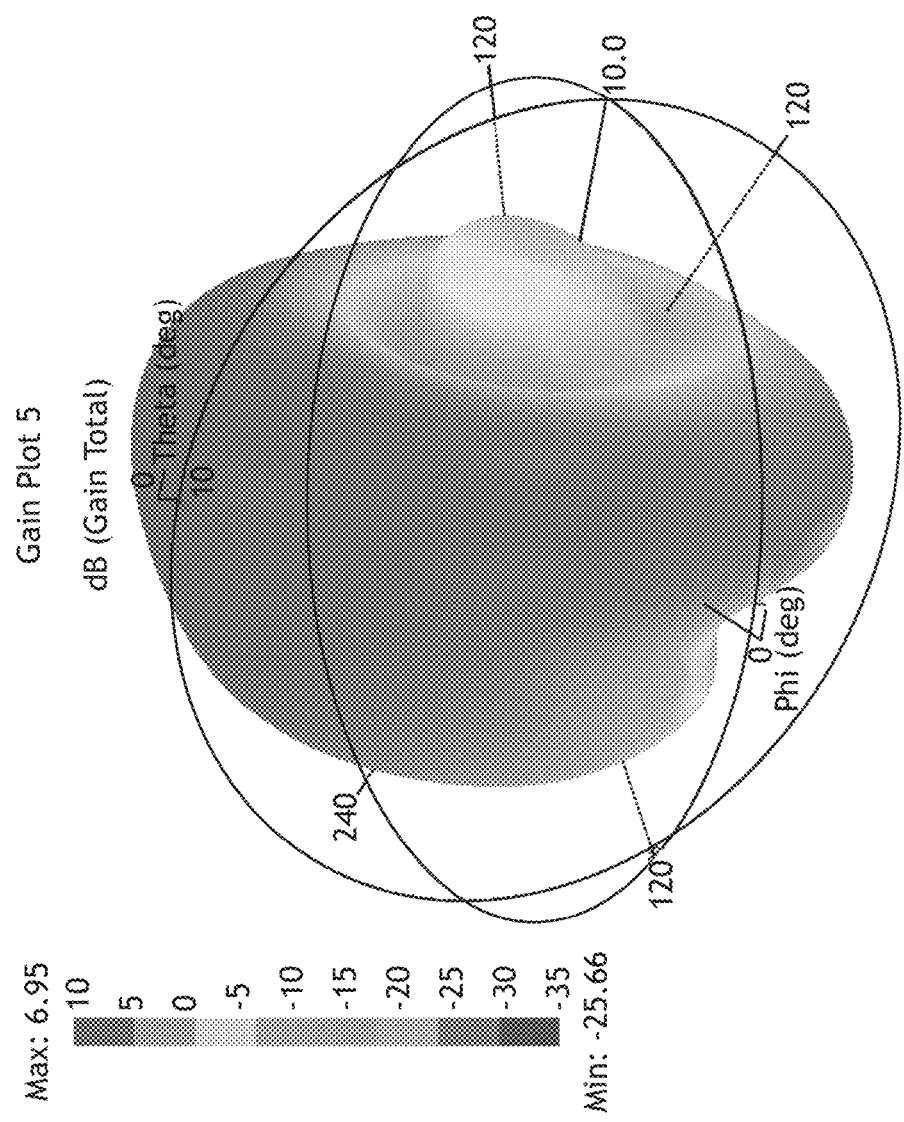
FIG. 7A shows a 3D radiation pattern produced by a log periodic antenna according to an exemplary embodiment.
Figure 7B:
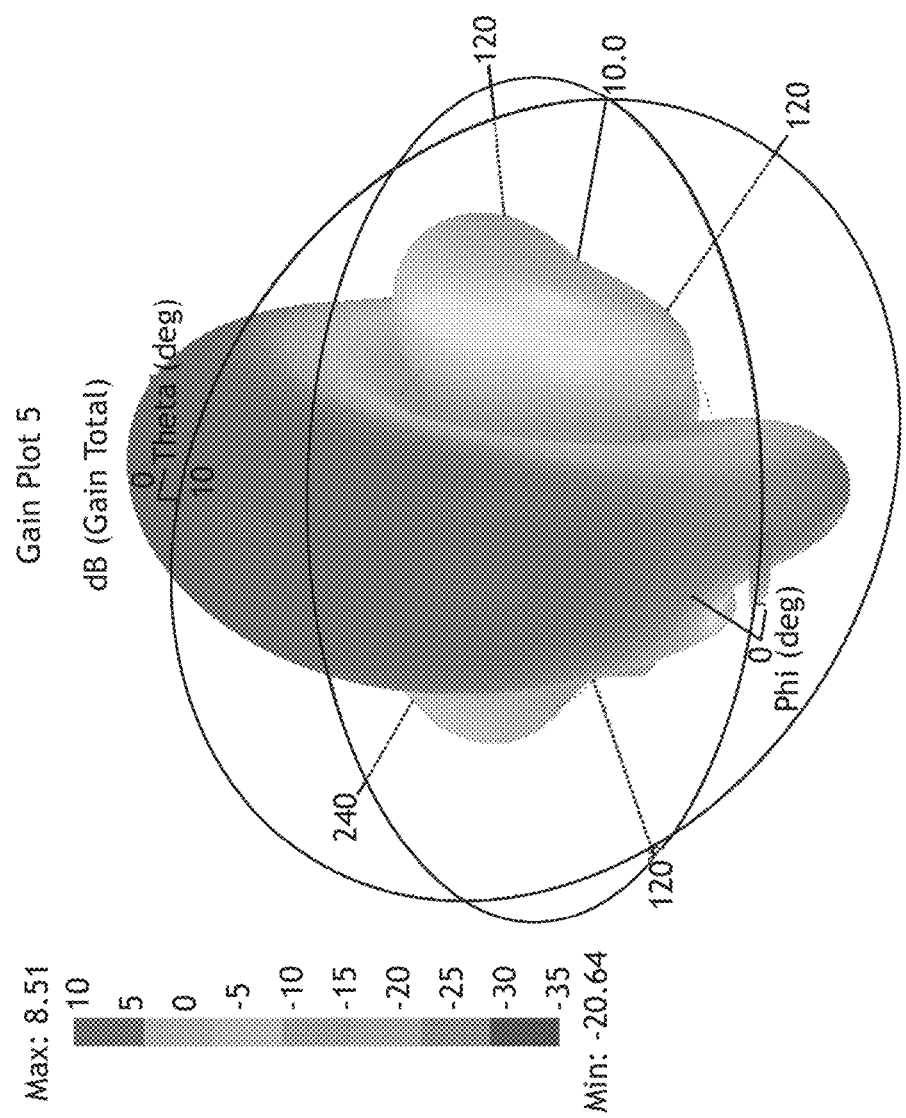
FIG. 7B shows a 3D radiation pattern produced by a log periodic antenna according to an exemplary embodiment.
Figure 7C:
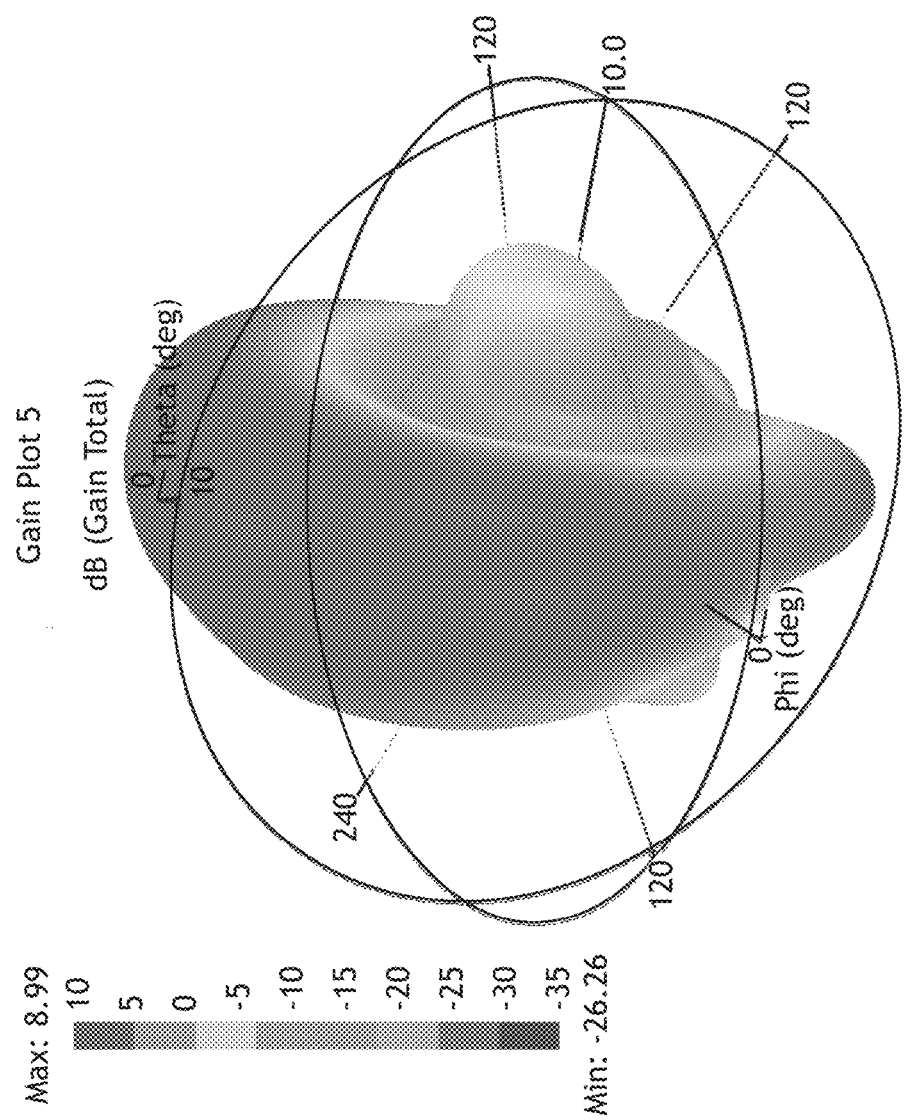
FIG. 7C shows a 3D radiation pattern produced by a log periodic antenna according to an exemplary embodiment.
Figure 7D:
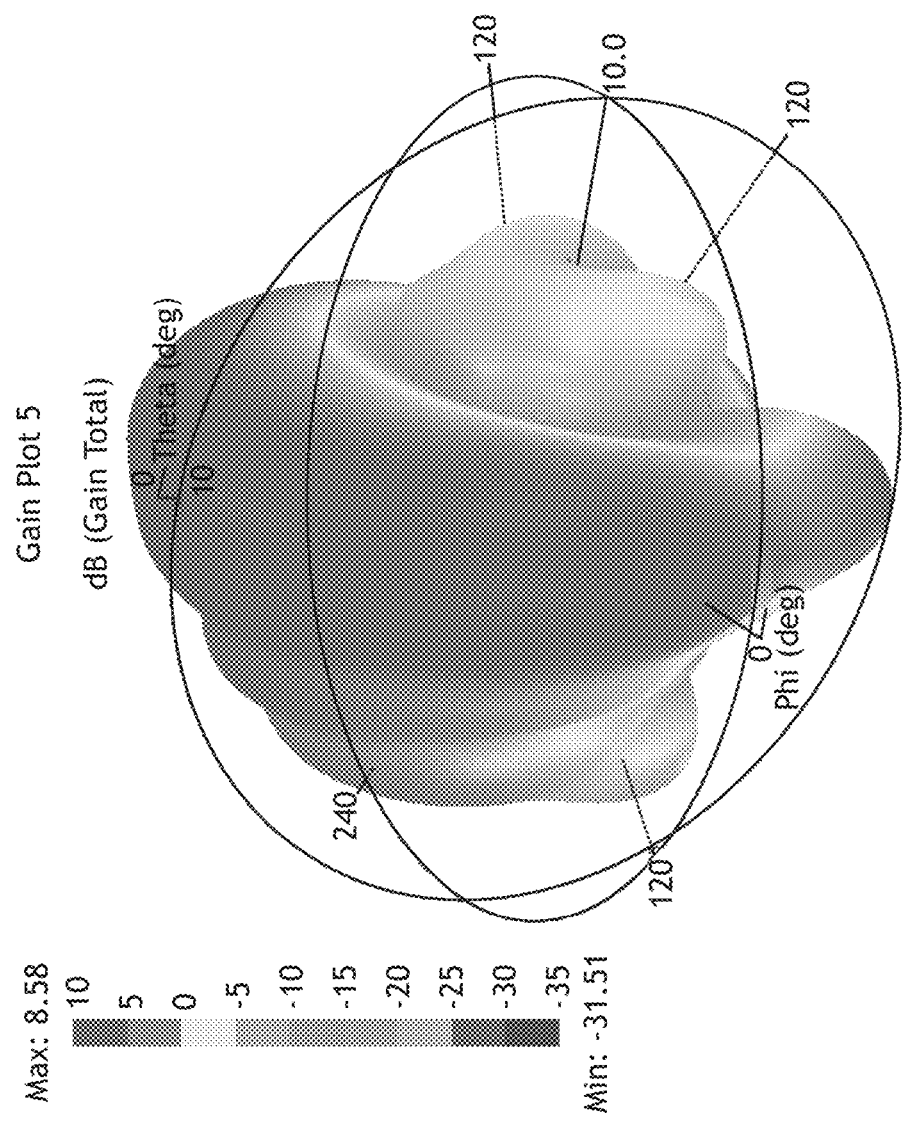
FIG. 7D shows a 3D radiation pattern produced by a log periodic antenna according to an exemplary embodiment.
Figure 7E:
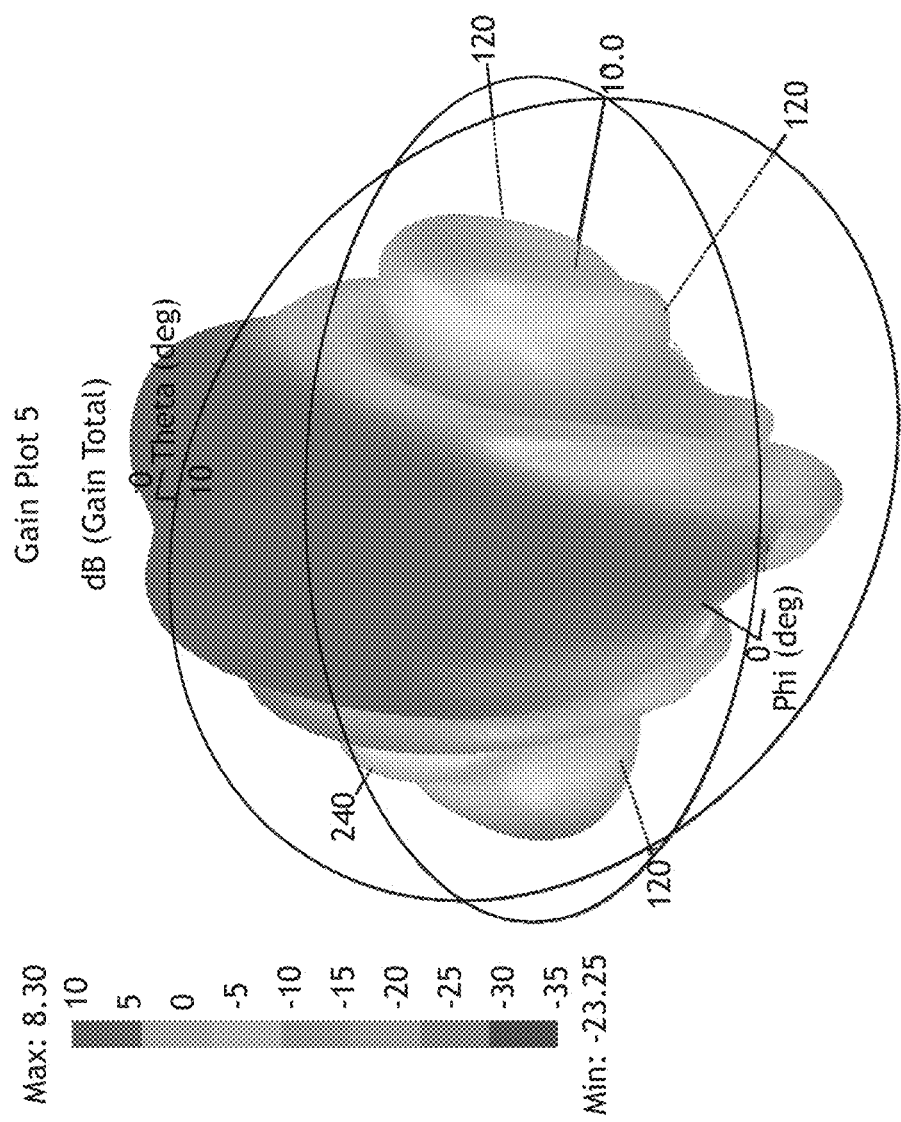
FIG. 7E shows a 3D radiation pattern produced by a log periodic antenna according to an exemplary embodiment.
Figure 7F:
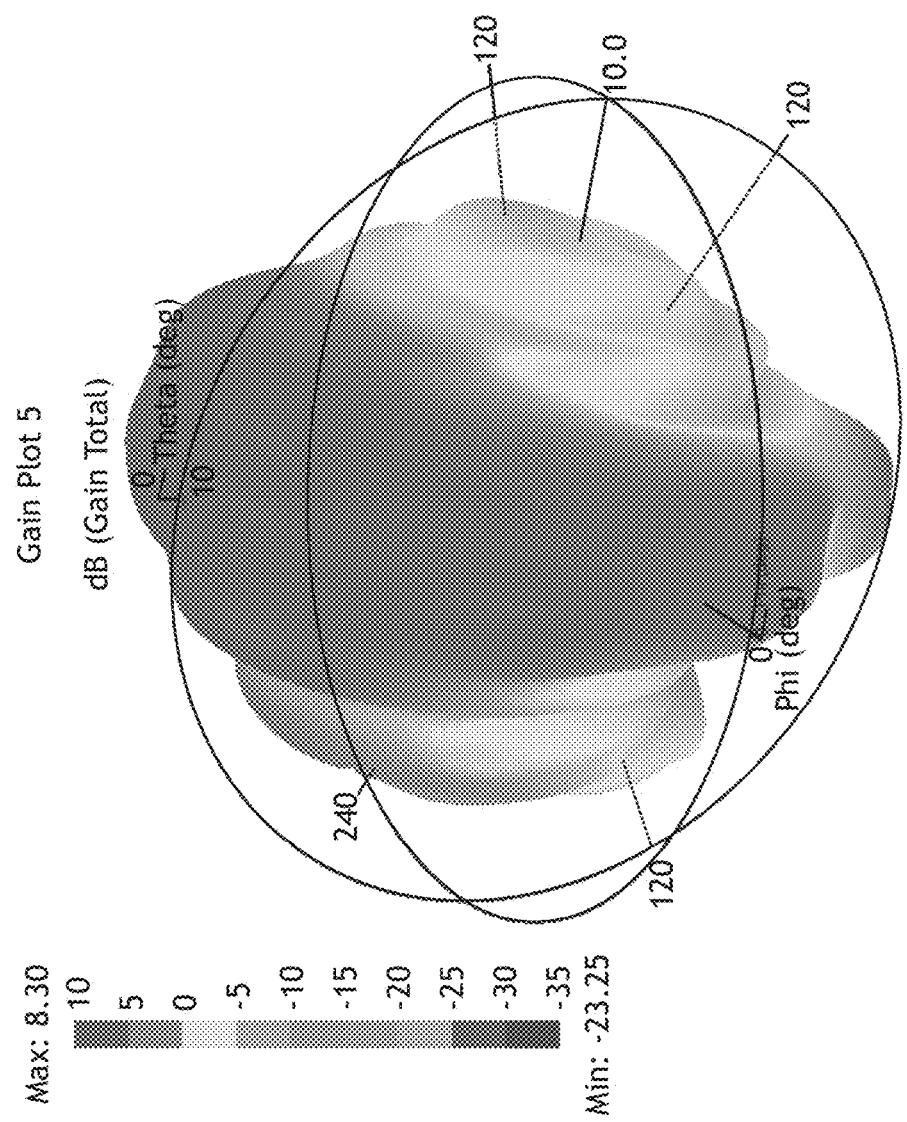
FIG. 7F shows a 3D radiation pattern produced by a log periodic antenna according to an exemplary embodiment.
Figure 8A:
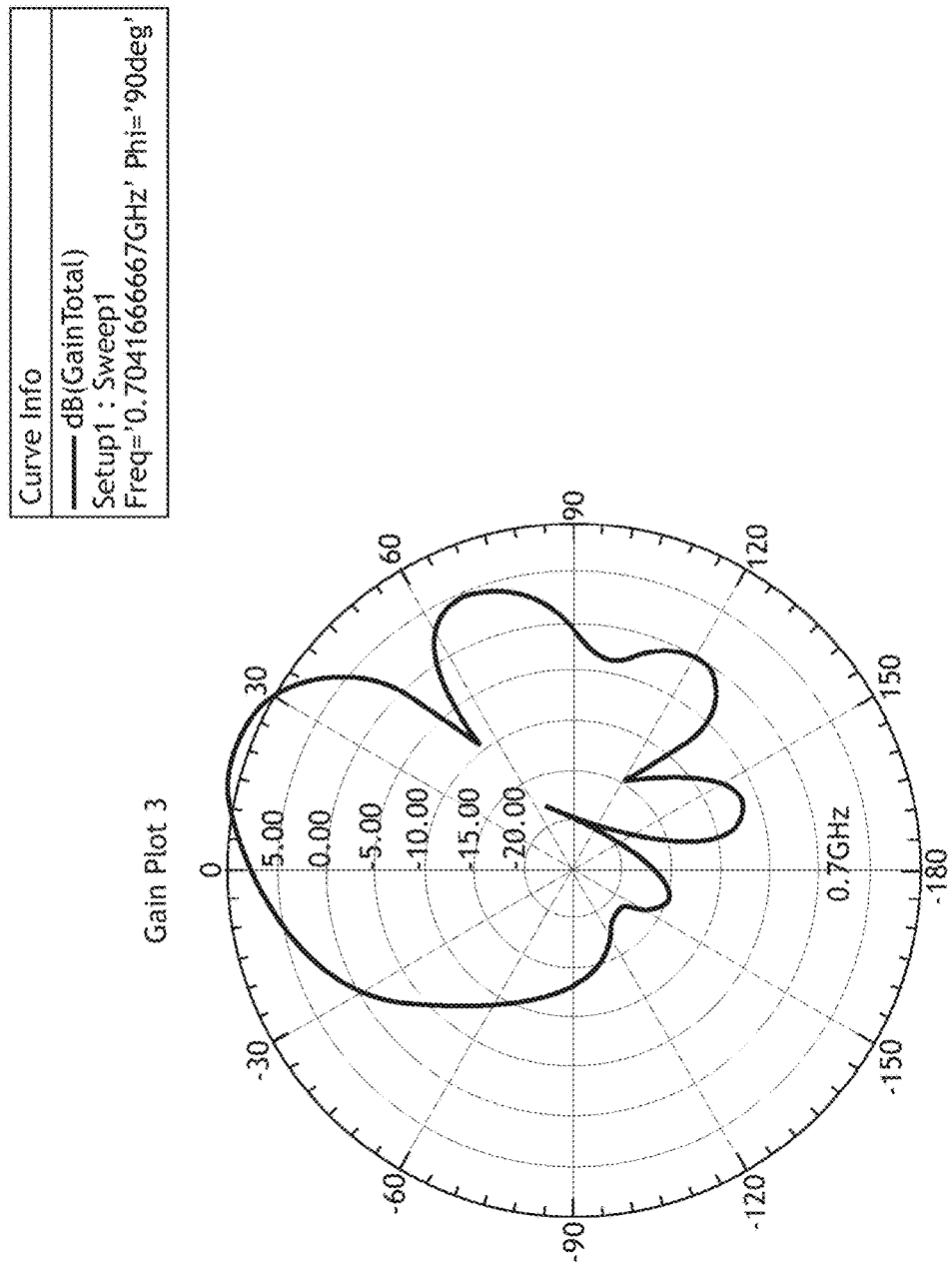
FIG. 8A shows a $\Phi=90°$ (Elevation cut) radiation pattern produced by a log periodic antenna according to an exemplary embodiment.
Figure 8B:
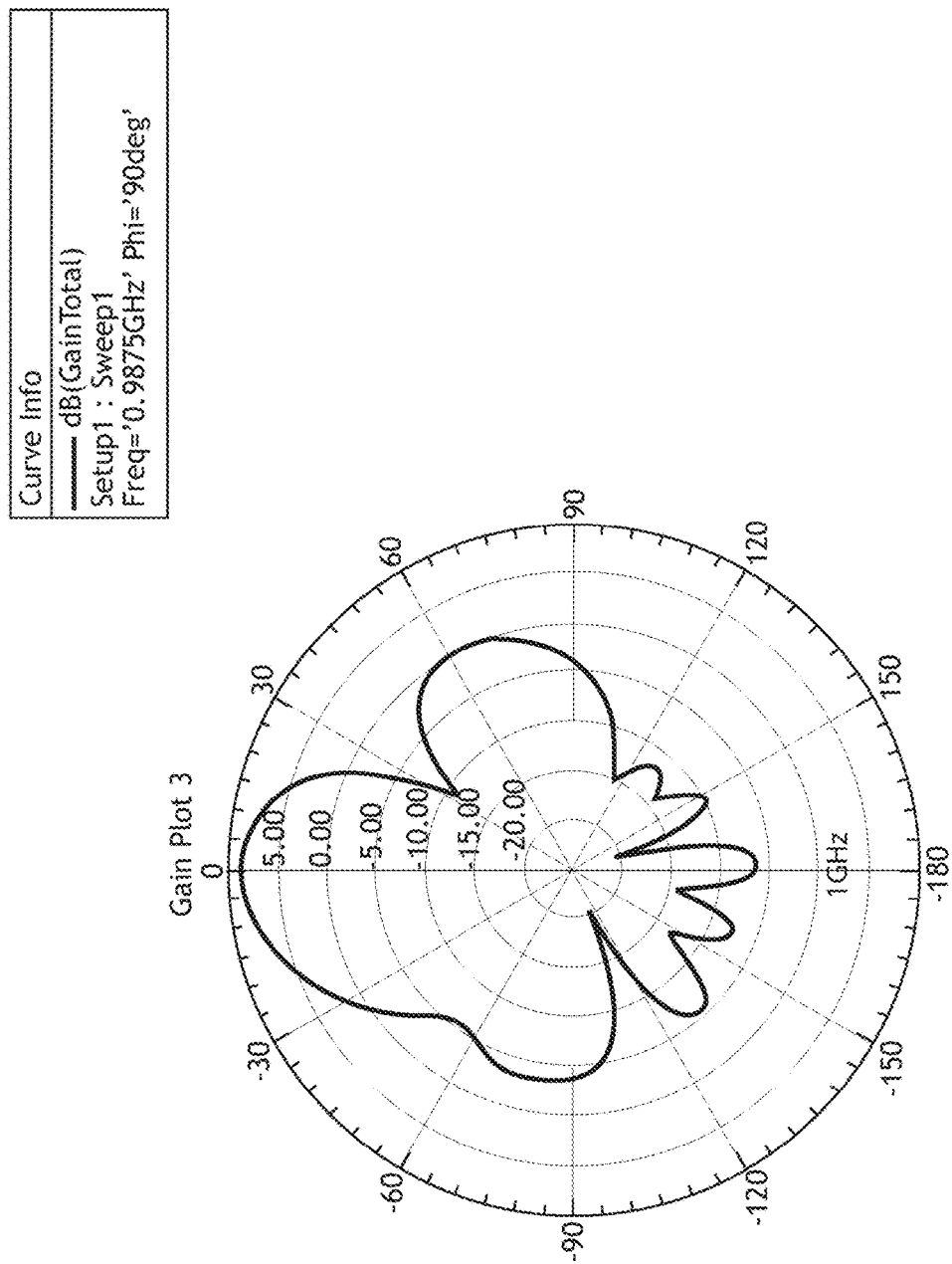
FIG. 8B shows a $\Phi=90°$ cut radiation pattern produced by a log periodic antenna according to an exemplary embodiment.
Figure 8C:
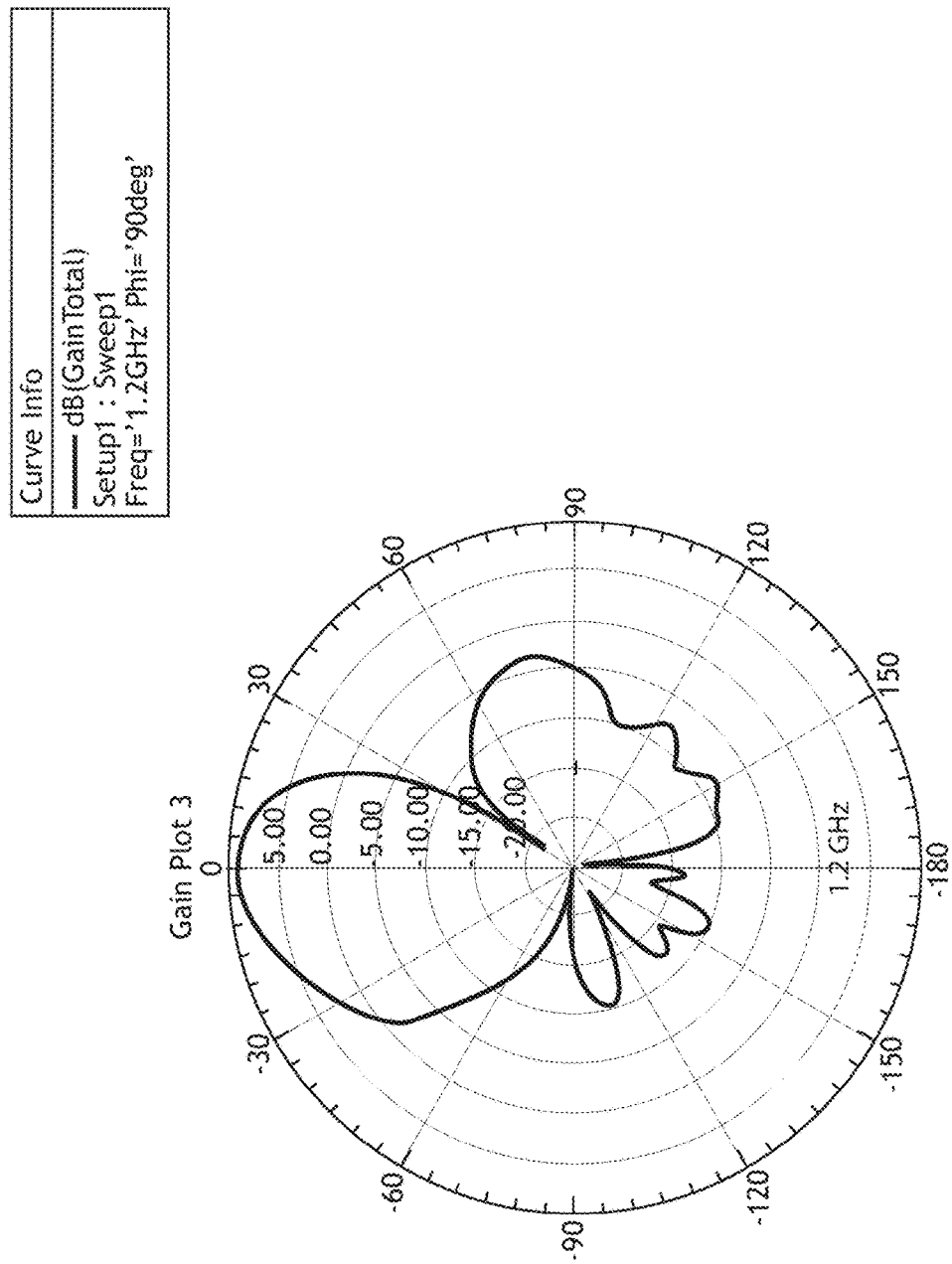
FIG. 8C shows a $\Phi=90°$ cut radiation pattern produced by a log periodic antenna according to an exemplary embodiment.
Figure 8D:
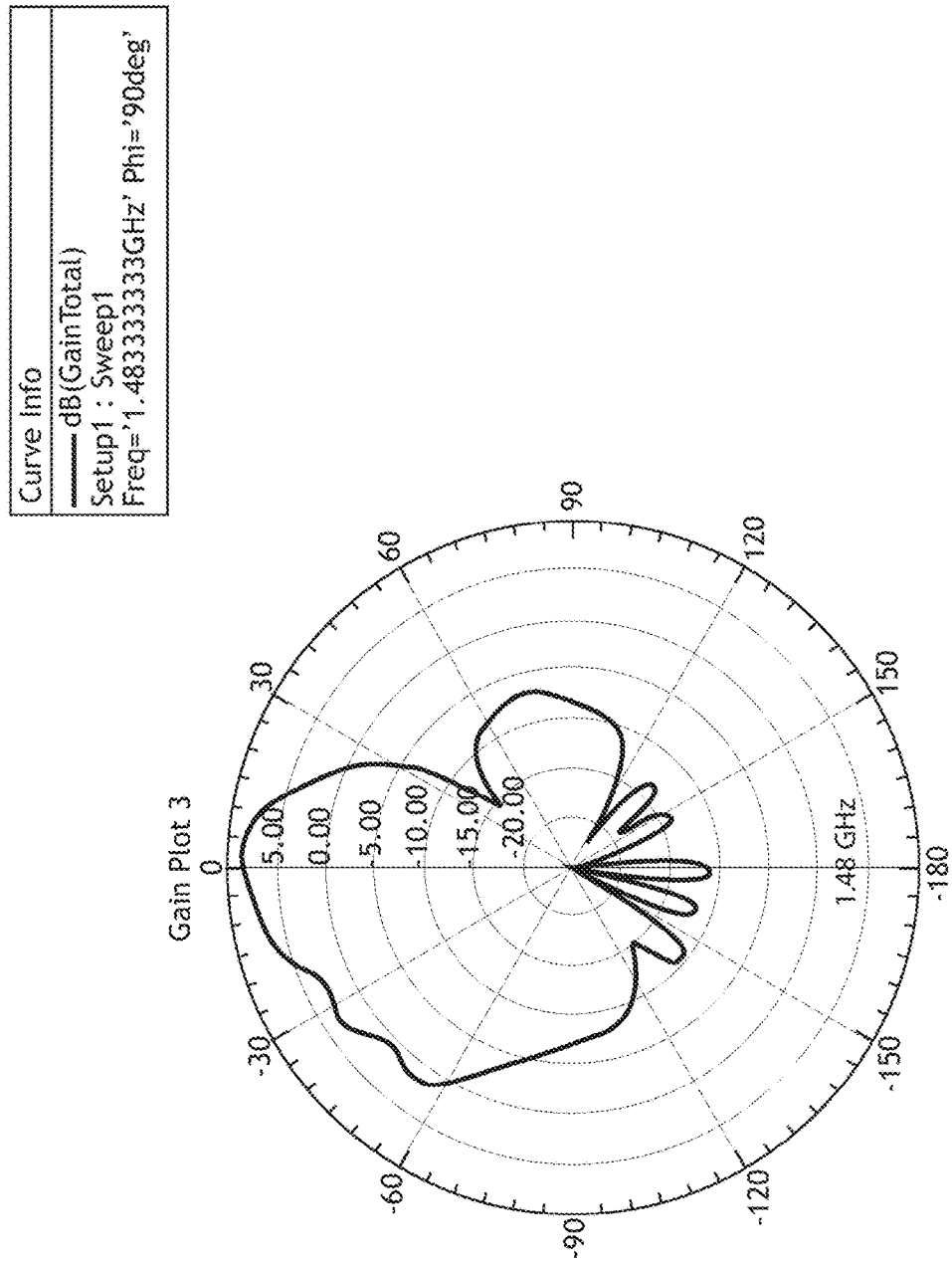
FIG. 8D shows a $\Phi=90°$ cut radiation pattern produced by a log periodic antenna according to an exemplary embodiment.
Figure 8E:
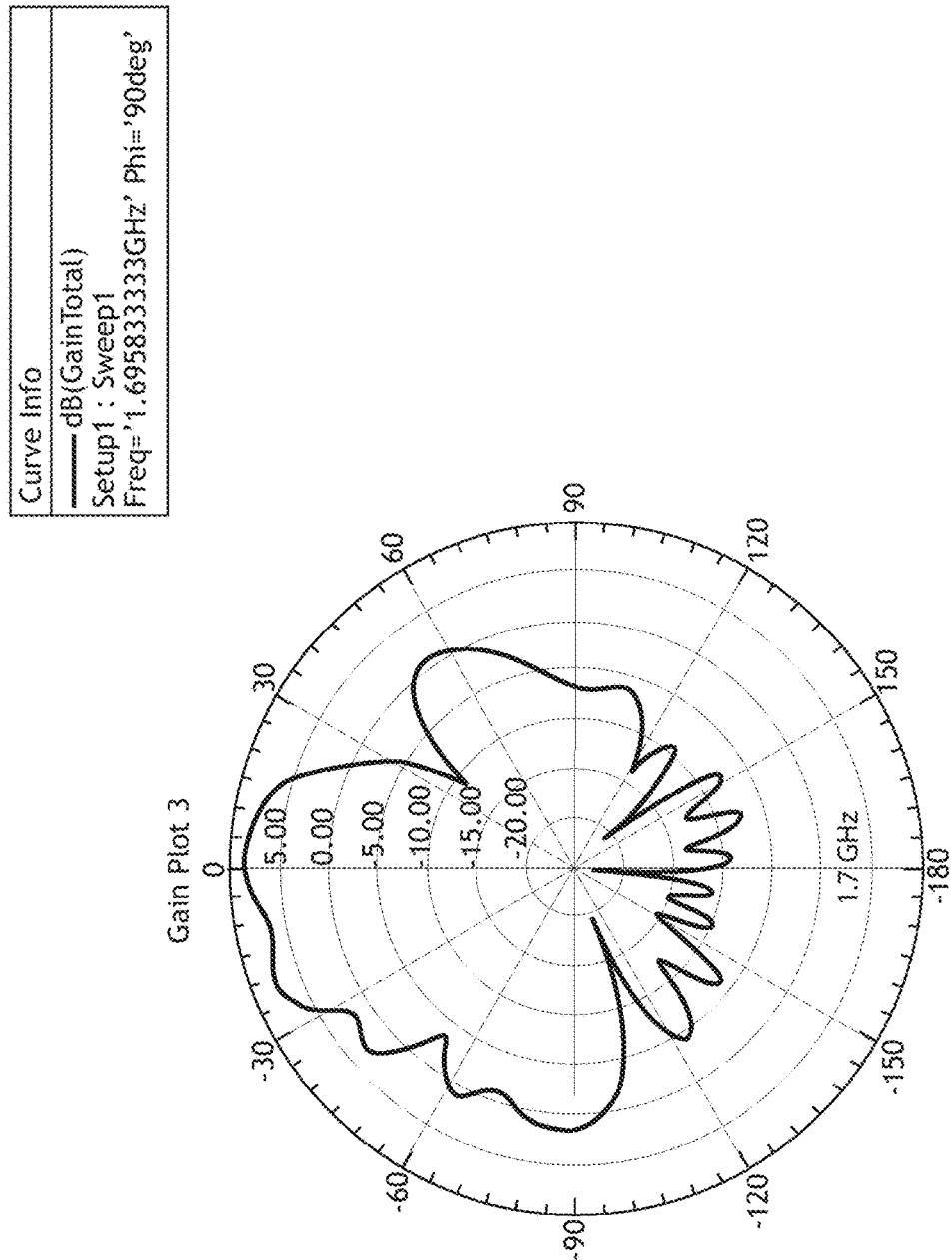
FIG. 8E shows a $\Phi=90°$ cut radiation pattern produced by a log periodic antenna according to an exemplary embodiment.
Figure 8F:
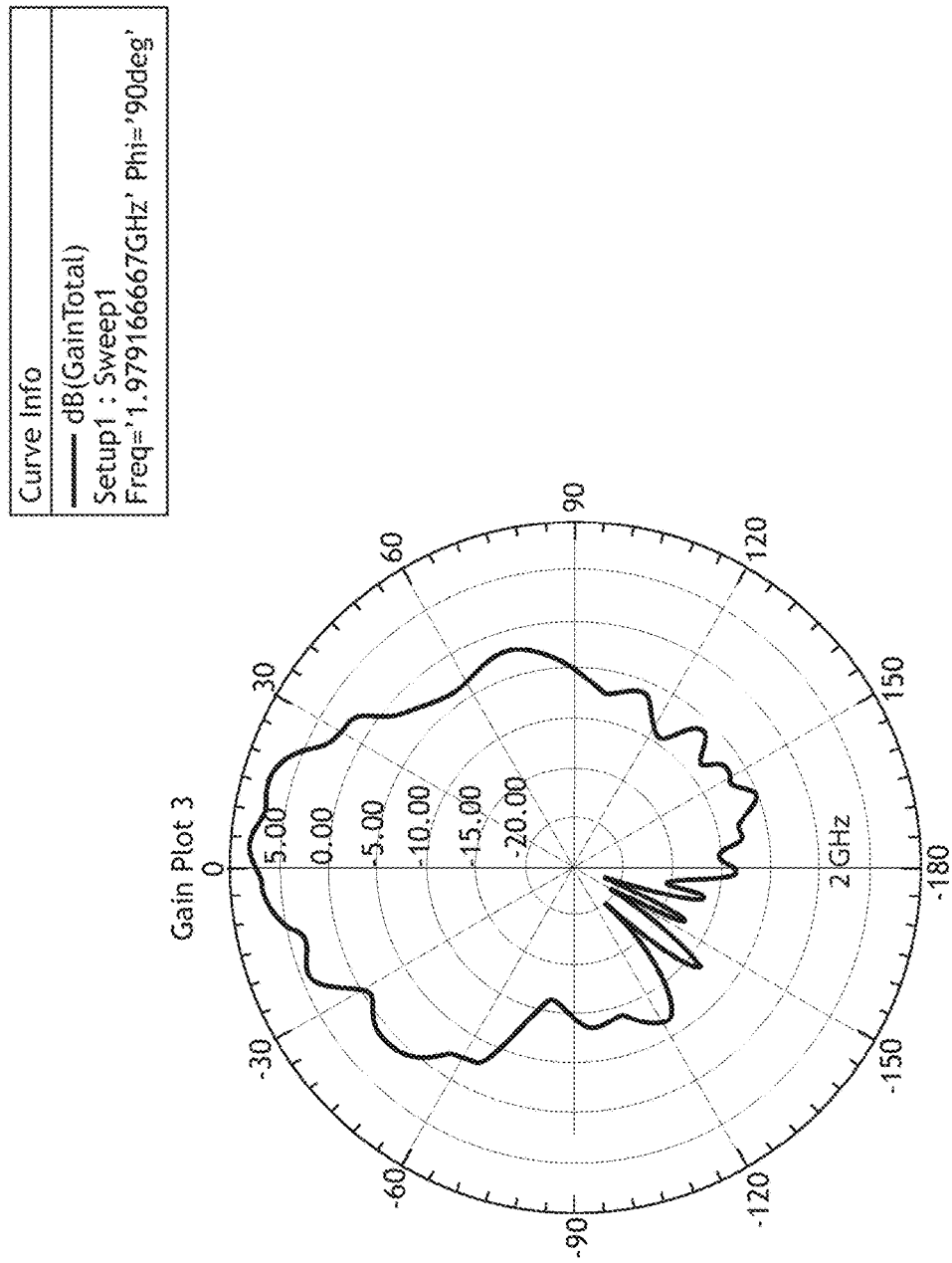
FIG. 8F shows a $\Phi=90°$ cut radiation pattern produced by a log periodic antenna according to an exemplary embodiment.
Figure 9A:
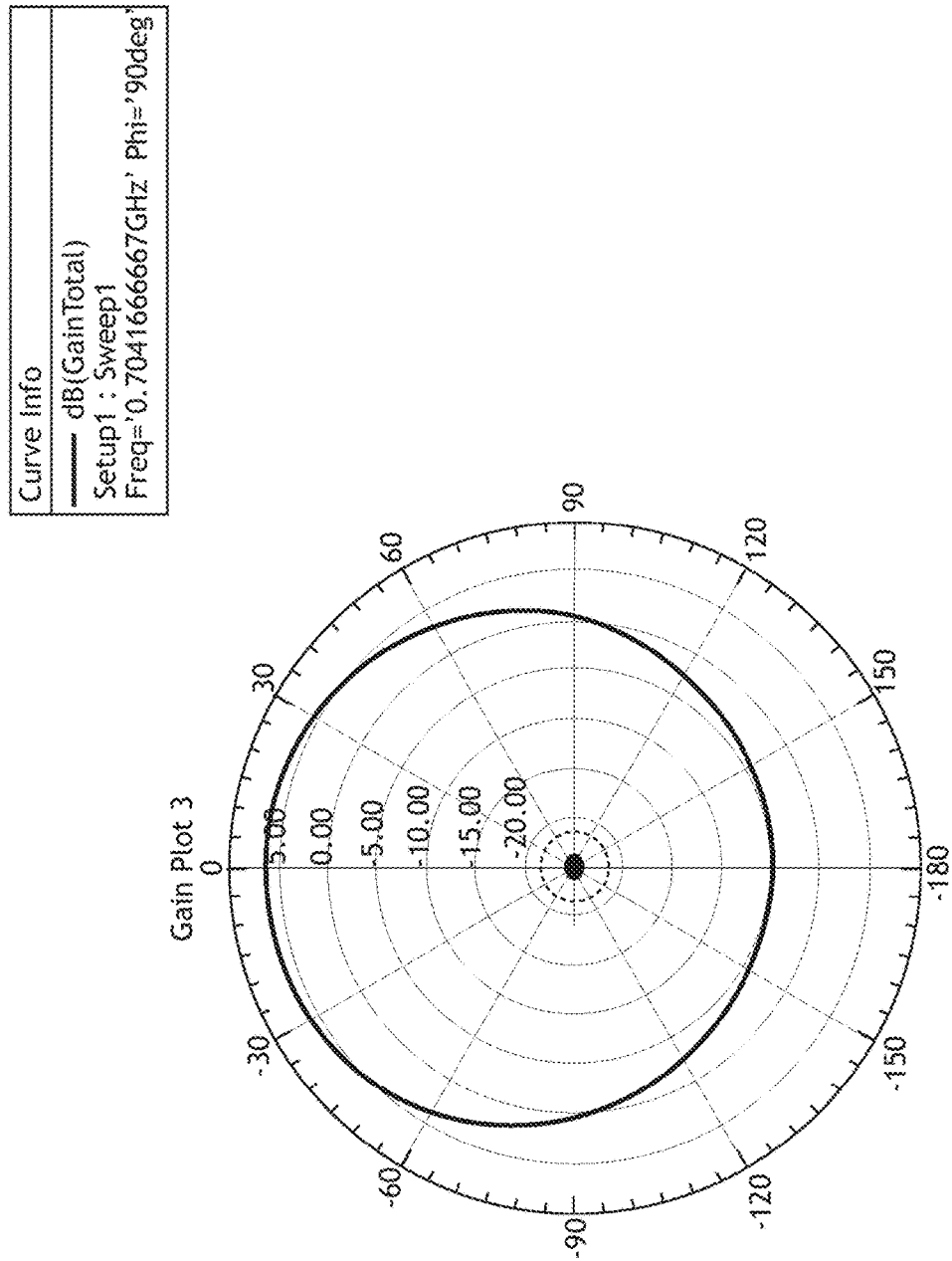
FIG. 9A shows a $\Phi=0°$ (Roll cut) radiation pattern produced by a log periodic antenna according to an exemplary embodiment.
Figure 9B:
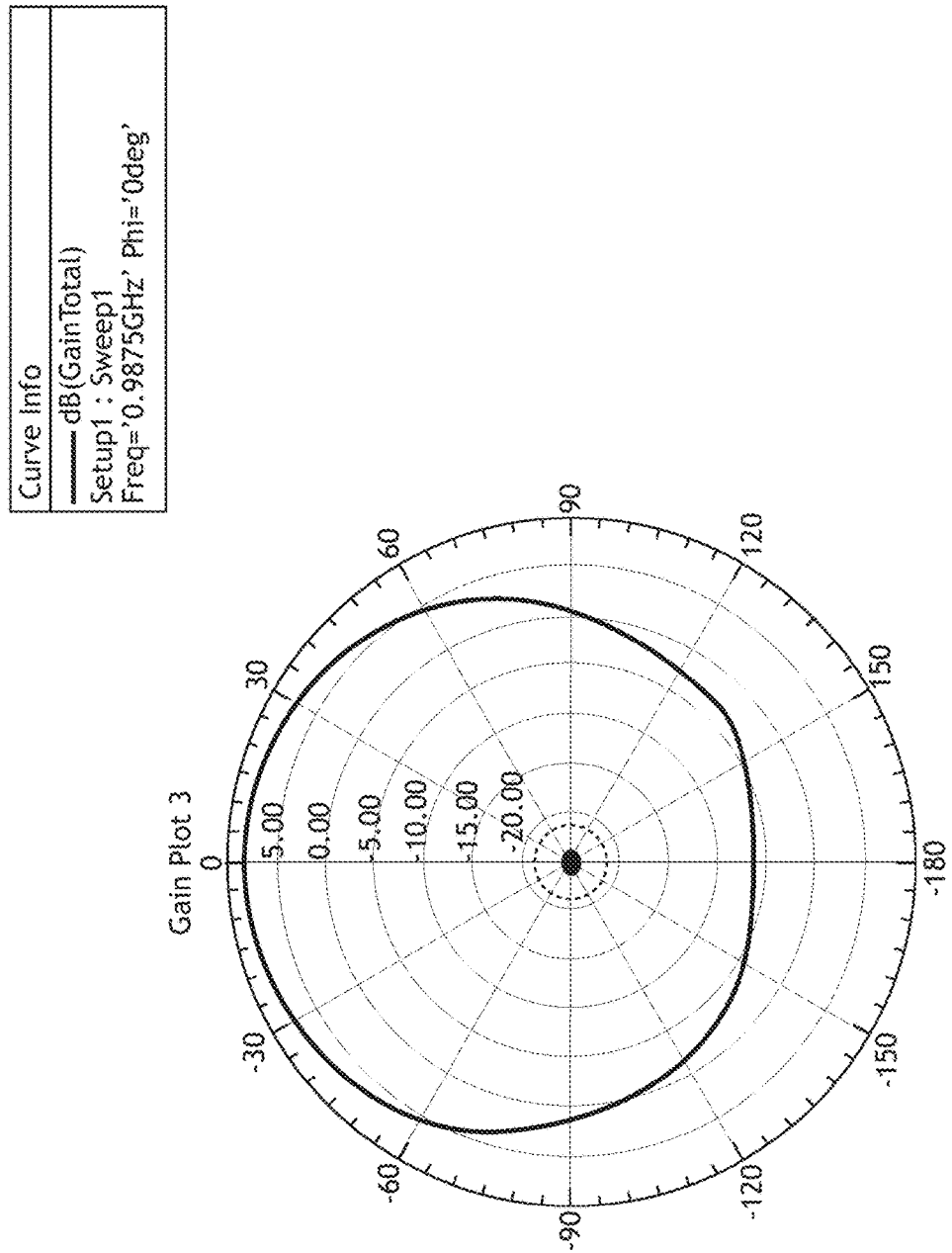
FIG. 9B shows a $\Phi=0°$ cut radiation pattern produced by a log periodic antenna according to an exemplary embodiment.
Figure 9C:
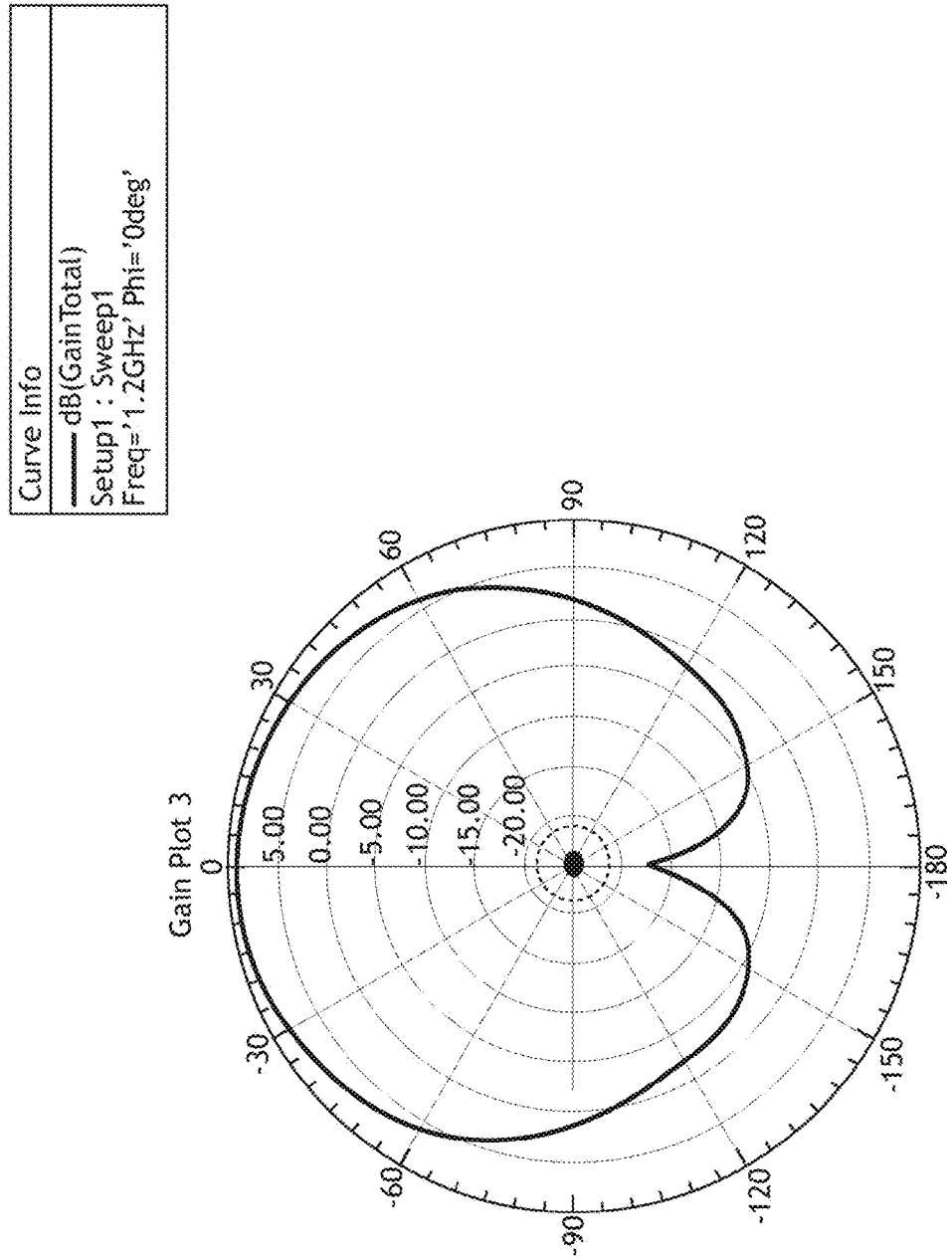
FIG. 9C shows a $\Phi=0°$ cut radiation pattern produced by a log periodic antenna according to an exemplary embodiment.
Figure 9D:
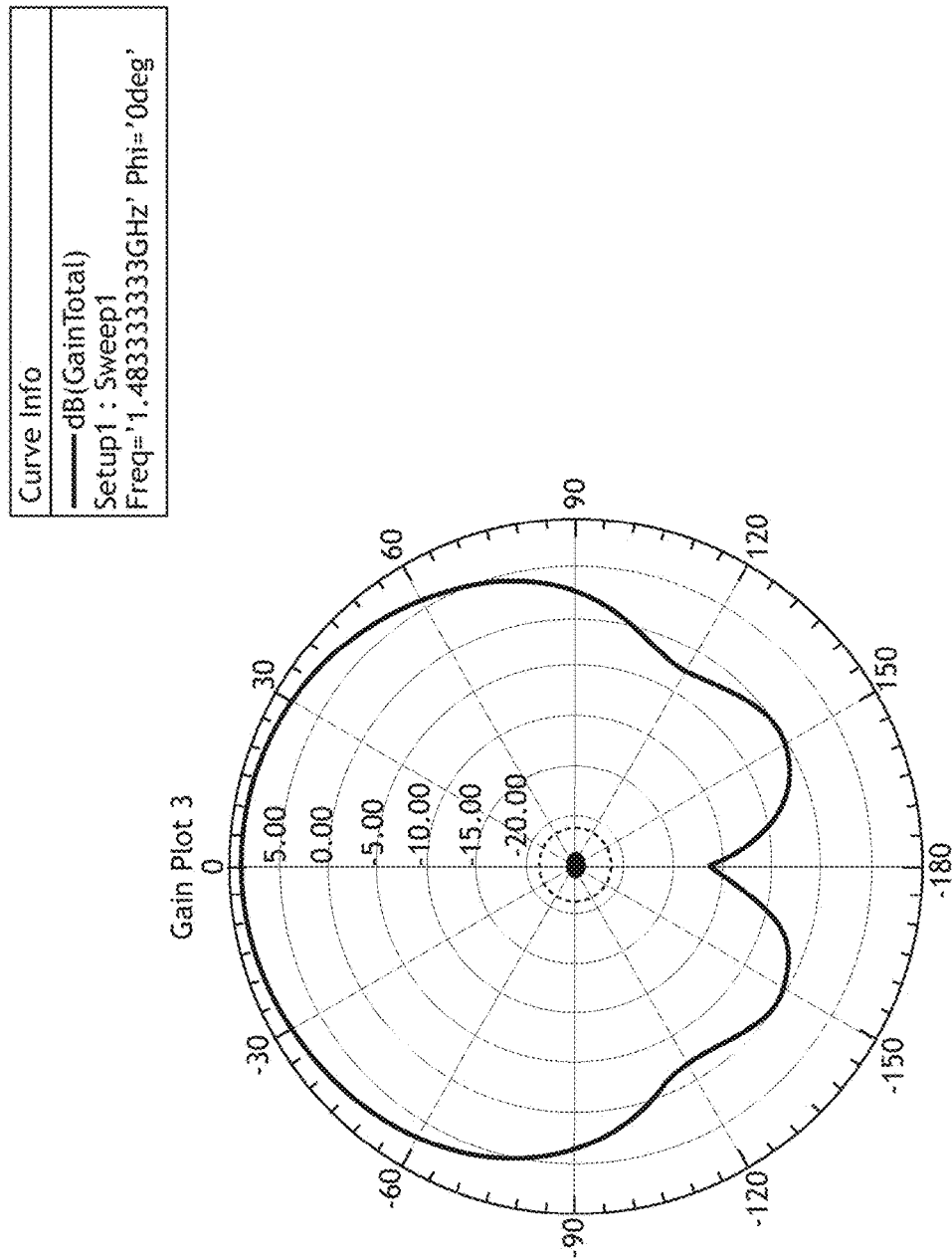
FIG. 9D shows a $\Phi=0°$ cut radiation pattern produced by a log periodic antenna according to an exemplary embodiment.
Figure 9E:
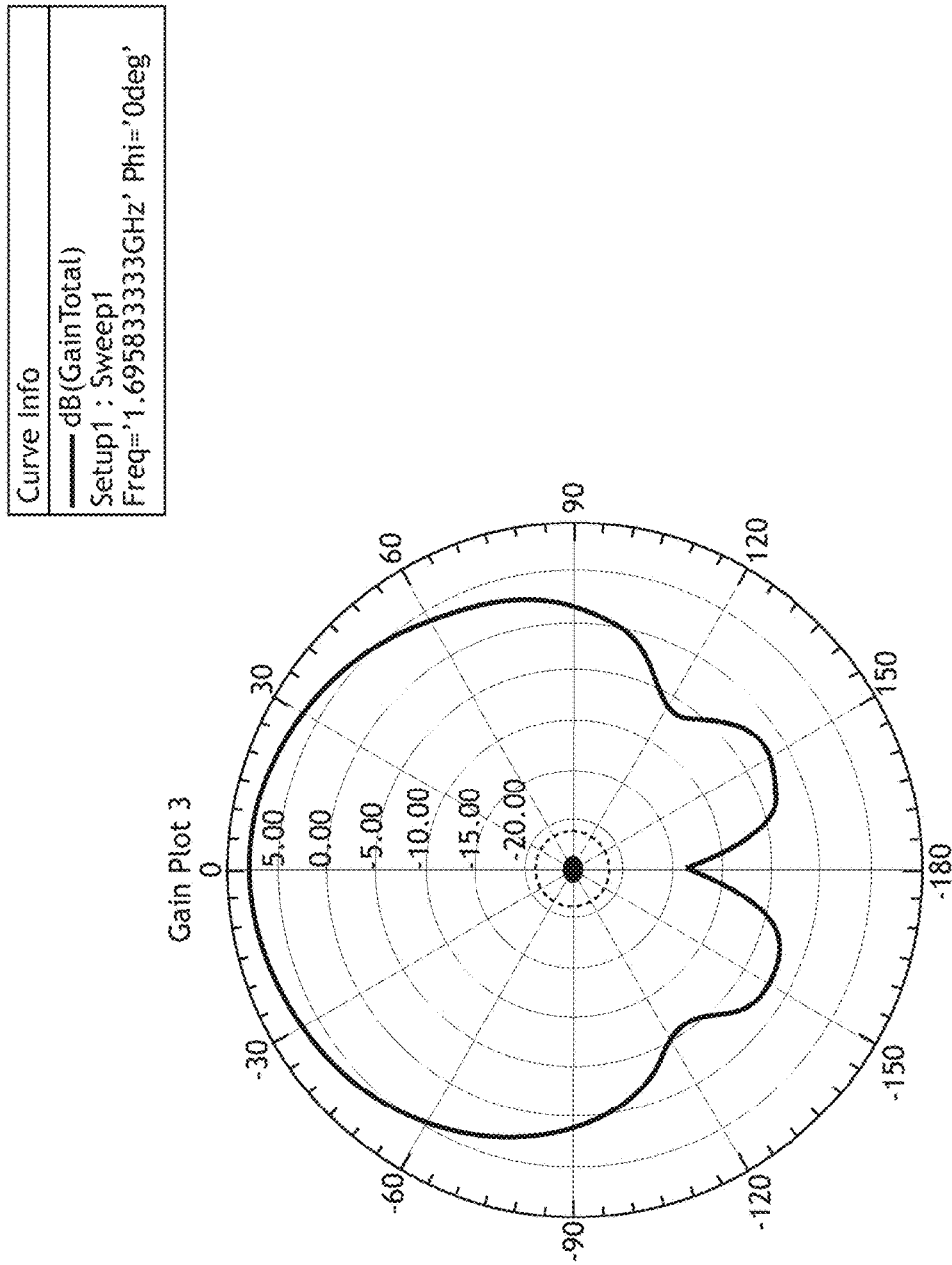
FIG. 9E shows a $\Phi=0°$ cut radiation pattern produced by a log periodic antenna according to an exemplary embodiment.
Figure 9F:
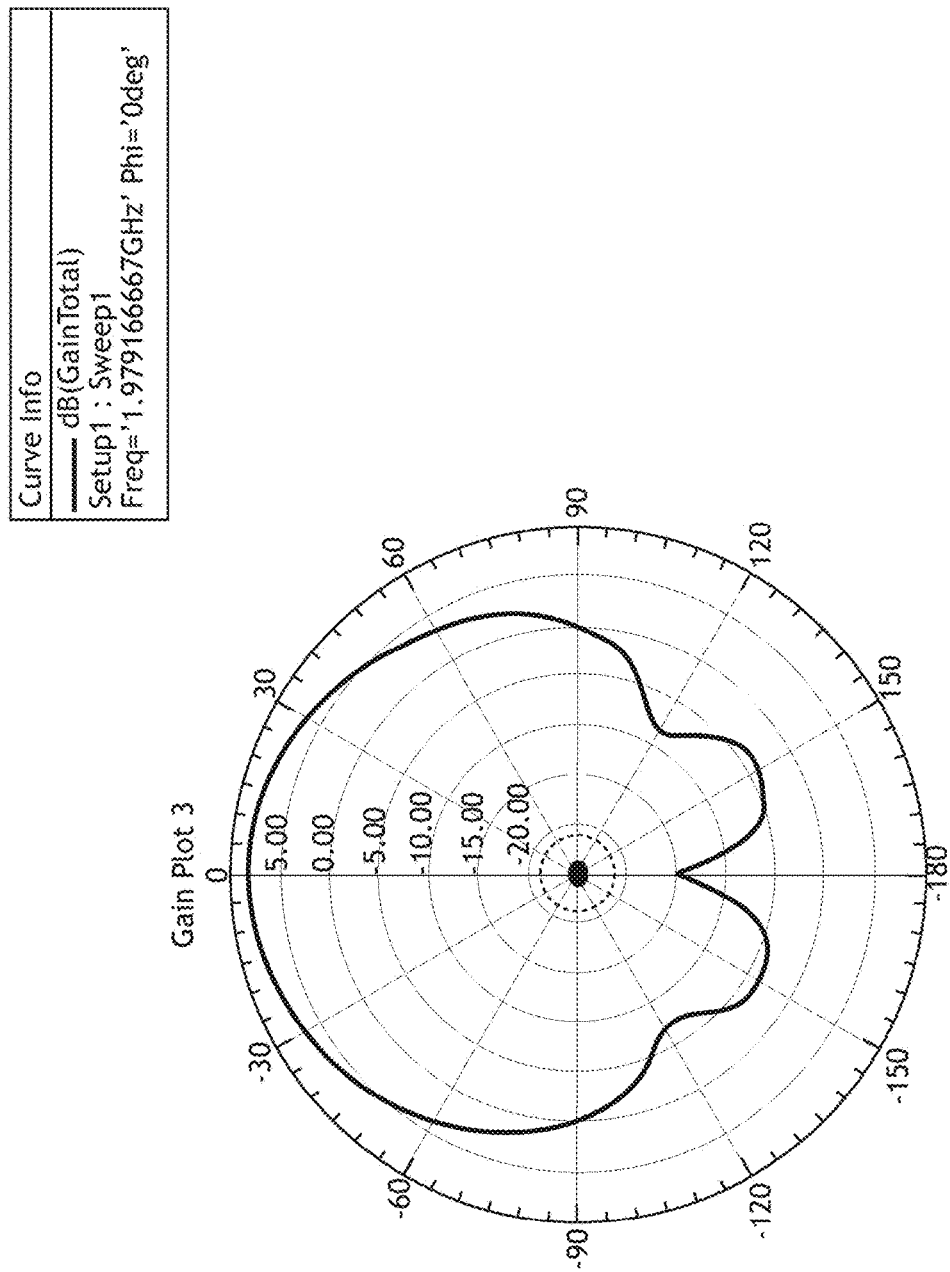
FIG. 9F shows a $\Phi=0°$ cut radiation pattern produced by a log periodic antenna according to an exemplary embodiment.
Figure 10A:
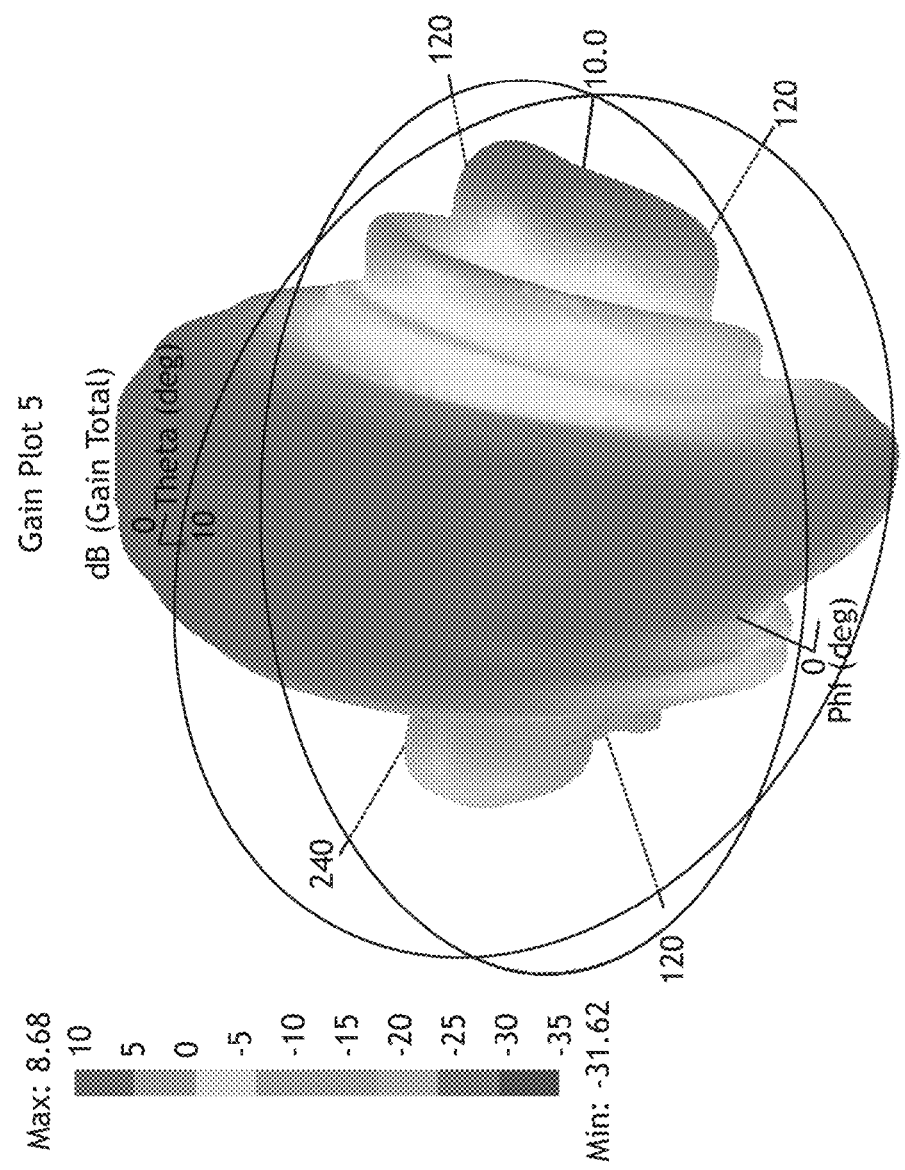
FIG. 10A shows a 3D radiation pattern produced by a log periodic antenna according to an exemplary embodiment.
Figure 10B:
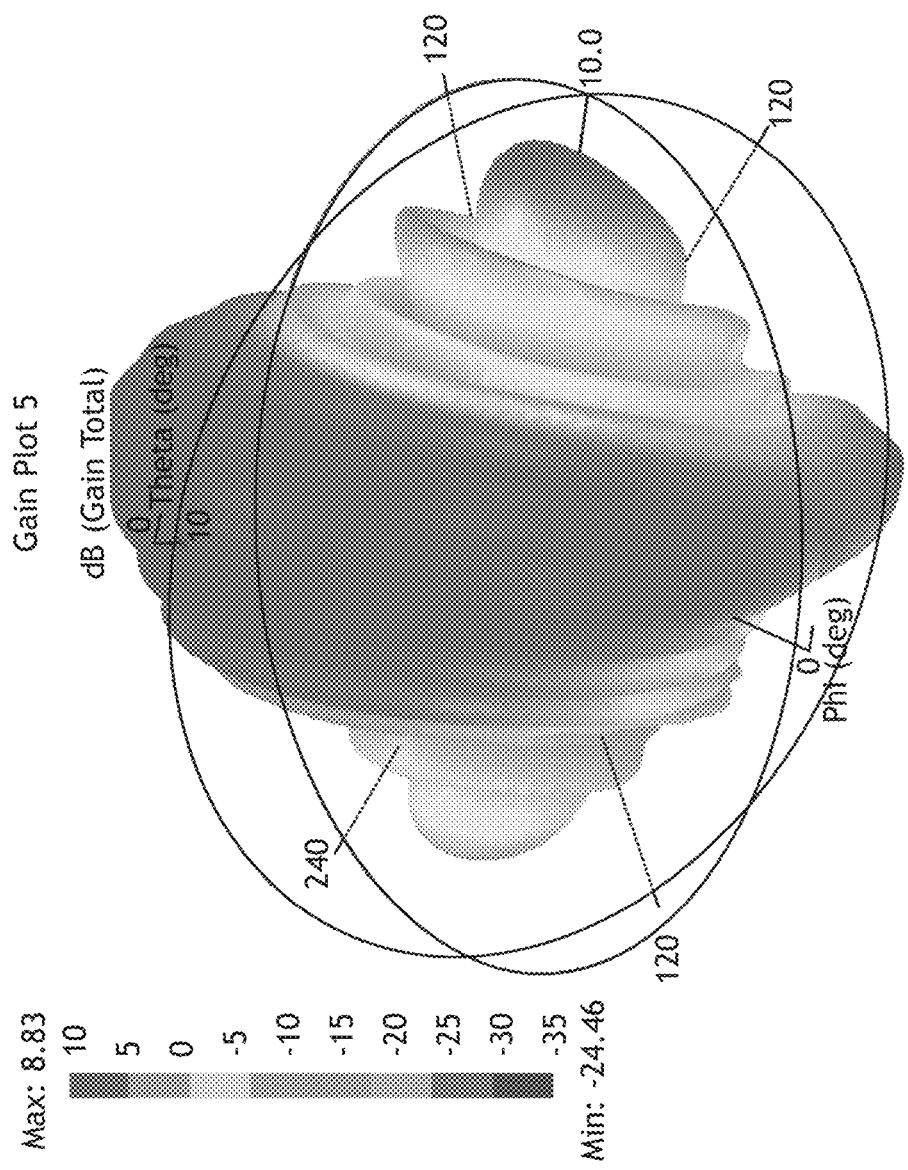
FIG. 10B shows a 3D radiation pattern produced by a log periodic antenna according to an exemplary embodiment.
Figure 10C:
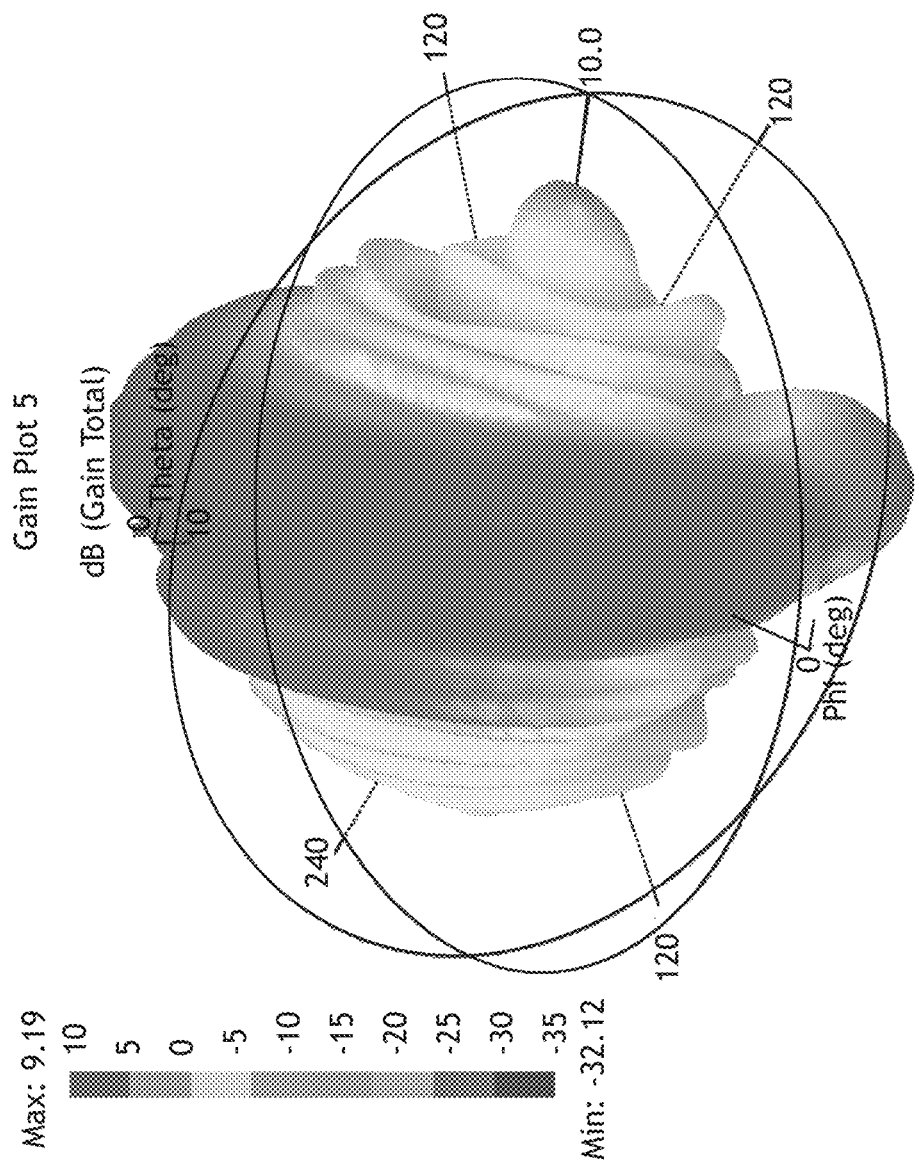
FIG. 10C shows a 3D radiation pattern produced by a log periodic antenna according to an exemplary embodiment.
Figure 10D:
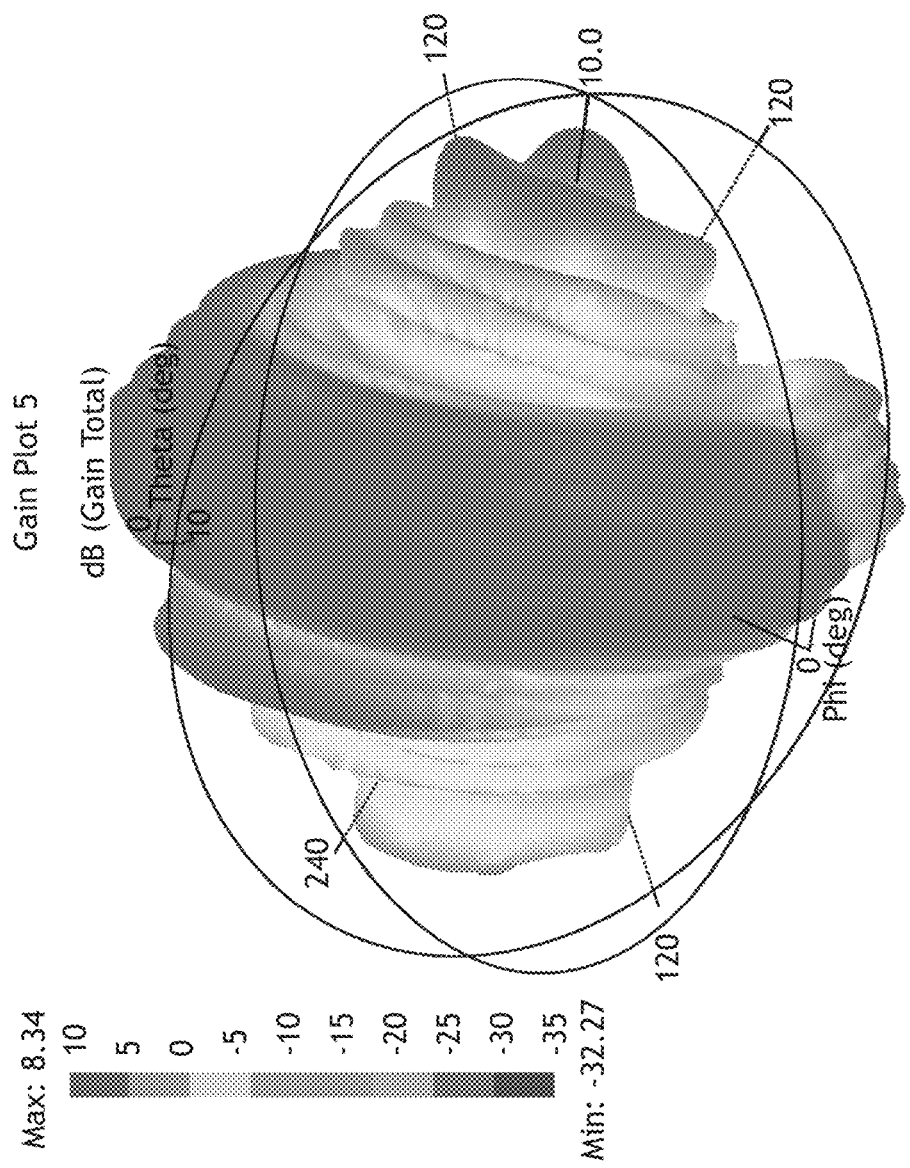
FIG. 10D shows a 3D radiation pattern produced by a log periodic antenna according to an exemplary embodiment.
Figure 10E:
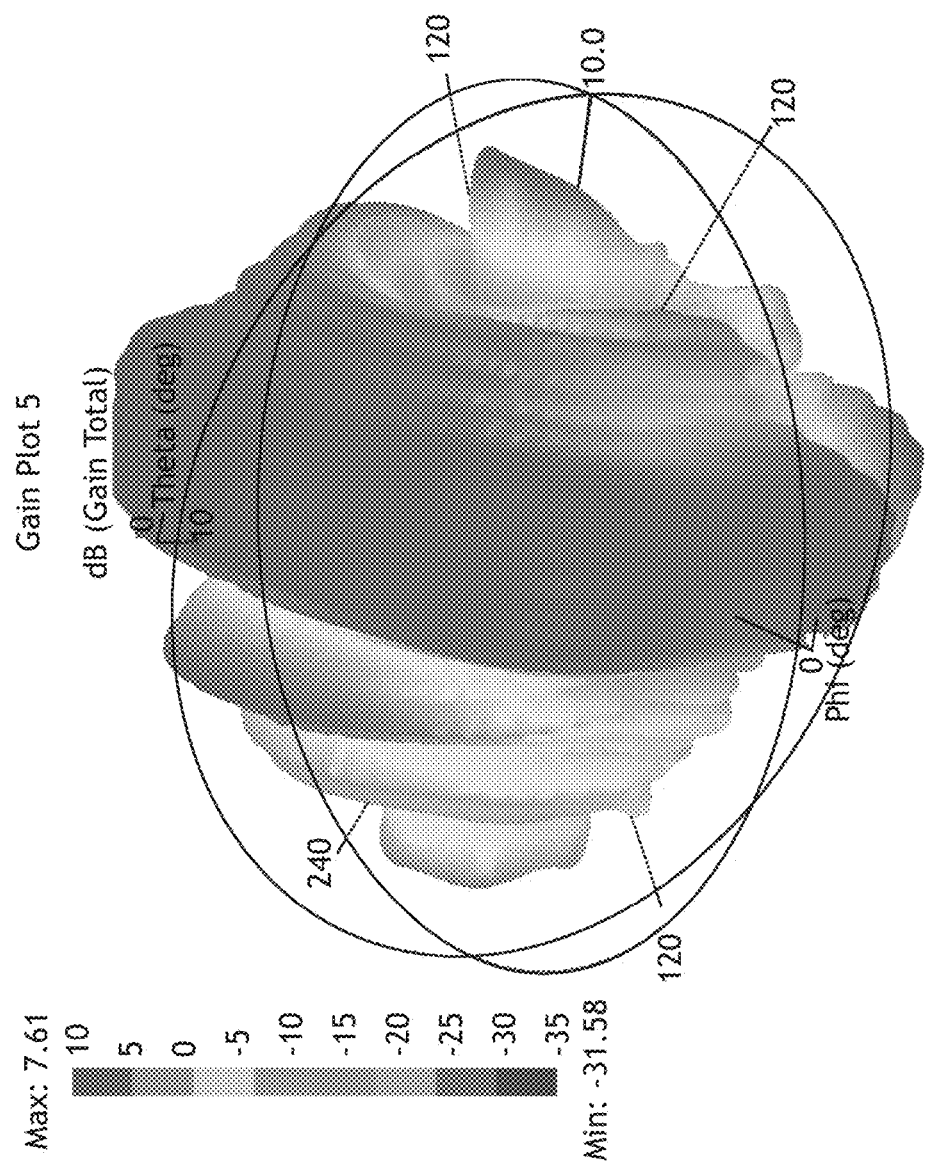
FIG. 10E shows a 3D radiation pattern produced by a log periodic antenna according to an exemplary embodiment.
Figure 11A:
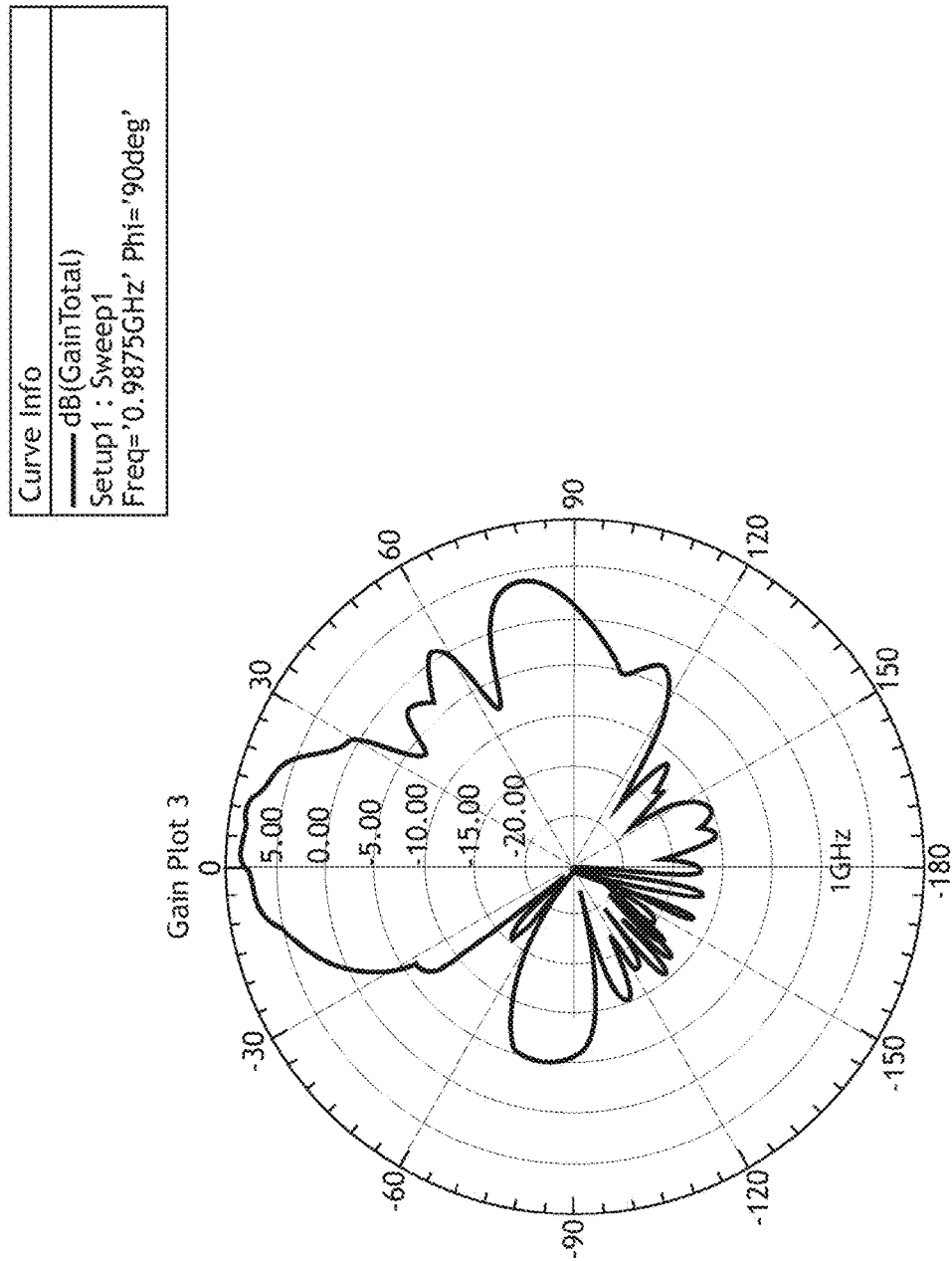
FIG. 11A shows a Φ=90° (Elevation cut) radiation pattern produced by a log periodic antenna according to an exemplary embodiment.
Figure 11B:
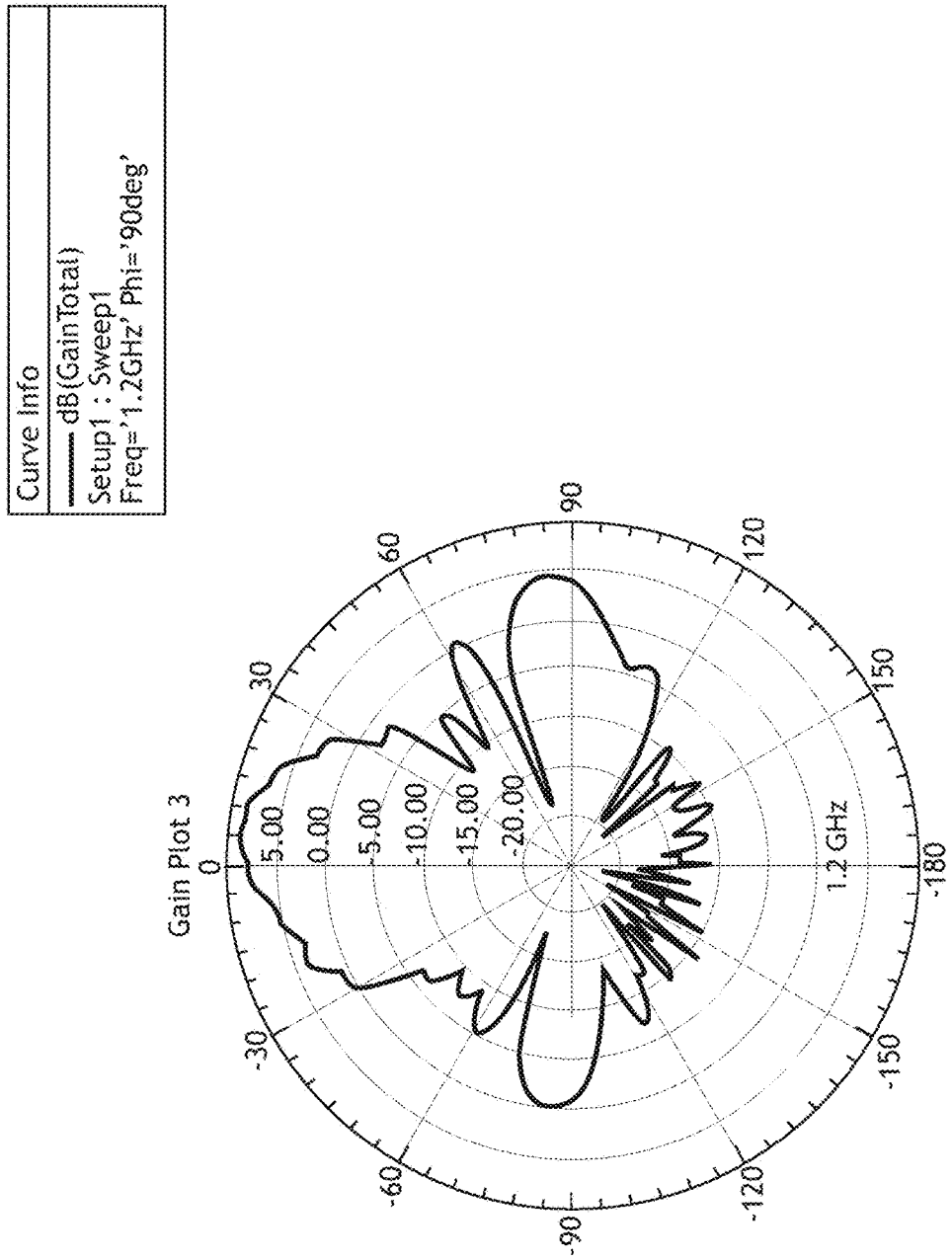
FIG. 11B shows a Φ=90° cut radiation pattern produced by a log periodic antenna according to an exemplary embodiment.
Figure 11C:
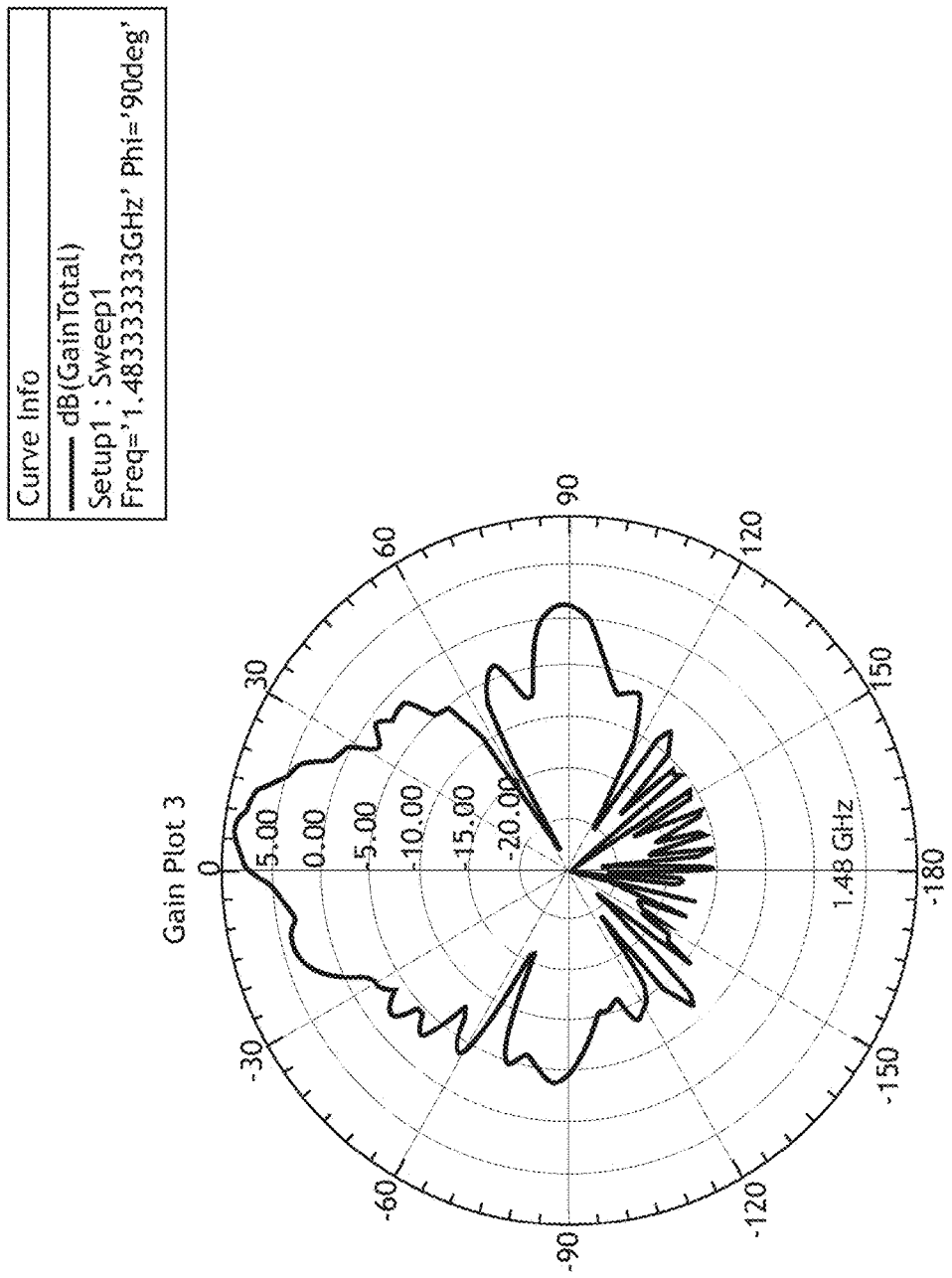
FIG. 11C shows a Φ=90° cut radiation pattern produced by a log periodic antenna according to an exemplary embodiment.
Figure 11D:
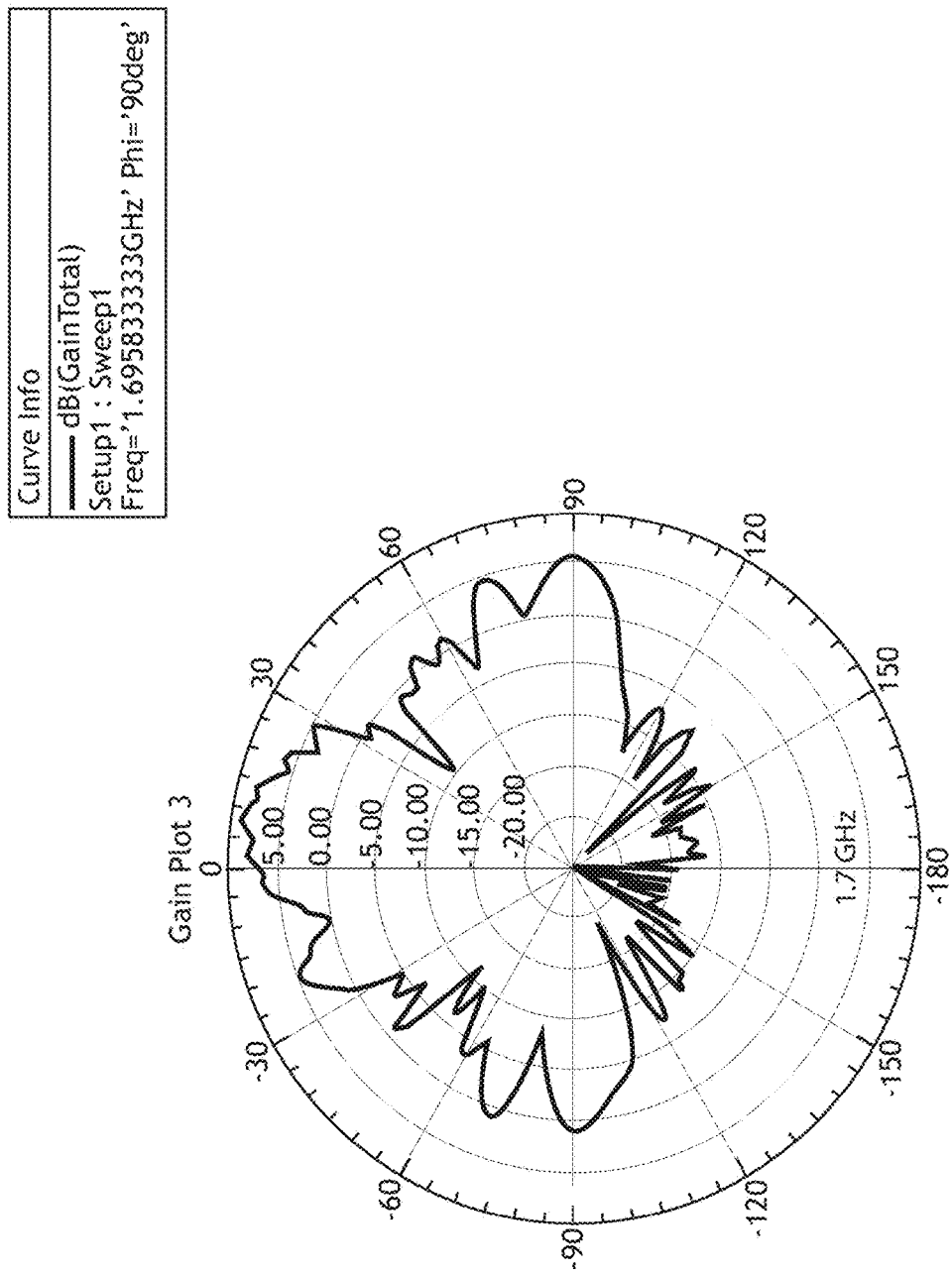
FIG. 11D shows a Φ=90° cut radiation pattern produced by a log periodic antenna according to an exemplary embodiment.
Figure 11E:
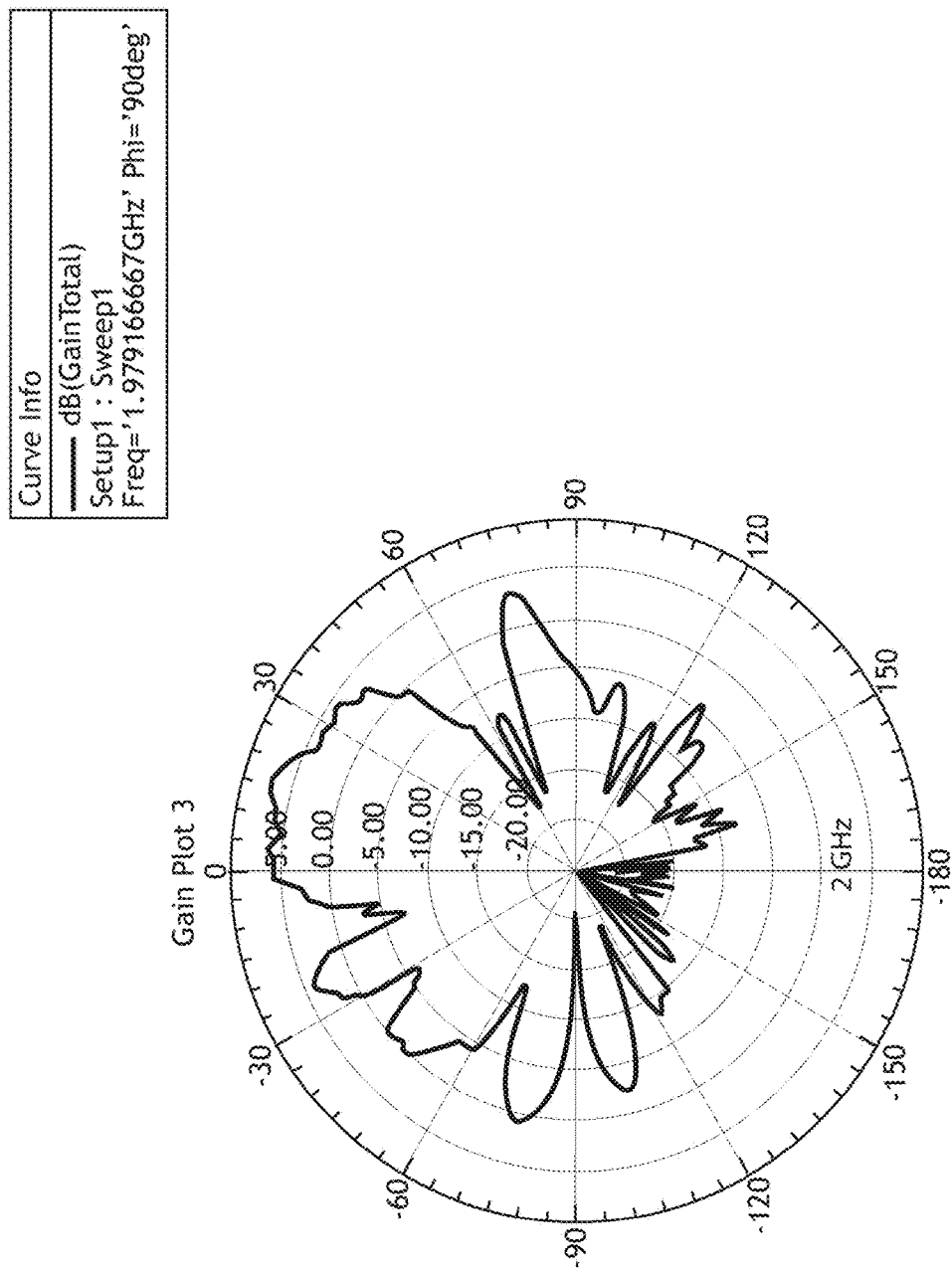
FIG. 11E shows a Φ=90° cut radiation pattern produced by a log periodic antenna according to an exemplary embodiment.
Figure 12A:
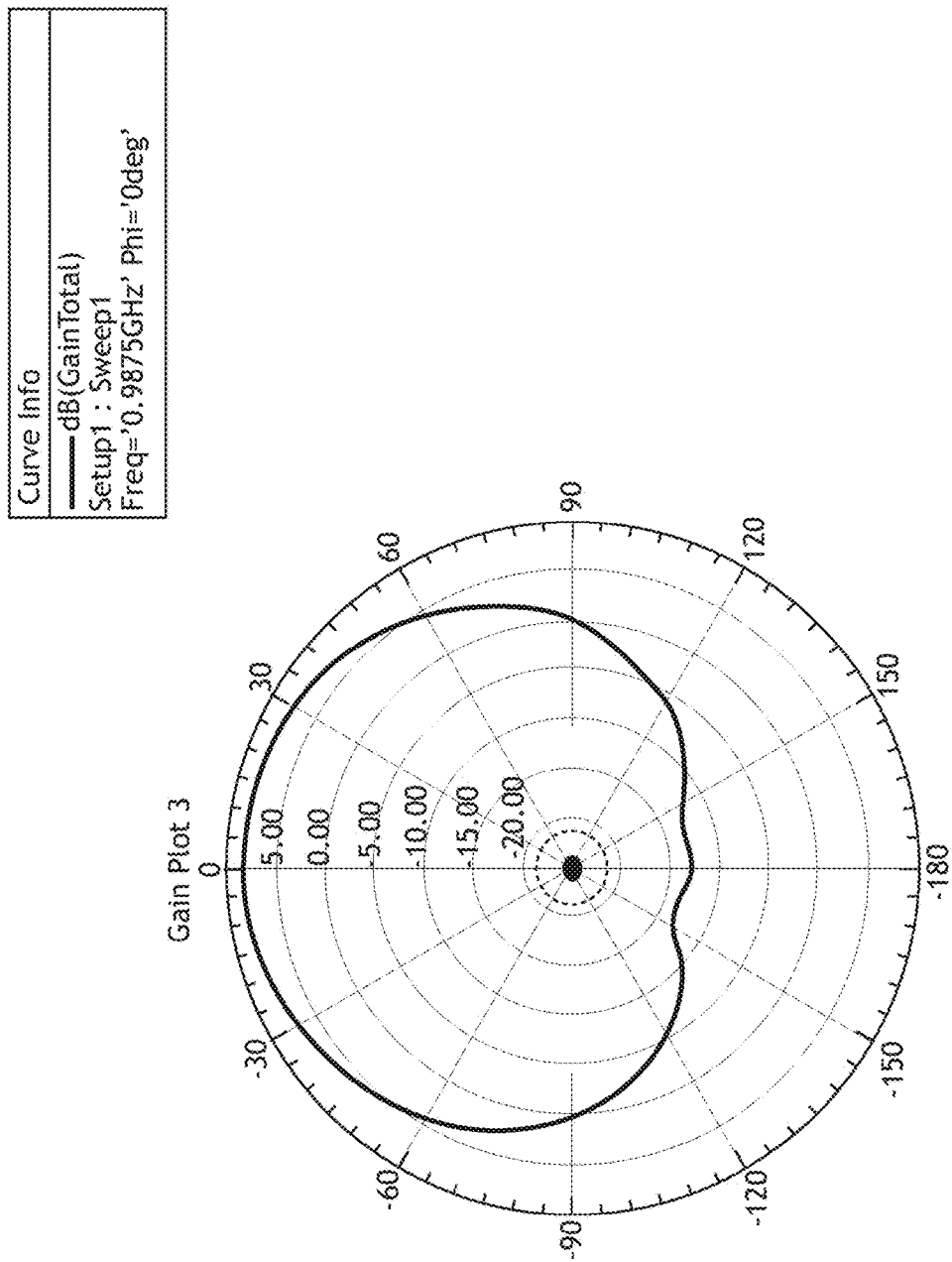
FIG. 12A shows a Φ=0° (Roll cut) radiation pattern produced by a log periodic antenna according to an exemplary embodiment.
Figure 12B:
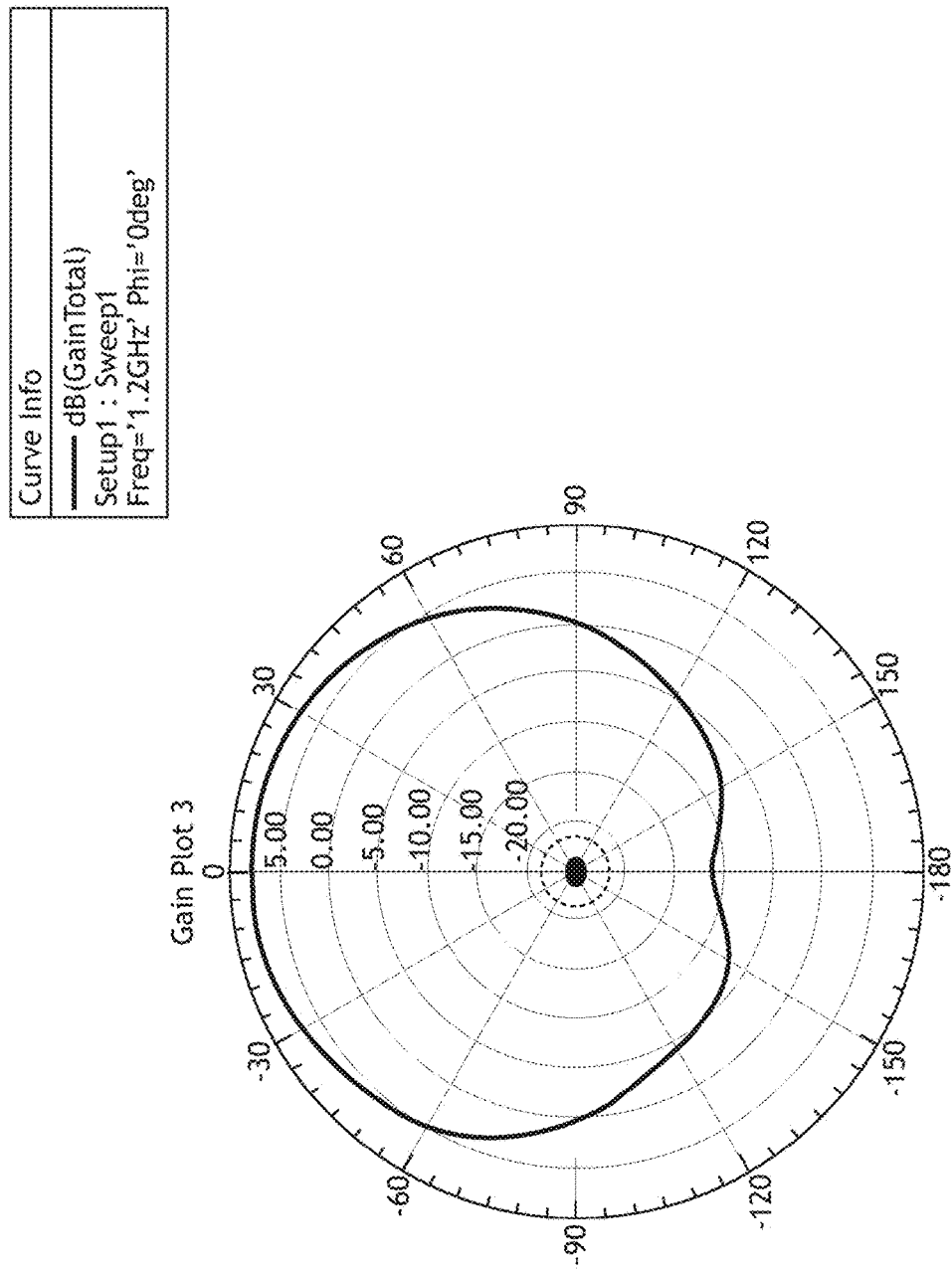
FIG. 12B shows a Φ=0° cut radiation pattern produced by a log periodic antenna according to an exemplary embodiment.
Figure 12C:
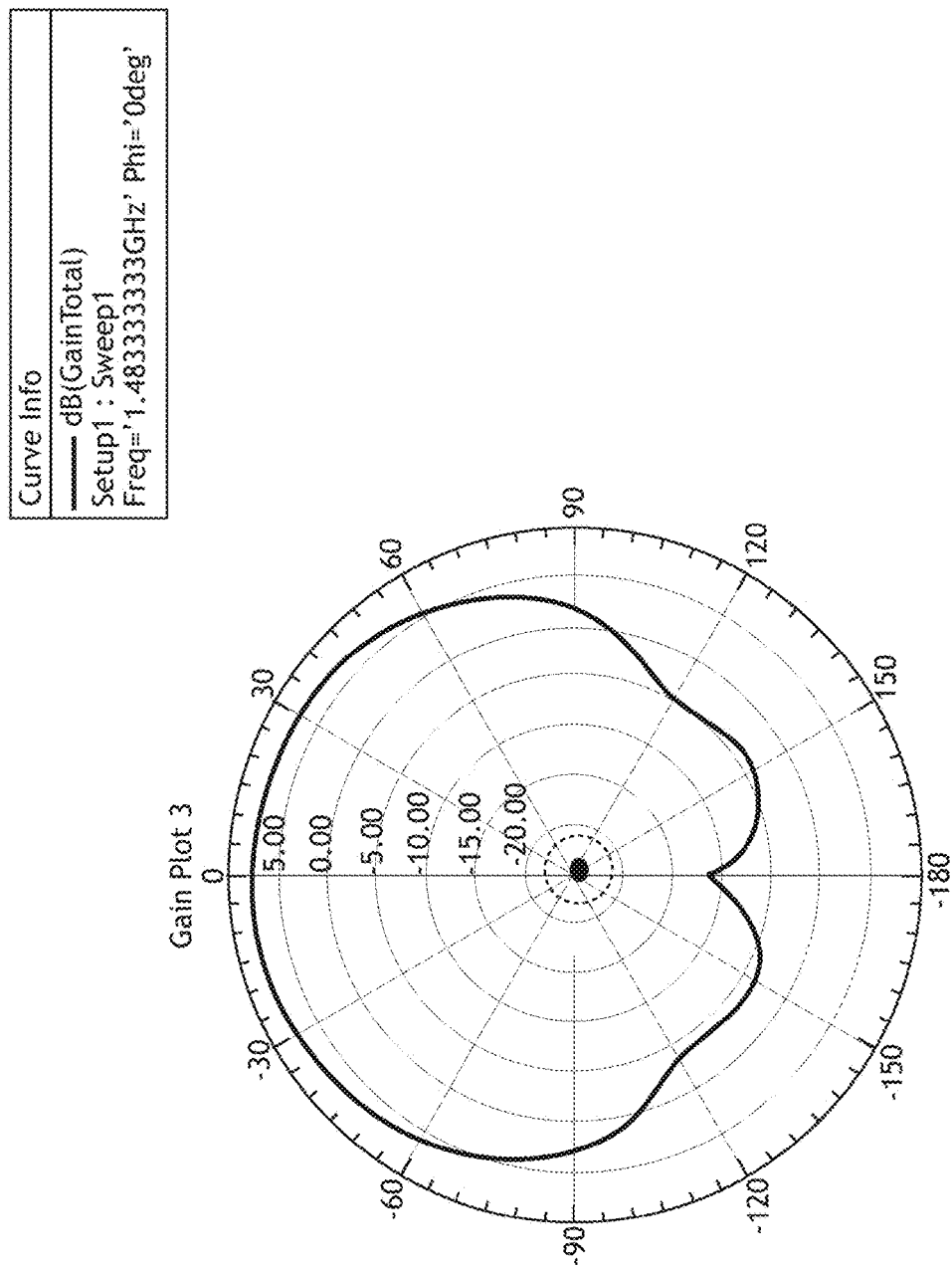
FIG. 12C shows a Φ=0° cut radiation pattern produced by a log periodic antenna according to an exemplary embodiment.
Figure 12D:
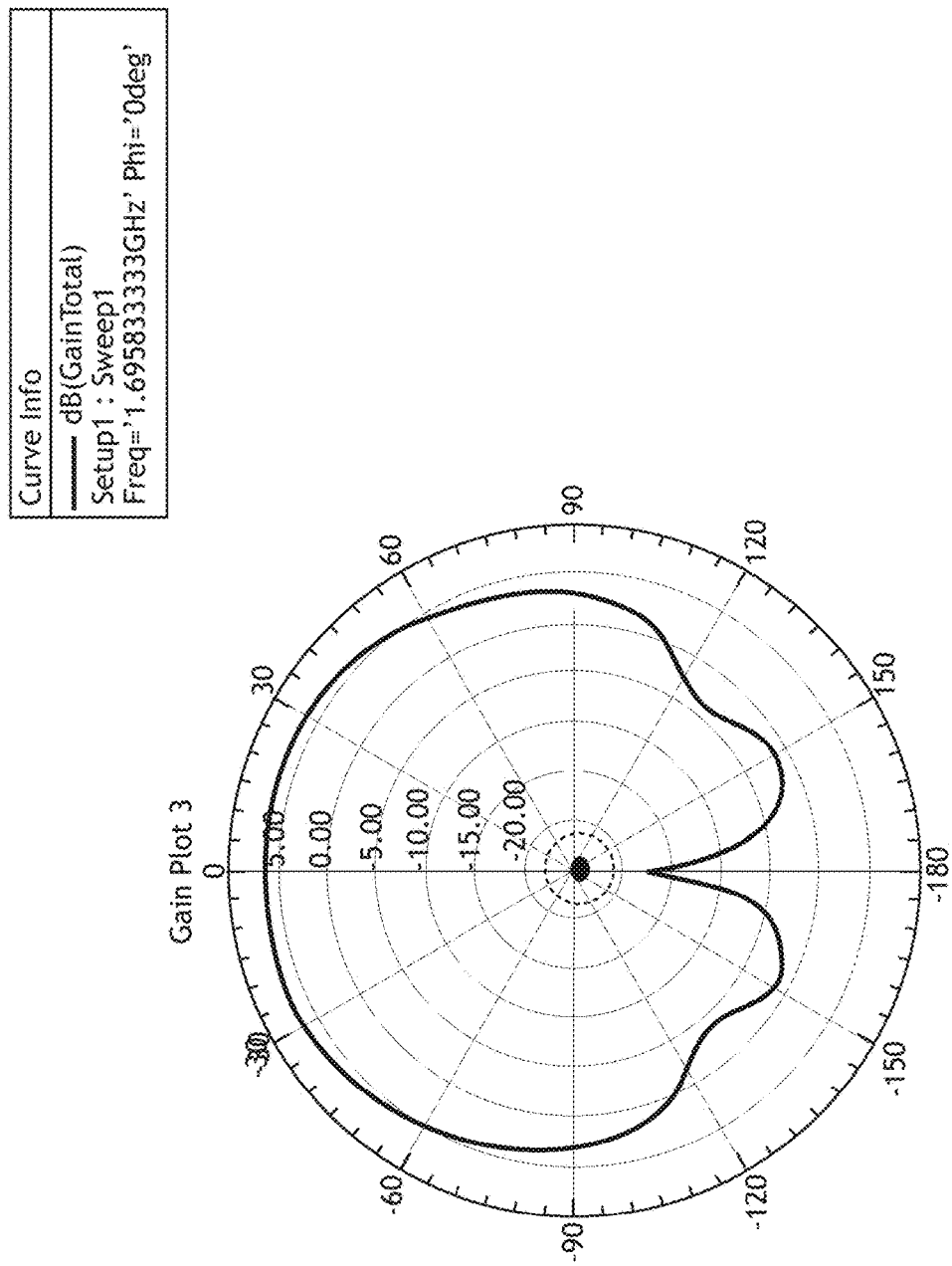
FIG. 12D shows a Φ=0° cut radiation pattern produced by a log periodic antenna according to an exemplary embodiment.
Figure 12E:
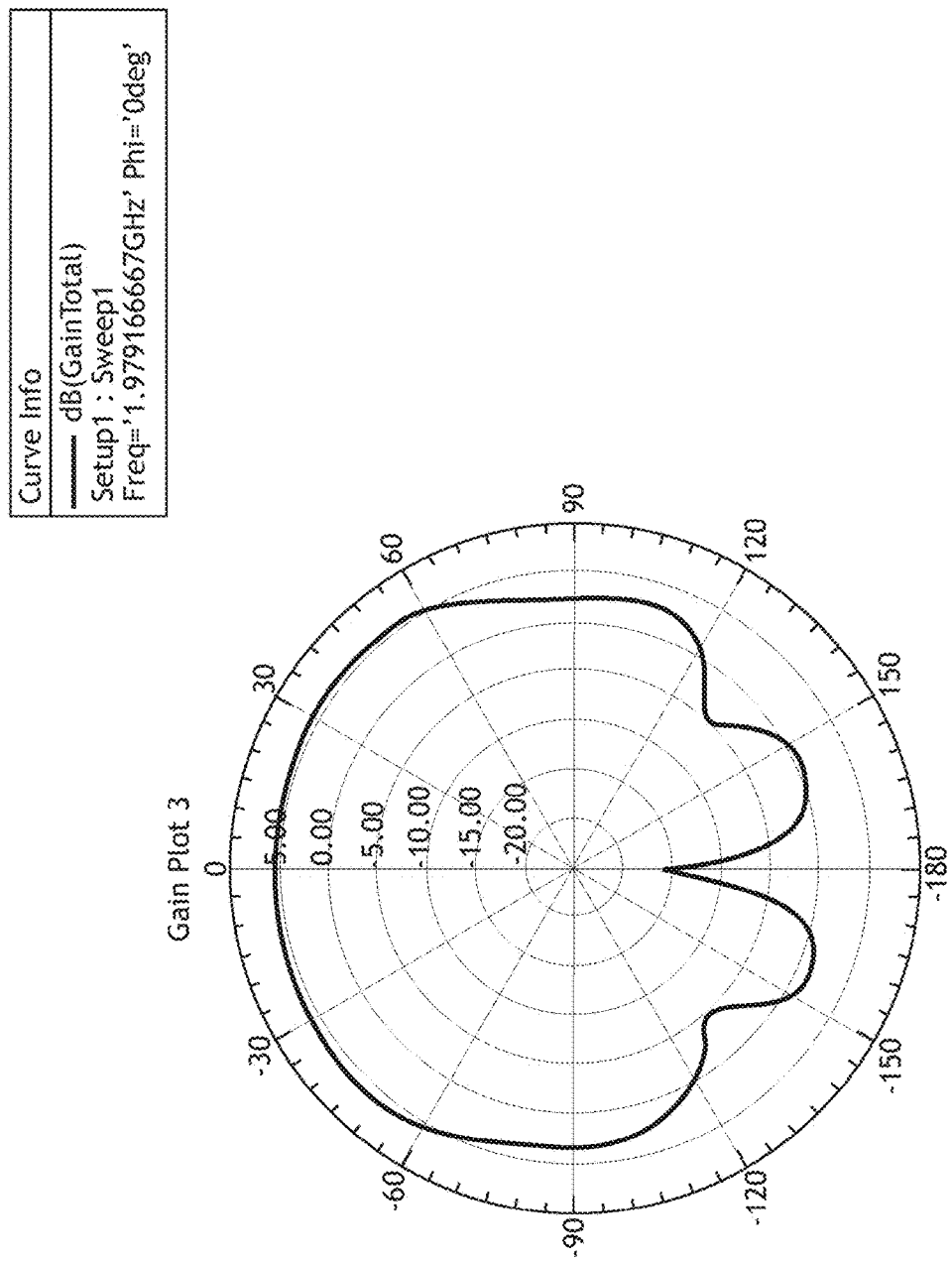
FIG. 12E shows a Φ=0° cut radiation pattern produced by a log periodic antenna according to an exemplary embodiment.

Referring to FIG. 6, a perspective view of an antenna 600 according to an exemplary embodiment and a radiation pattern is shown 602. The radiation pattern 602 is perturbed by higher-order resonances formed by circular or rectangular path resonators. Higher-order modes are conceptualized as multiple resonances in the return loss plot. Each resonance is due to a unique electromagnetic cavity mode within the patch radiator element. Existing microstrip patch design utilizes only the lower frequency resonance. Simultaneous excitation of these modes is responsible for distortion of the radiation pattern at higher frequencies.

Coupling to higher-order resonances occurs because of direct injection and/or over-air coupling. Increasing radiating element spacing has been shown to reduce over-air coupling. In at least one embodiment, amplitude tapering reduces direct injection. Amplitude tapering may be implemented via low-pass filters. For example, where a five radiating element antenna is driven via signals with phase offsets of 0, −45°, −90°, −136°, and −180°, the signals may have a corresponding relative amplitude tapering of 0, 0, 0.5, 1, and 1.

In at least one embodiment, higher-order resonance perturbations are suppressed by simultaneously increasing radiating element spacing and applying frequency dependent amplitude tapering. In at least one embodiment, higher-order resonances are above the cutoff frequency of the low-pass filter introduced at each feed point.

In at least one embodiment, multiple, linear, log periodic arrays can provide higher quality roll axis symmetric radiation patterns. Canonical uniformly spaced lattice linear arrays need to be ½-wave spaced at the highest frequency to prevent undesirable parasitic main beams (grating lobes).

With respect to FIGS. 7A-9F, radiation patterns for the 5-element array disposed on a truncated platform (such as in FIG. 5A) are shown. The amplitude tapering, which may be implemented with low-pass filters has been applied to ensure excitation of the fundamental mode and suppression of all higher order modes. Referring to FIGS. 7A-7F, perspective radiation patterns produced by a log periodic antenna according to an exemplary embodiment are shown. Radiation patterns at 0.7 GHz (FIG. 7A), 1 GHz (FIG. 7B), 1.2 GHz (FIG. 7C), 1.48 GHz (FIG. 7D), 1.7 GHz (FIG. 7E), and 2 GHz (FIG. 7F) are shown. Where the radiating elements are fed signals with amplitude tapering, the resulting radiation patterns are free of main lobe parasitic nulling. In one exemplary embodiment, where the array is configured to operate between 0.7 GHz and 2.0, the first radiating element is driven with a phase shift of 0°, the second radiating element is driven with a phase shift of −61°, the third radiating element is driven with a phase shift of −122°, the fourth radiating element is driven with a phase shift of −182°, and the fifth radiating element is driven with a phase shift of −243°. Between 0.7 GHz and 1.0 GHz, all radiating elements are driven at a magnitude of 1; at 1.2 GHz, the first radiating element is driven at a magnitude of 0.5 and the rest of the elements at a magnitude of 1; at 1.48 GHz, the first radiating element is driven at a magnitude of 0.15 and the rest of the elements at a magnitude of 1; at 1.7 GHz, the first and second radiating elements are driven at a magnitude of 0 and elements 3-5 at a magnitude of 1; and at 2.0 GHz, the first, and second radiating elements are driven at a magnitude of 0 while the third radiating elements is driven at a magnitude of 0.5 and the elements 4-5 are driven at a magnitude of 1.

Referring to FIGS. 8A-8F, elevation-cut of radiation patterns produced by a log periodic antenna along the axis of the antenna according to an exemplary embodiment are shown. Radiation patterns at 0.7 GHz (FIG. 8A), 1 GHz (FIG. 8B), 1.2 GHz (FIG. 8C), 1.48 GHz (FIG. 8D), 1.7 GHz (FIG. 8E), and 2 GHz (FIG. 8F) are shown. Where the radiating elements are disposed along the fuselage axis, the beam beak can be steered via phase shifting in the feed network.

Referring to FIGS. 9A-9F, roll cut of radiation patterns produced by a log periodic antenna according to an exemplary embodiment are shown. Radiation patterns at 0.7 GHz (FIG. 9A), 1 GHz (FIG. 9B), 1.2 GHz (FIG. 9C), 1.48 GHz (FIG. 9D), 1.7 GHz (FIG. 9E), and 2 GHz (FIG. 9F) are shown. In an end view along the axis of the antenna, the conformal radiating element produce a highly symmetrical radiating pattern about the antenna axis.

With respect to FIGS. 10A-12E, radiation patterns for the 5-element array disposed on an elongated platform (such as in FIG. 5B) are shown. The amplitude tapering, which may be implemented with low-pass filters has been applied to ensure excitation of the fundamental mode and suppression of all higher order modes. In one exemplary embodiment, where the array is configured to operate between 0.7 GHz and 2.0, the first radiating element is driven with a phase shift of 0°, the second radiating element is driven with a phase shift of 61°, the third radiating element is driven with a phase shift of 122°, the fourth radiating element is driven with a phase shift of 182°, and the fifth radiating element is driven with a phase shift of 243°. Between 0.7 GHz and 1.0 GHz, all radiating elements are driven at a magnitude of 1; at 1.2 GHz, the first radiating element is driven at a magnitude of 0.5 and the rest of the elements at a magnitude of 1; at 1.48 GHz, the first radiating element is driven at a magnitude of 0.15 and the rest of the elements at a magnitude of 1; at 1.7 GHz, the first and second radiating elements are driven at a magnitude of 0 and elements 3-5 at a magnitude of 1; and at 2.0 GHz, the first, and second radiating elements are driven at a magnitude of 0 while the third radiating elements is driven at a magnitude of 0.5 and the elements 4-5 are driven at a magnitude of 1. Referring to FIGS. 10A-10E, radiation patterns produced by a log periodic antenna according to an exemplary embodiment are shown. Radiation patterns at 1 GHz (FIG. 10A), 1.2 GHz (FIG. 10B), 1.48 GHz (FIG. 10C), 1.7 GHz (FIG. 10D), and 2 GHz (FIG. 10E) are shown. Where the radiating elements are fed signals with amplitude tapering, the resulting radiation patterns are free of main lobe parasitic nulling. Mobile platform geometry may produce some pattern differences with respect to idealized radiators.

Referring to FIGS. 11A-11E, elevation cut of radiation patterns produced by a log periodic antenna according to an exemplary embodiment are shown. Radiation patterns at 1 GHz (FIG. 11A), 1.2 GHz (FIG. 11B), 1.48 GHz (FIG. 11C), 1.7 GHz (FIG. 11D), and 2 GHz (FIG. 11E) are shown. Where the radiating elements are fed signals with amplitude tapering, the resulting radiation patterns are free of main lobe parasitic nulling. Mobile platform nulling may occur at the higher end of the band, but may be compensated for by tuning disposition of the radiating elements and the configuration of the phase shifters and filters.

Referring to FIGS. 12A-12E, roll cut of radiation patterns produced by a log periodic antenna according to an exemplary embodiment are shown. Radiation patterns at 1 GHz (FIG. 12A), 1.2 GHz (FIG. 12B), 1.48 GHz (FIG. 12C), 1.7 GHz (FIG. 12D), and 2 GHz (FIG. 12E) are shown. Where the radiating elements are fed signals with amplitude tapering, the resulting radiation patterns exhibit a high degree of axial symmetry.

Figure 13:
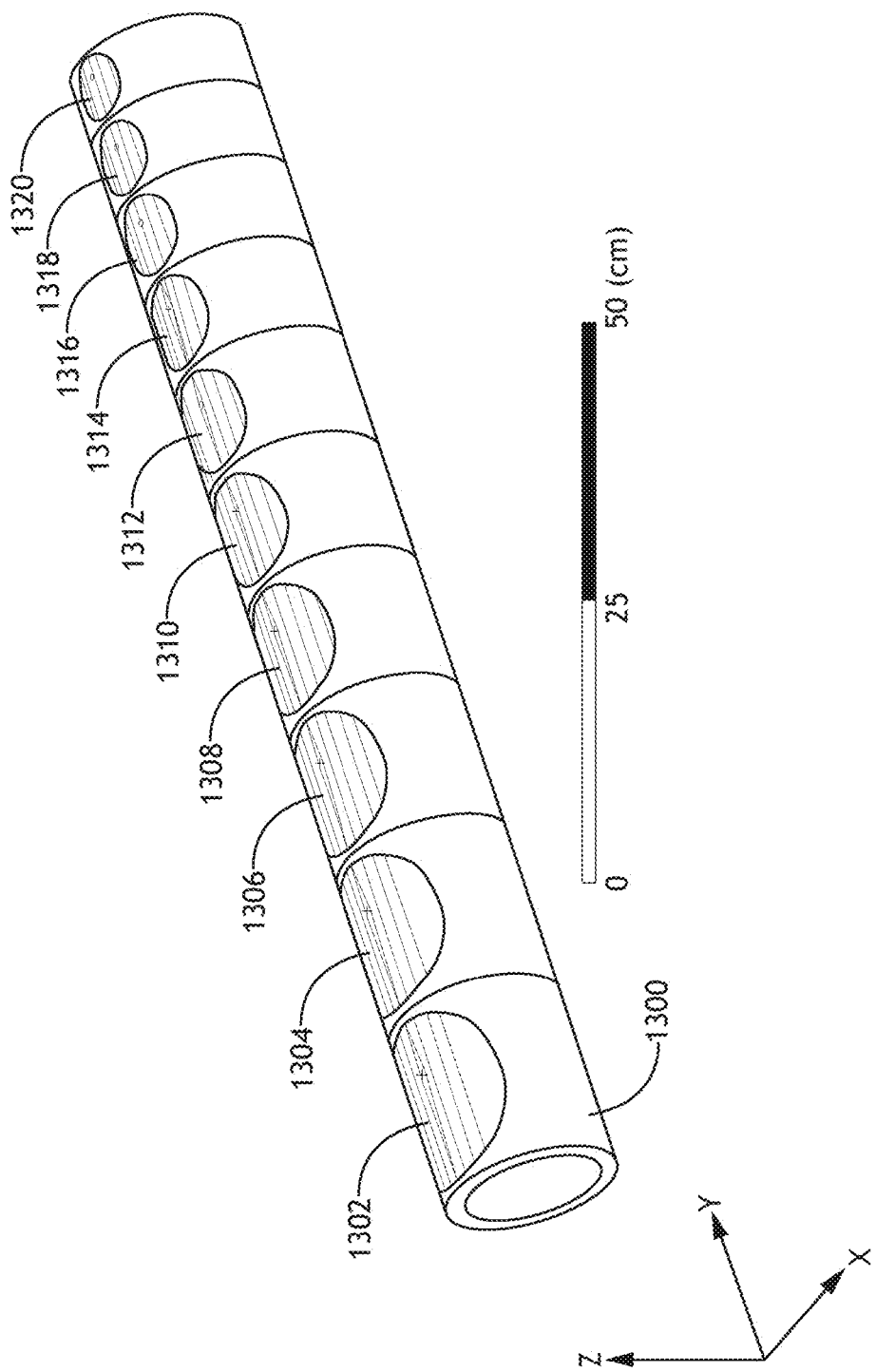
FIG. 13 shows a perspective view of an antenna with conformal log periodic radiating elements according to an exemplary embodiment.
Figure 14A:
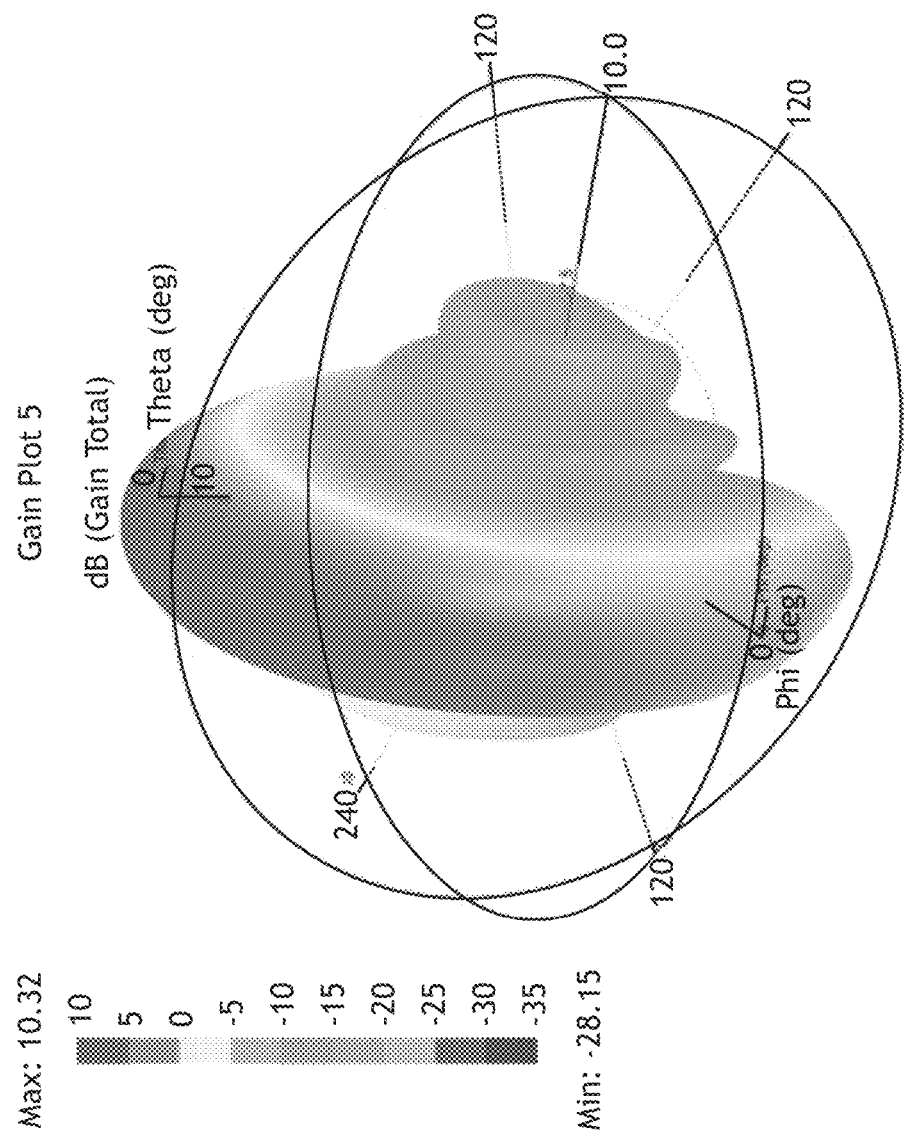
FIG. 14A shows a 3D radiation pattern produced by a log periodic antenna according to an exemplary embodiment.
Figure 14B:
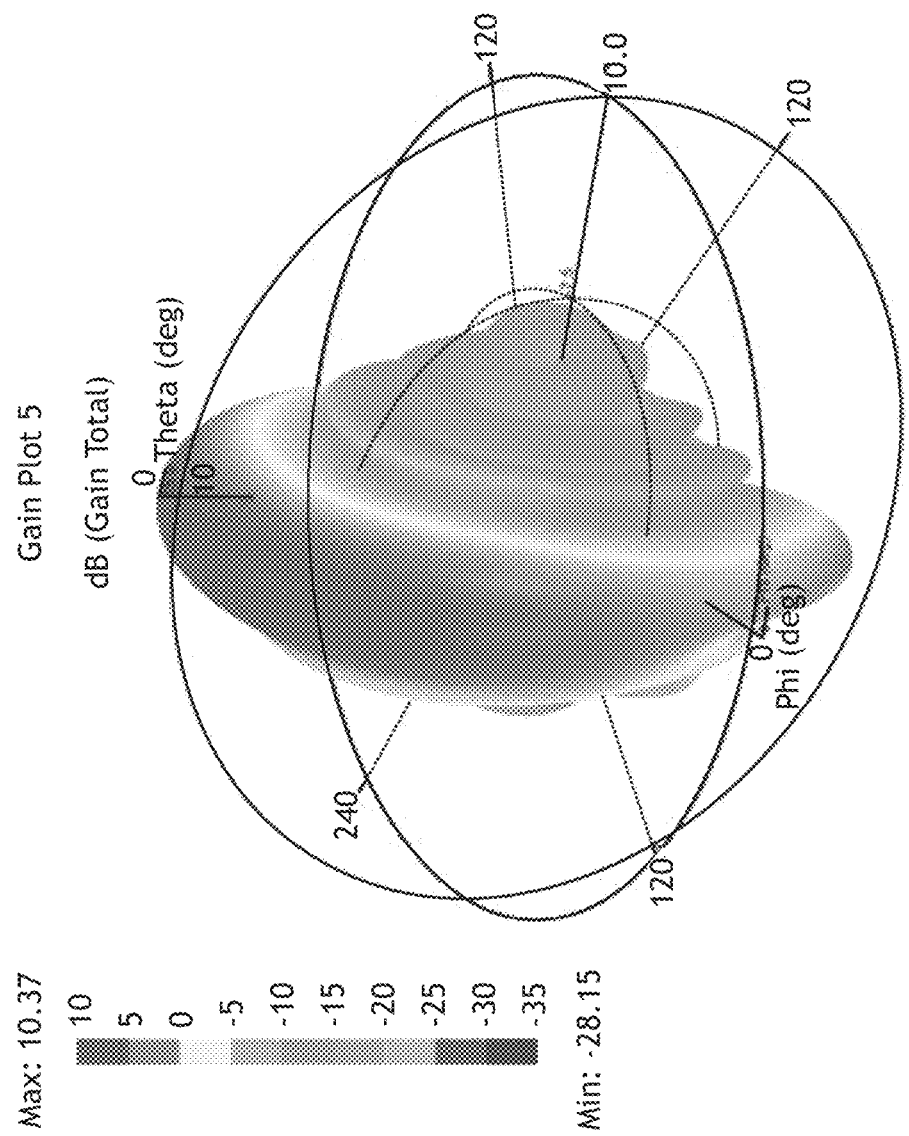
FIG. 14B shows a 3D radiation pattern produced by a log periodic antenna according to an exemplary embodiment.
Figure 14C:
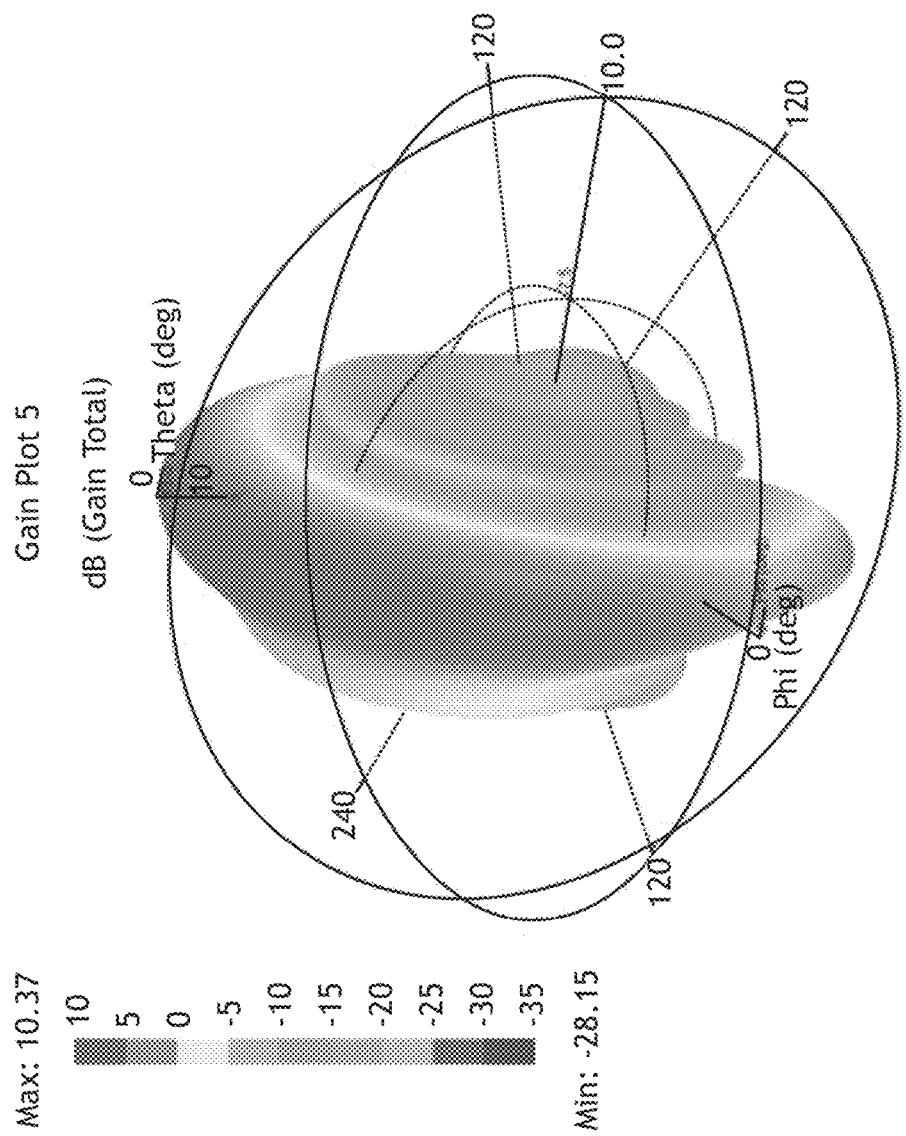
FIG. 14C shows a 3D radiation pattern produced by a log periodic antenna according to an exemplary embodiment.
Figure 14D:
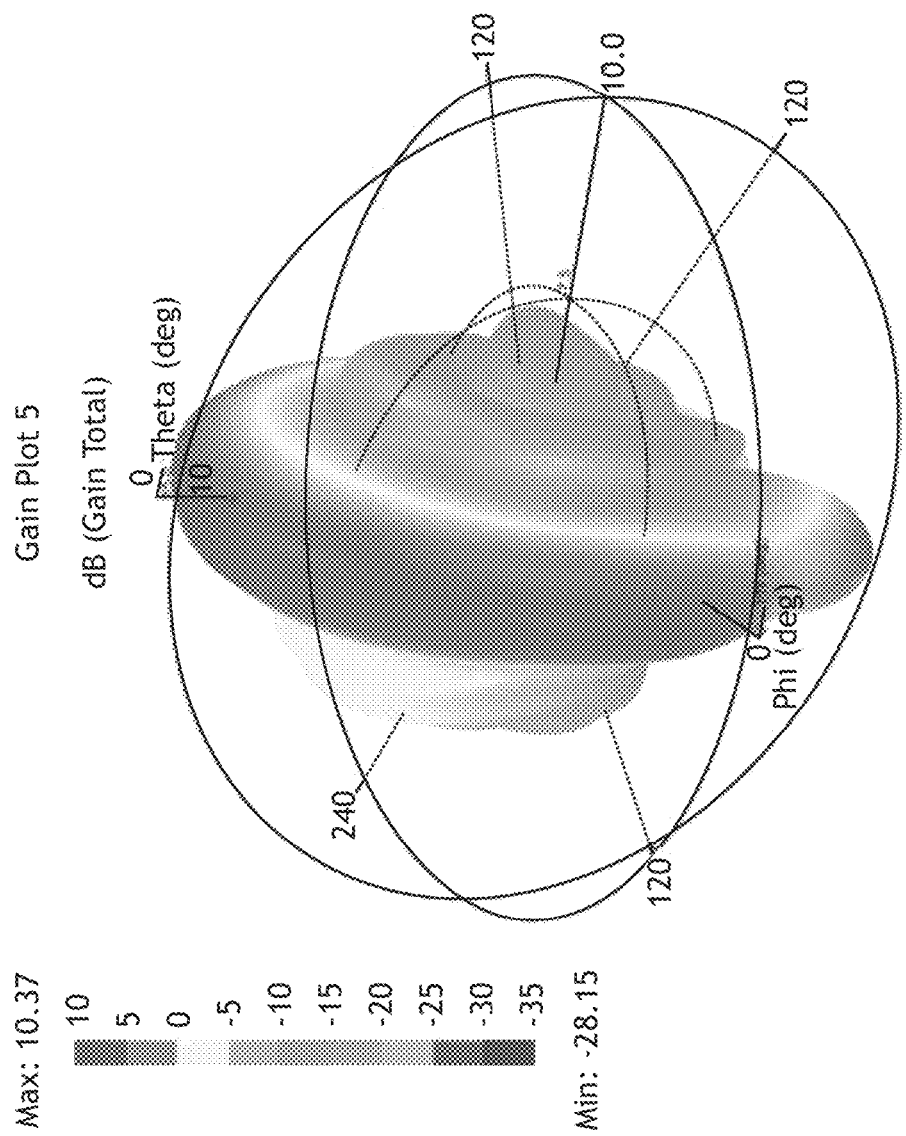
FIG. 14D shows a 3D radiation pattern produced by a log periodic antenna according to an exemplary embodiment.
Figure 14E:
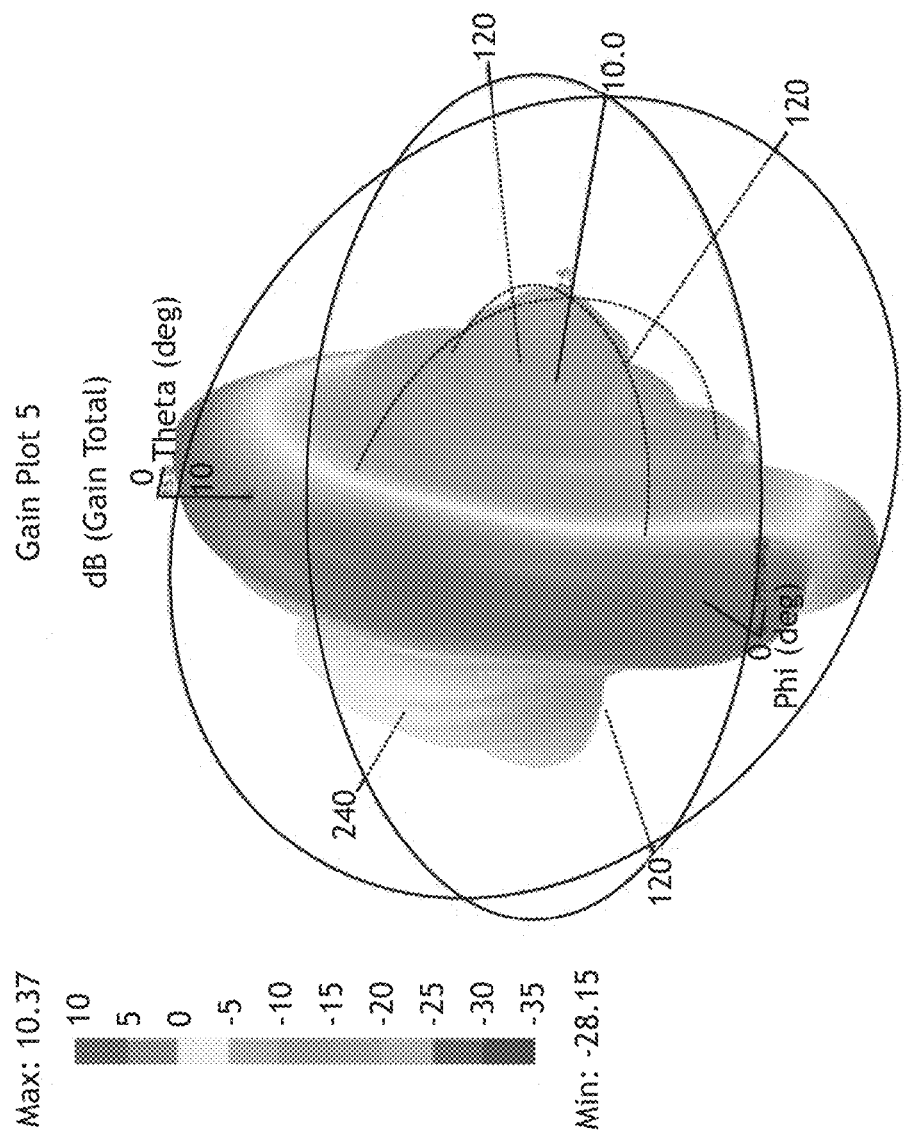
FIG. 14E shows a 3D radiation pattern produced by a log periodic antenna according to an exemplary embodiment.
Figure 14F:
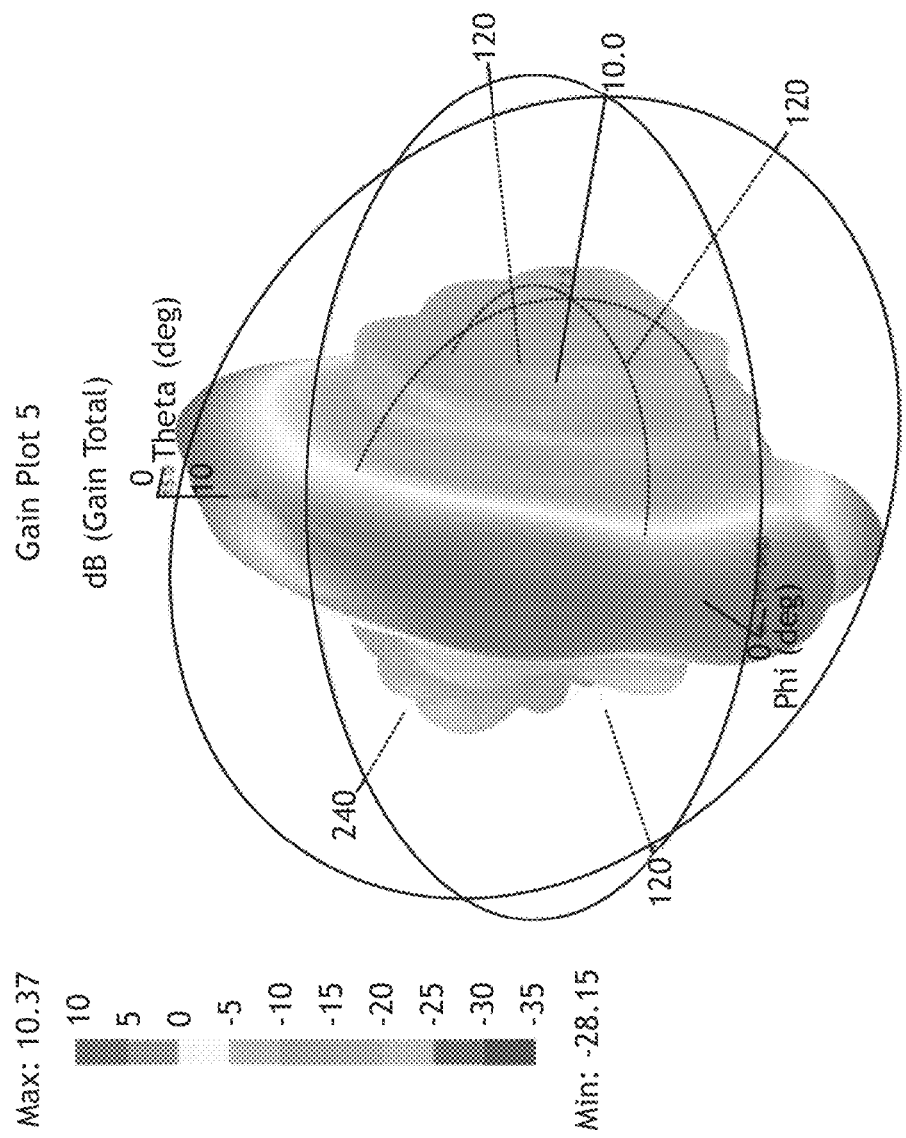
FIG. 14F shows a 3D radiation pattern produced by a log periodic antenna according to an exemplary embodiment.
Figure 15A:
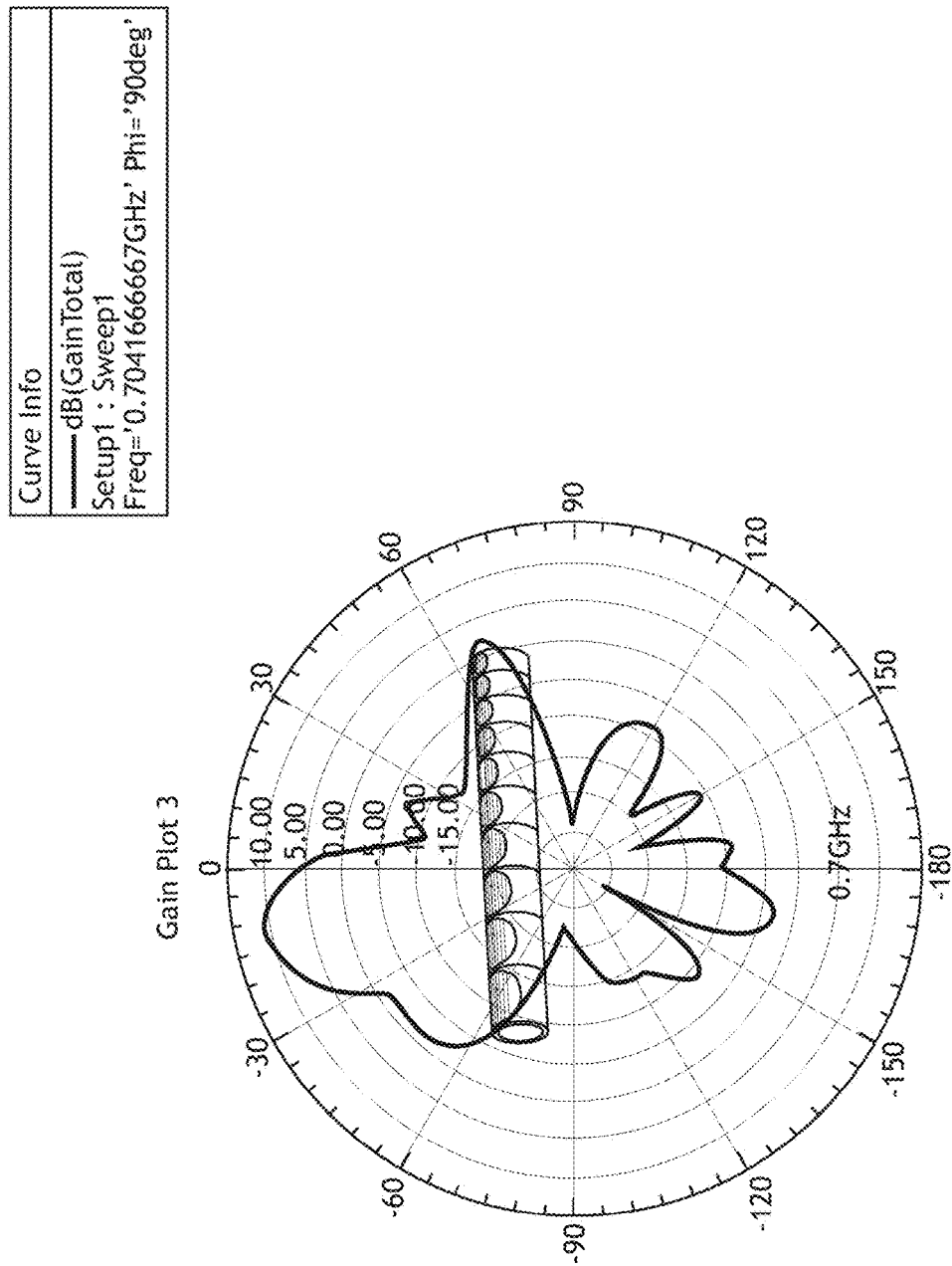
FIG. 15A shows a Φ=90° (Elevation cut) radiation pattern produced by a log periodic antenna according to an exemplary embodiment.
Figure 15B:
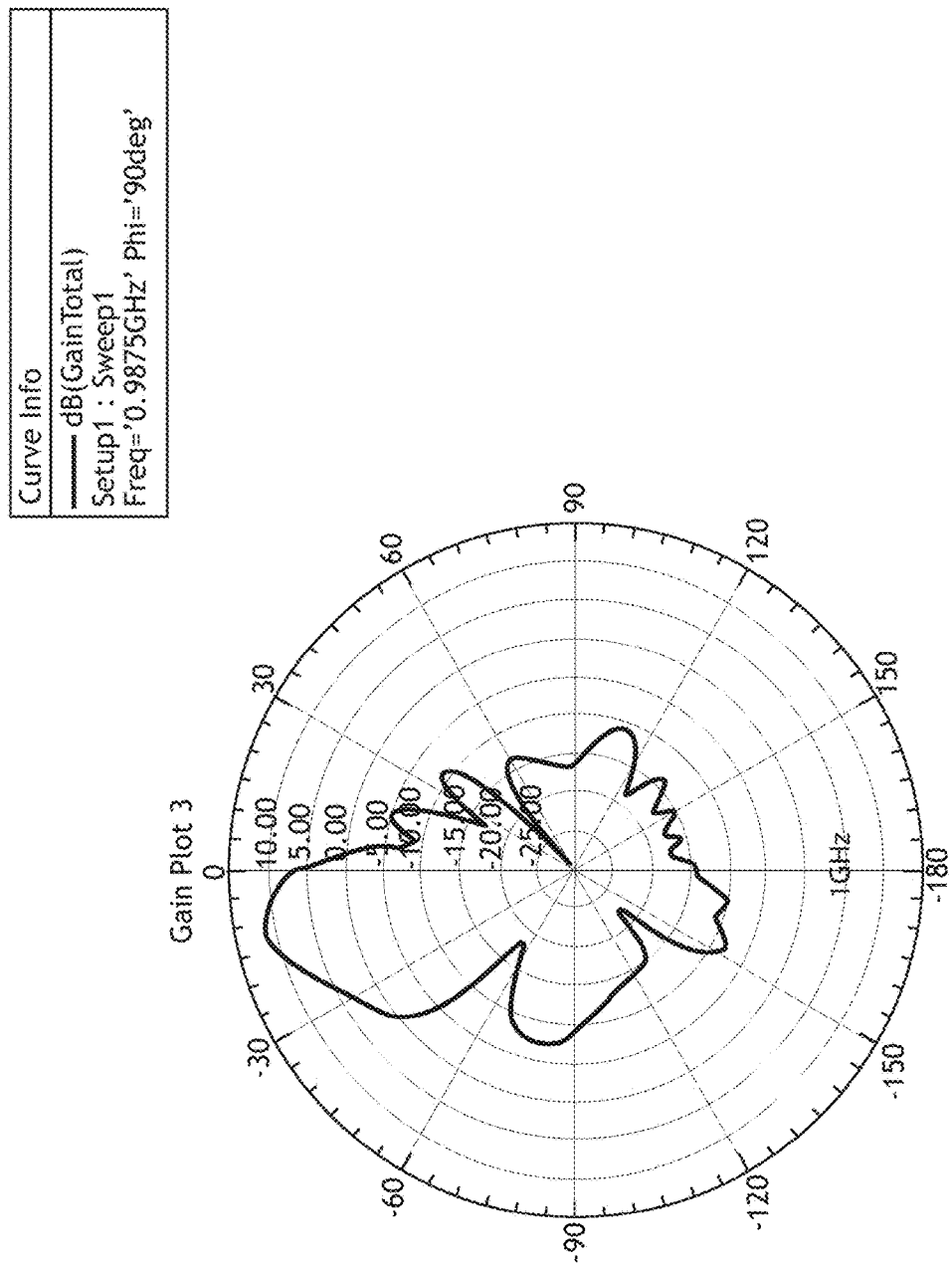
FIG. 15B shows a Φ=90° cut radiation pattern produced by a log periodic antenna according to an exemplary embodiment.
Figure 15C:
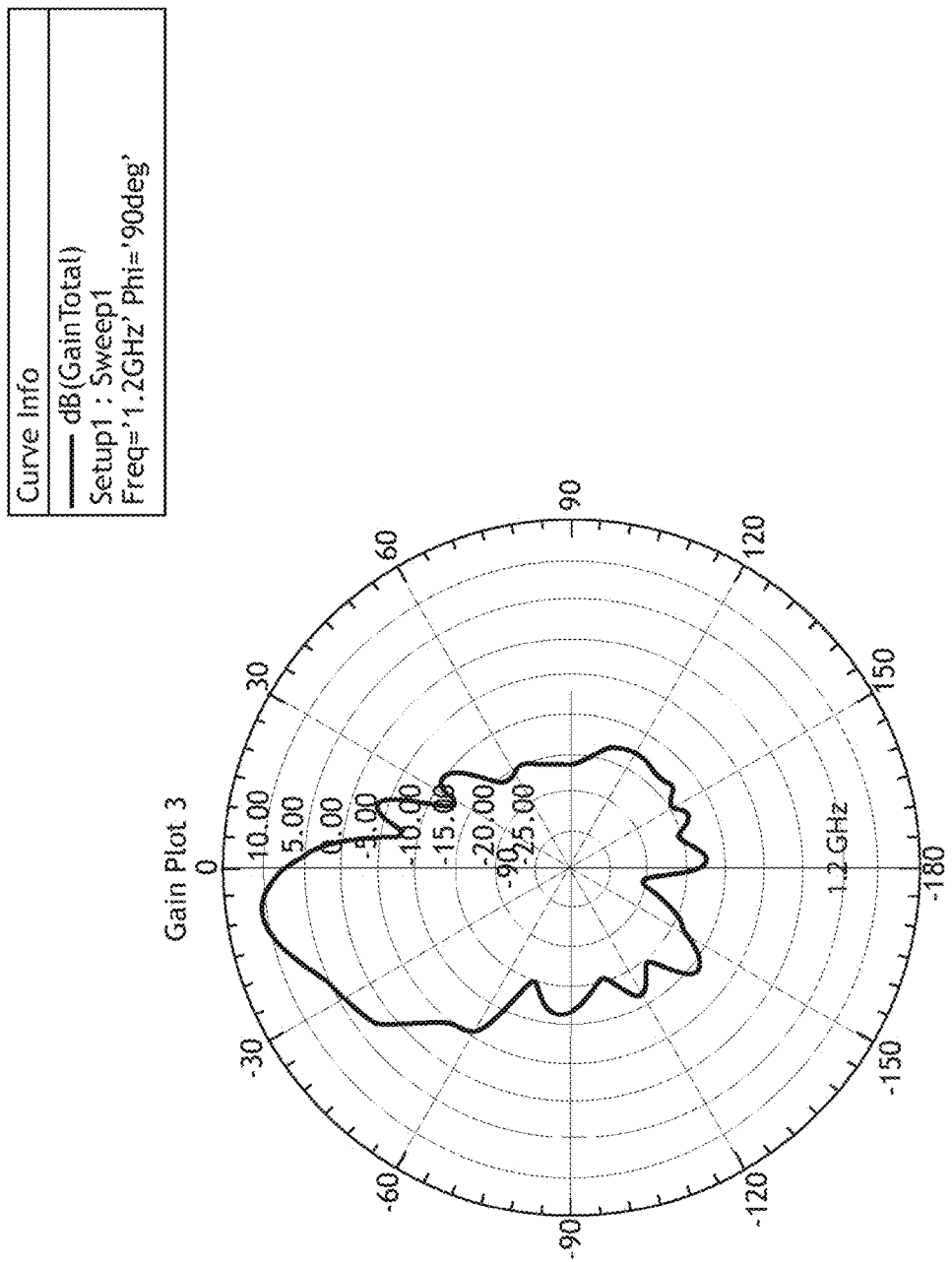
FIG. 15C shows a Φ=90° cut radiation pattern produced by a log periodic antenna according to an exemplary embodiment.
Figure 15D:
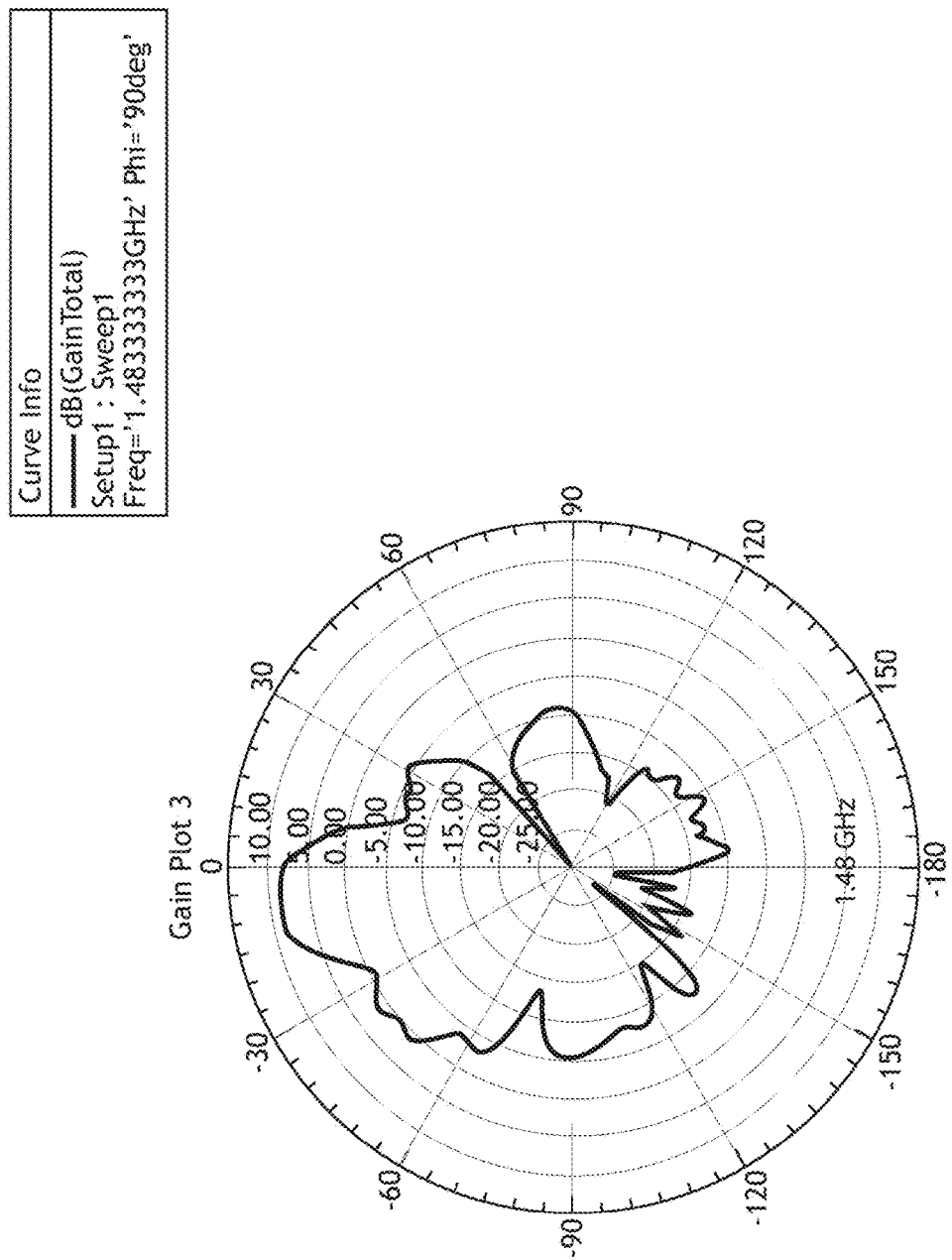
FIG. 15D shows a Φ=90° cut radiation pattern produced by a log periodic antenna according to an exemplary embodiment.
Figure 15E:
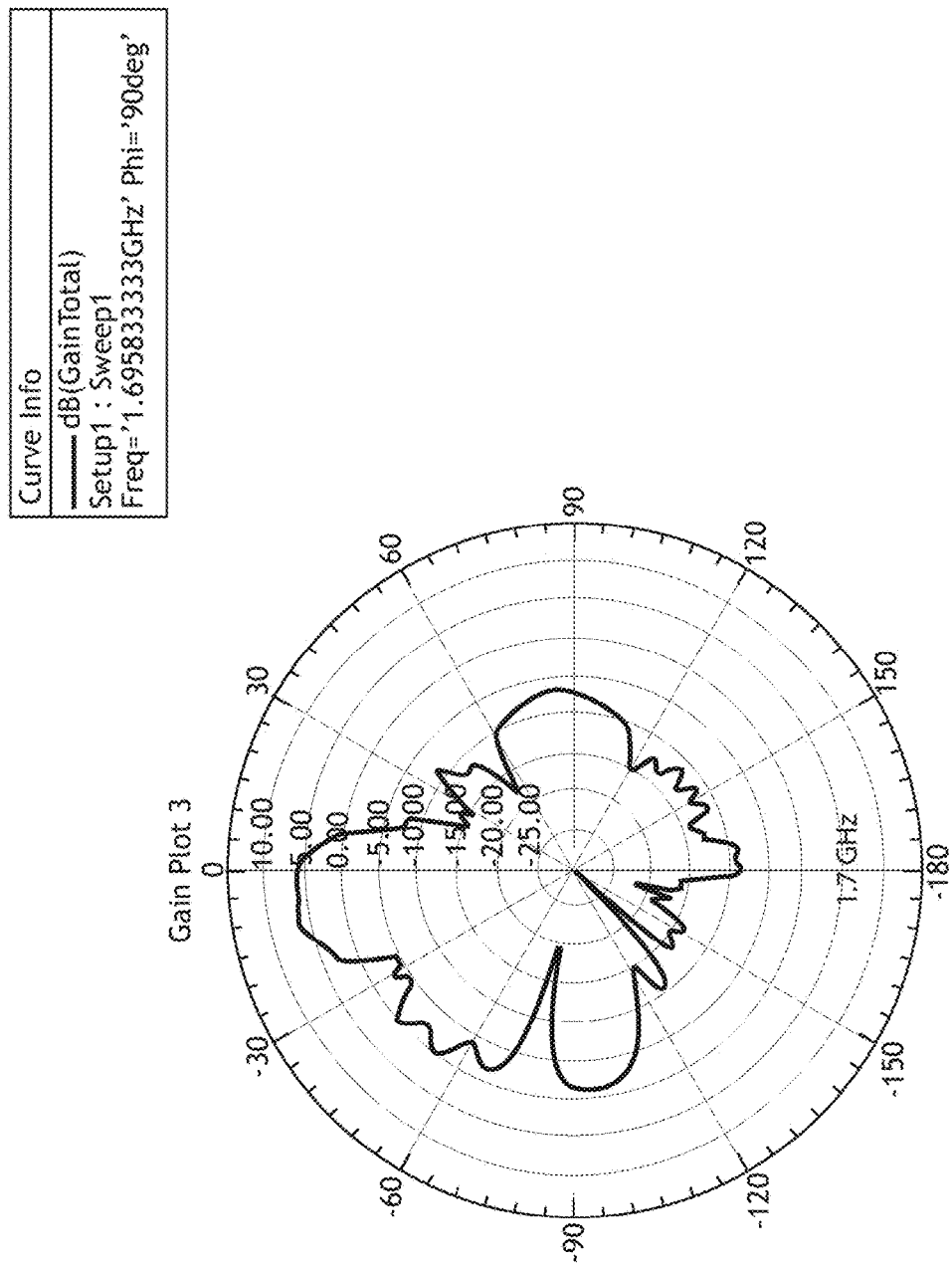
FIG. 15E shows a Φ=90° cut radiation pattern produced by a log periodic antenna according to an exemplary embodiment.
Figure 15F:
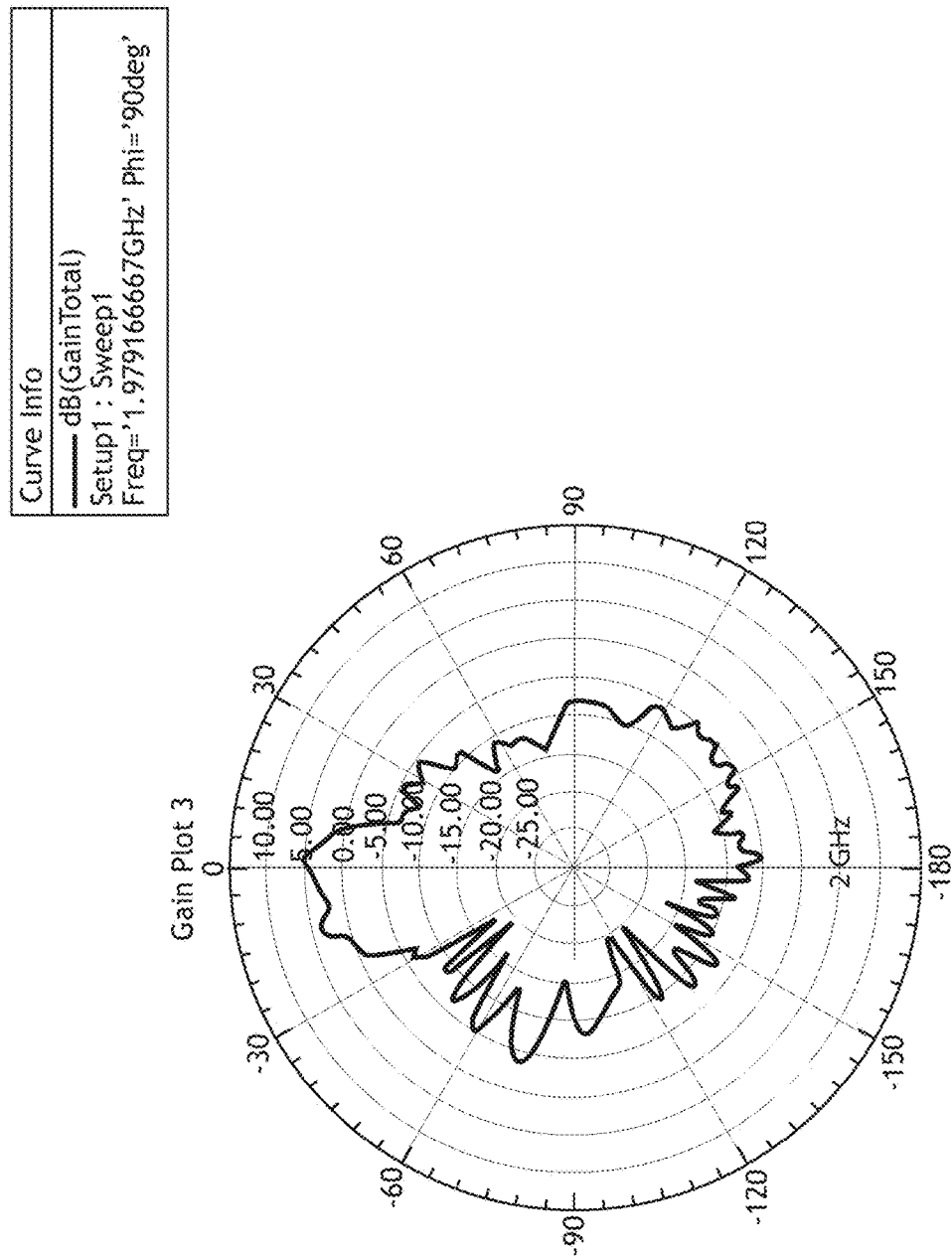
FIG. 15F shows a Φ=90° cut radiation pattern produced by a log periodic antenna according to an exemplary embodiment.
Figure 16A:
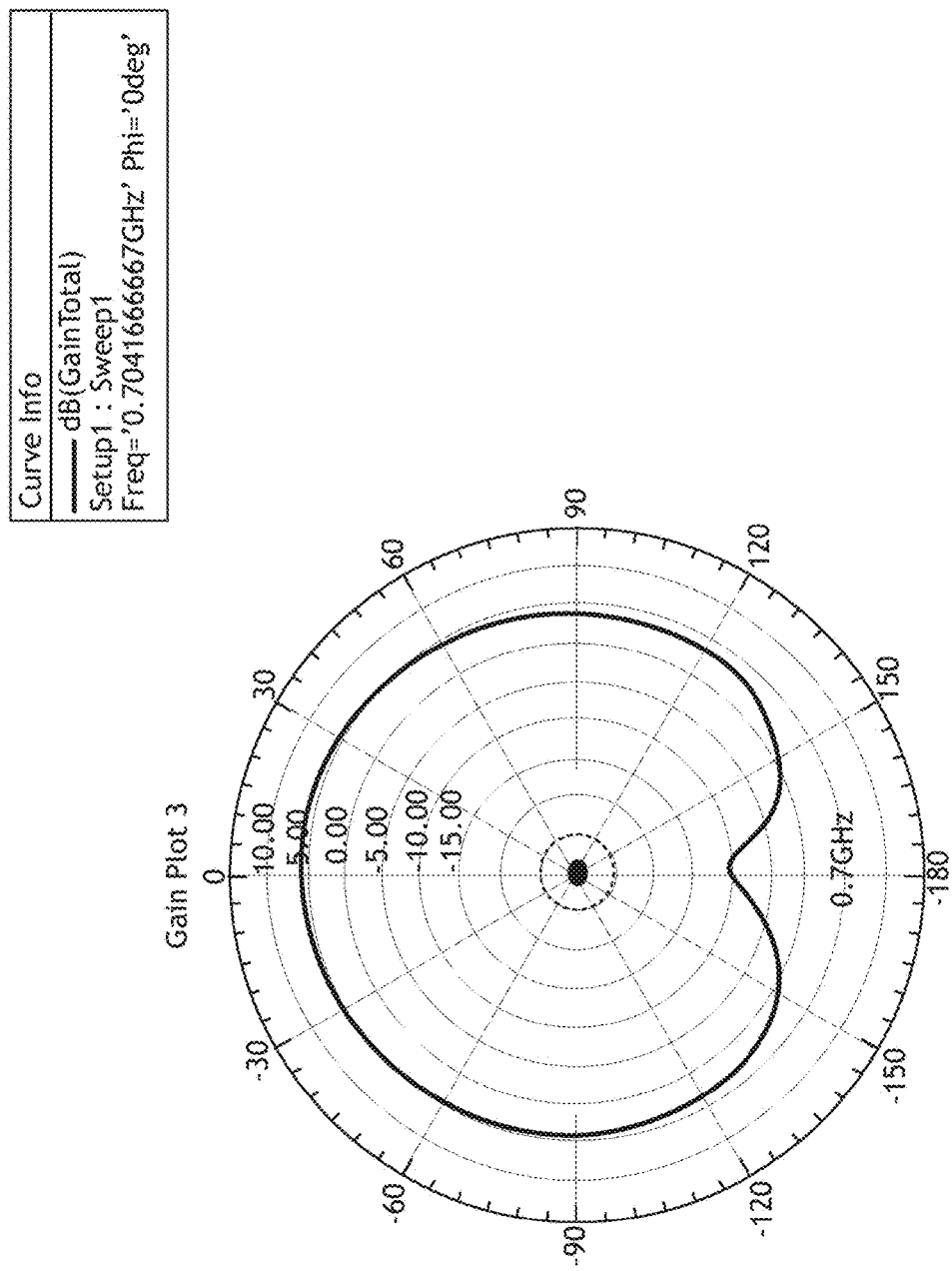
FIG. 16A shows a Φ=0° (Roll cut) radiation pattern produced by a log periodic antenna according to an exemplary embodiment.
Figure 16B:
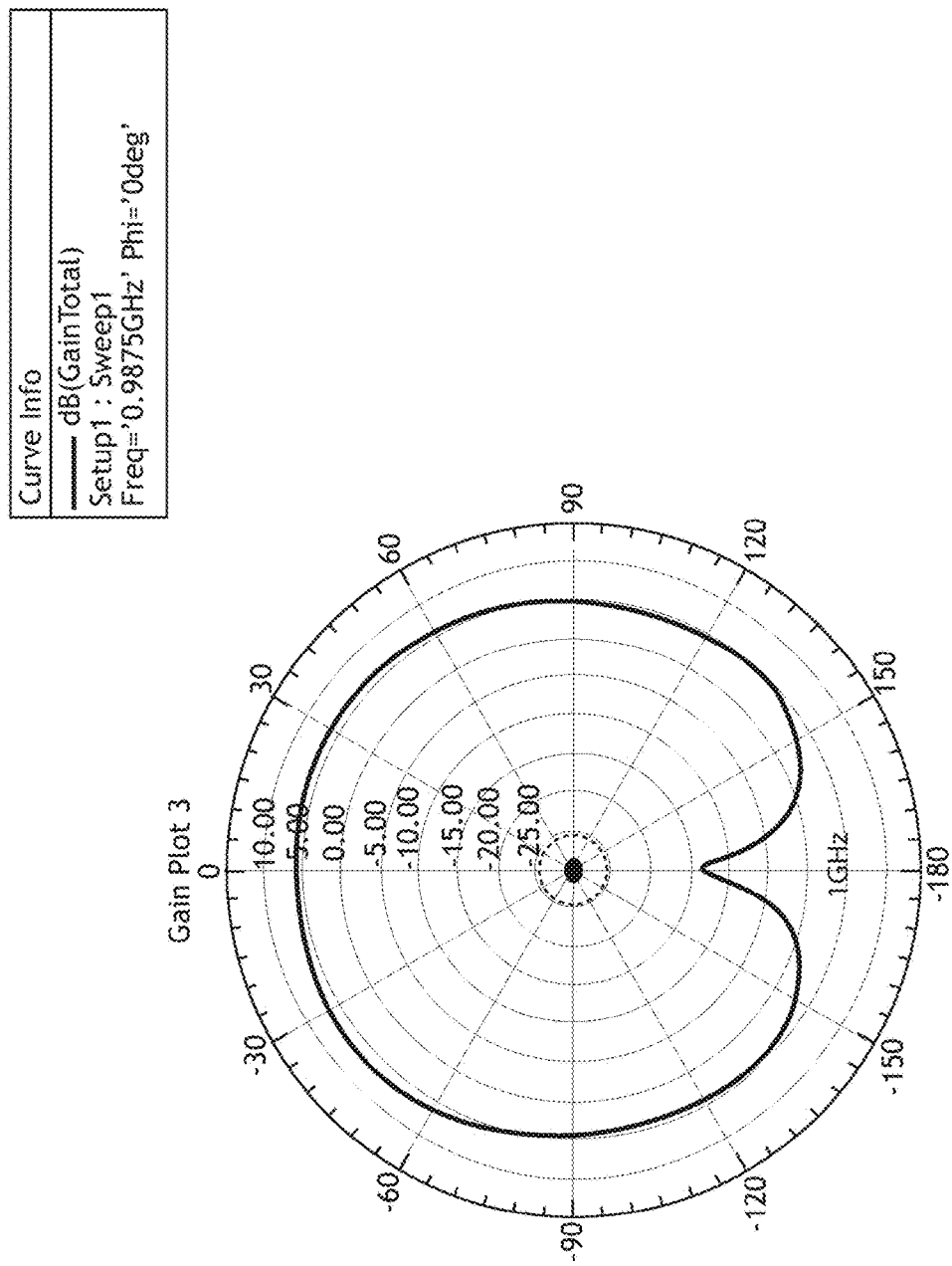
FIG. 16B shows a Φ=0° cut radiation pattern produced by a log periodic antenna according to an exemplary embodiment.
Figure 16C:
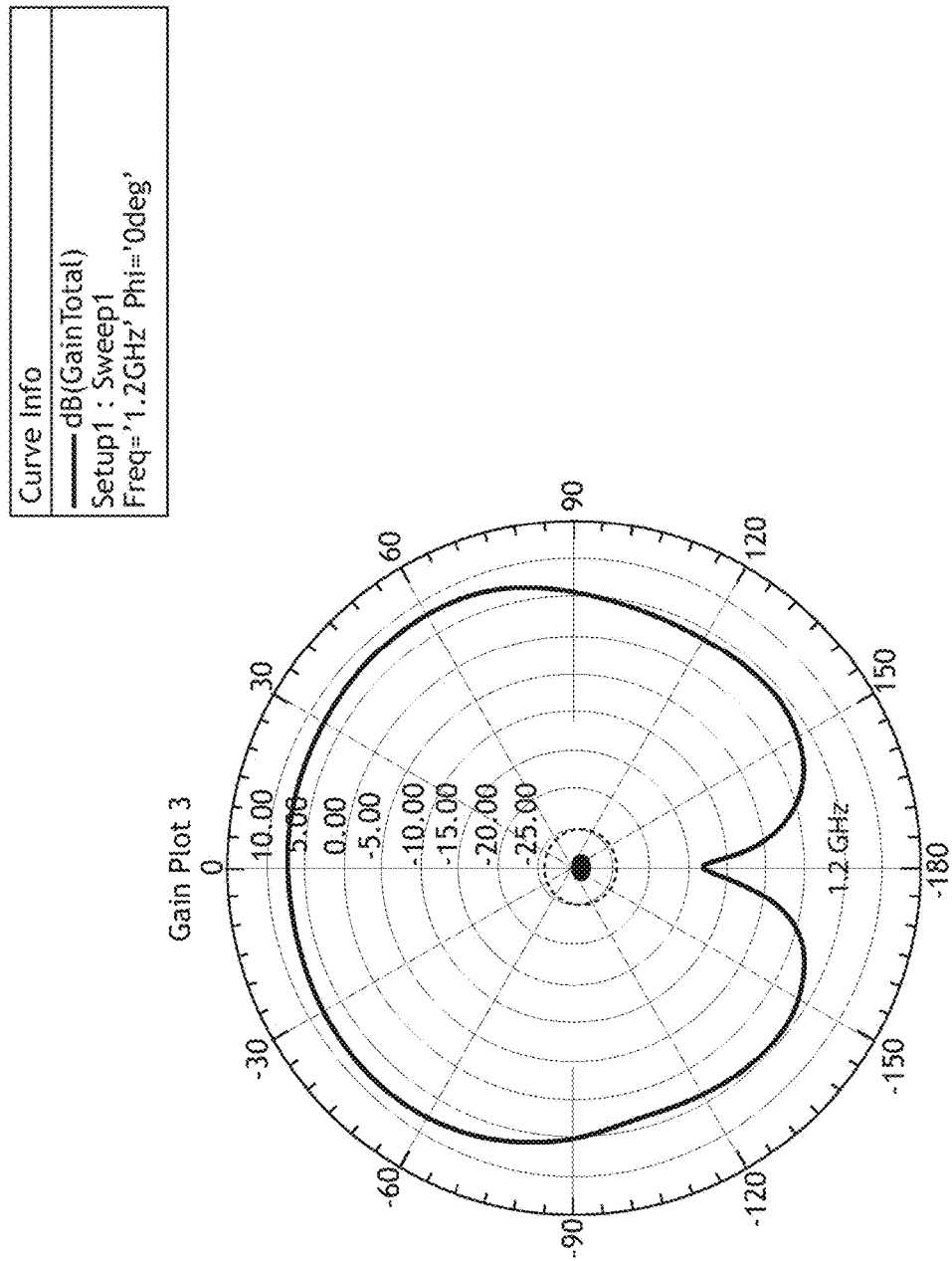
FIG. 16C shows a Φ=0° cut radiation pattern produced by a log periodic antenna according to an exemplary embodiment.
Figure 16D:
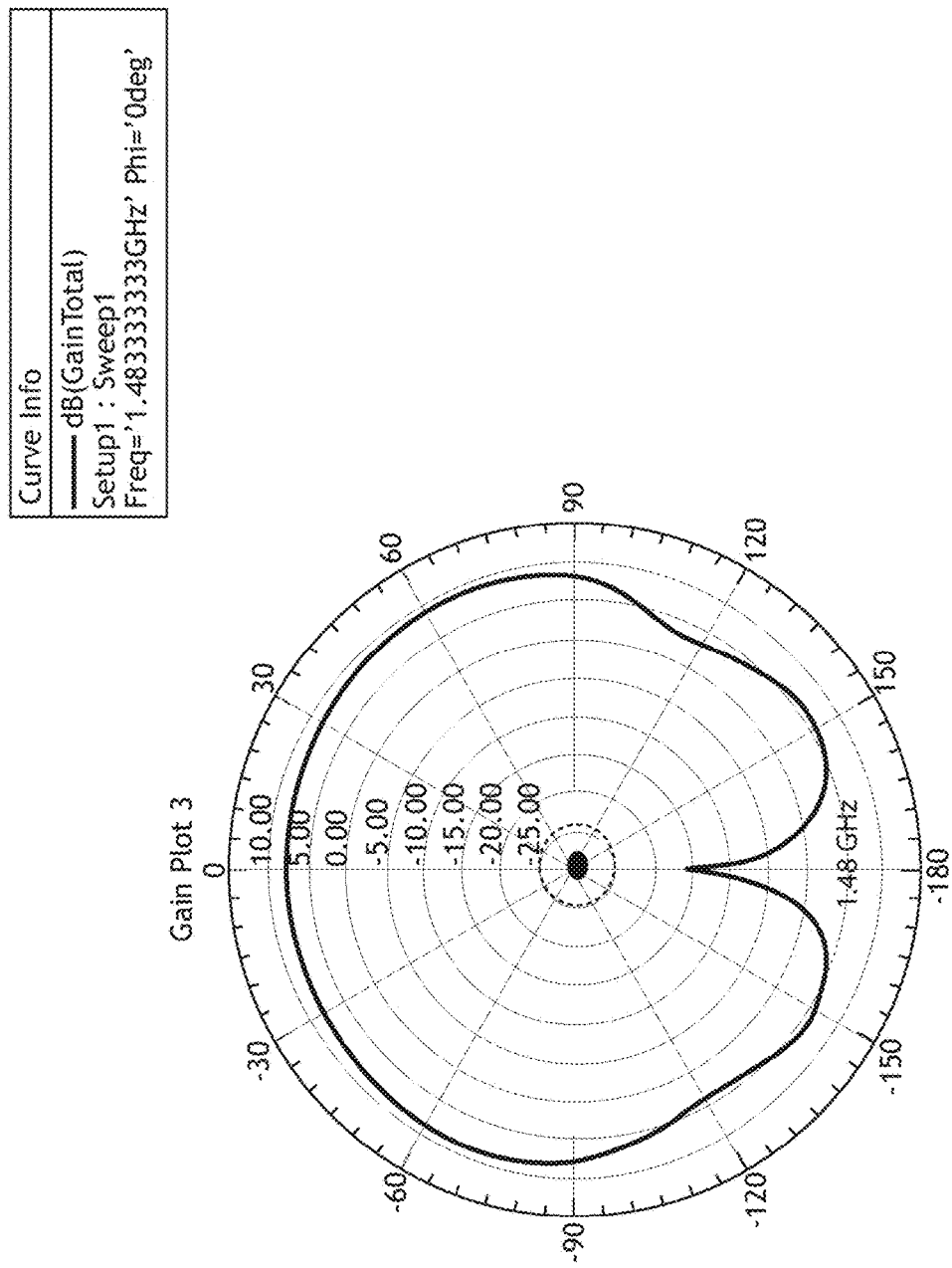
FIG. 16D shows a Φ=0° cut radiation pattern produced by a log periodic antenna according to an exemplary embodiment.
Figure 16E:
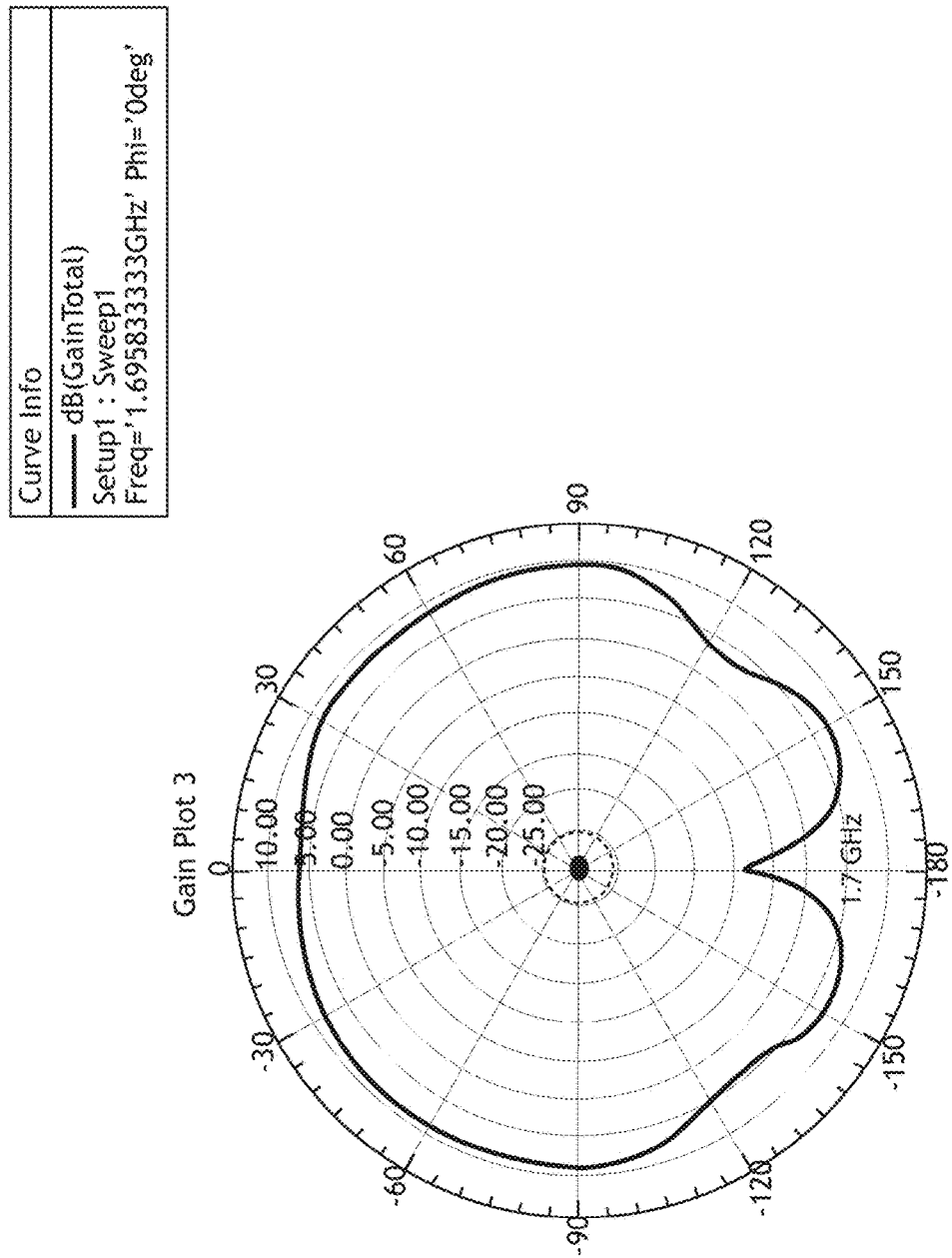
FIG. 16E shows a Φ=0° cut radiation pattern produced by a log periodic antenna according to an exemplary embodiment.
Figure 16F:
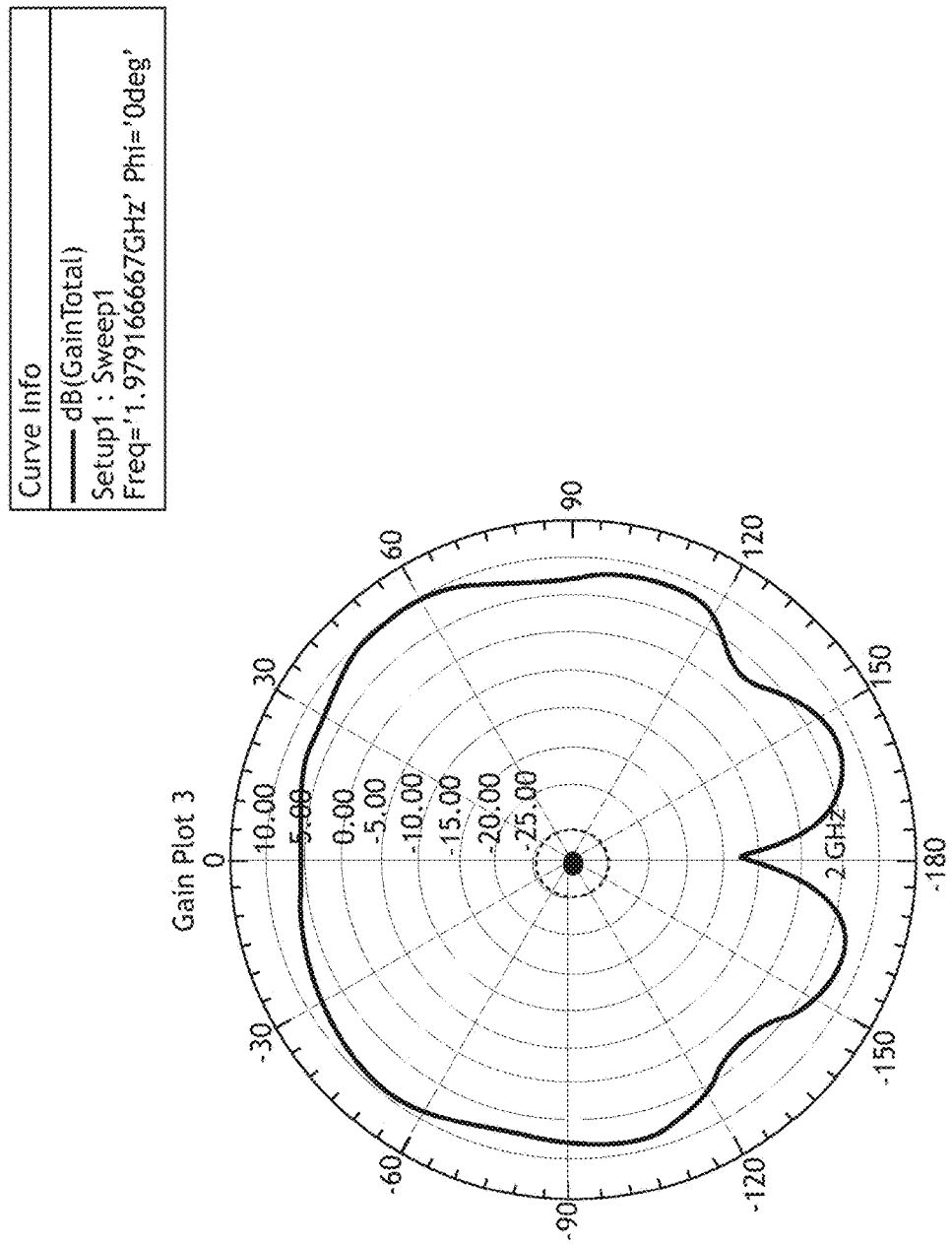
FIG. 16F shows a Φ=0° cut radiation pattern produced by a log periodic antenna according to an exemplary embodiment.
Figure 17A:
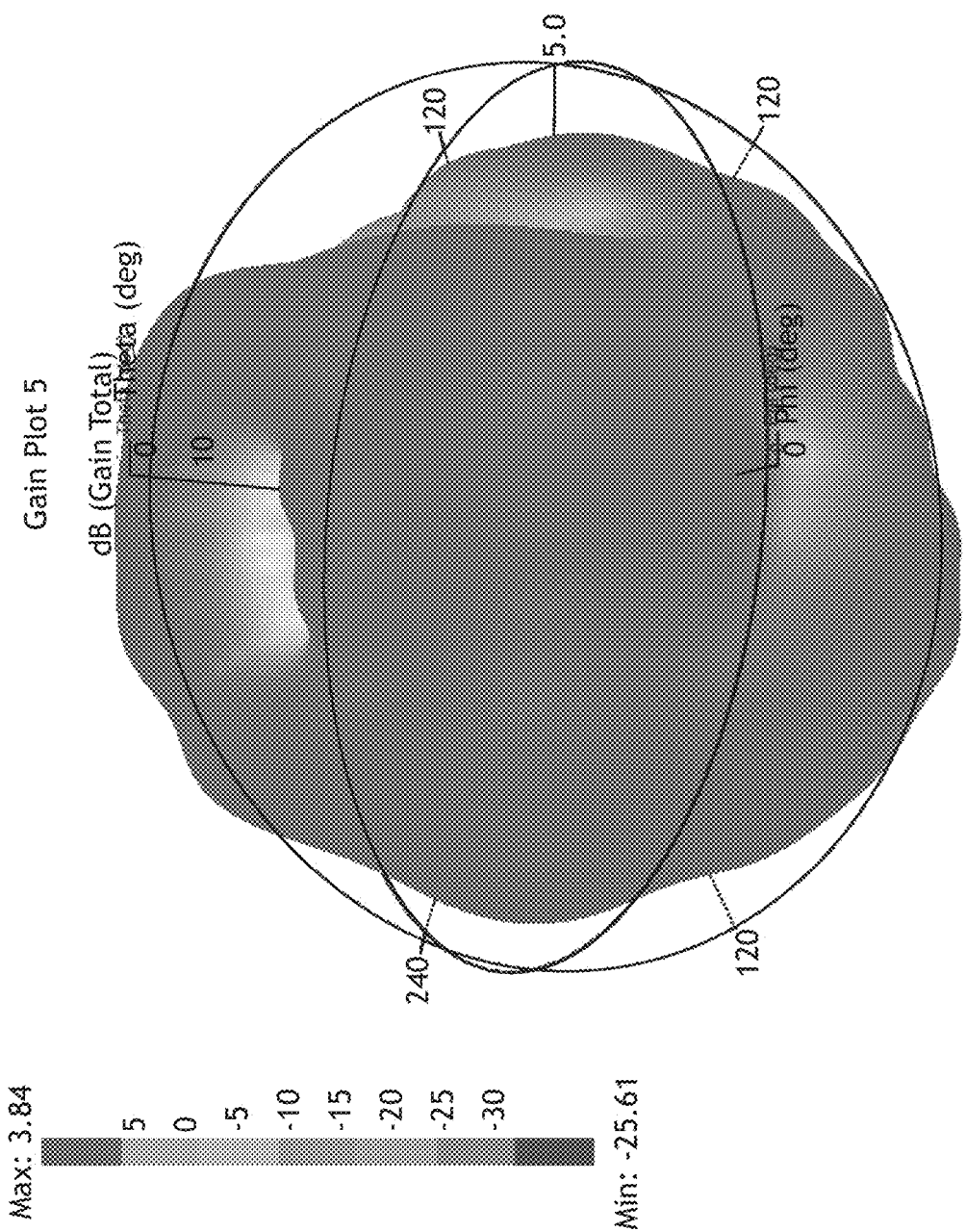
FIG. 17A shows a 3D radiation pattern produced by a log periodic antenna according to an exemplary embodiment.
Figure 17B:
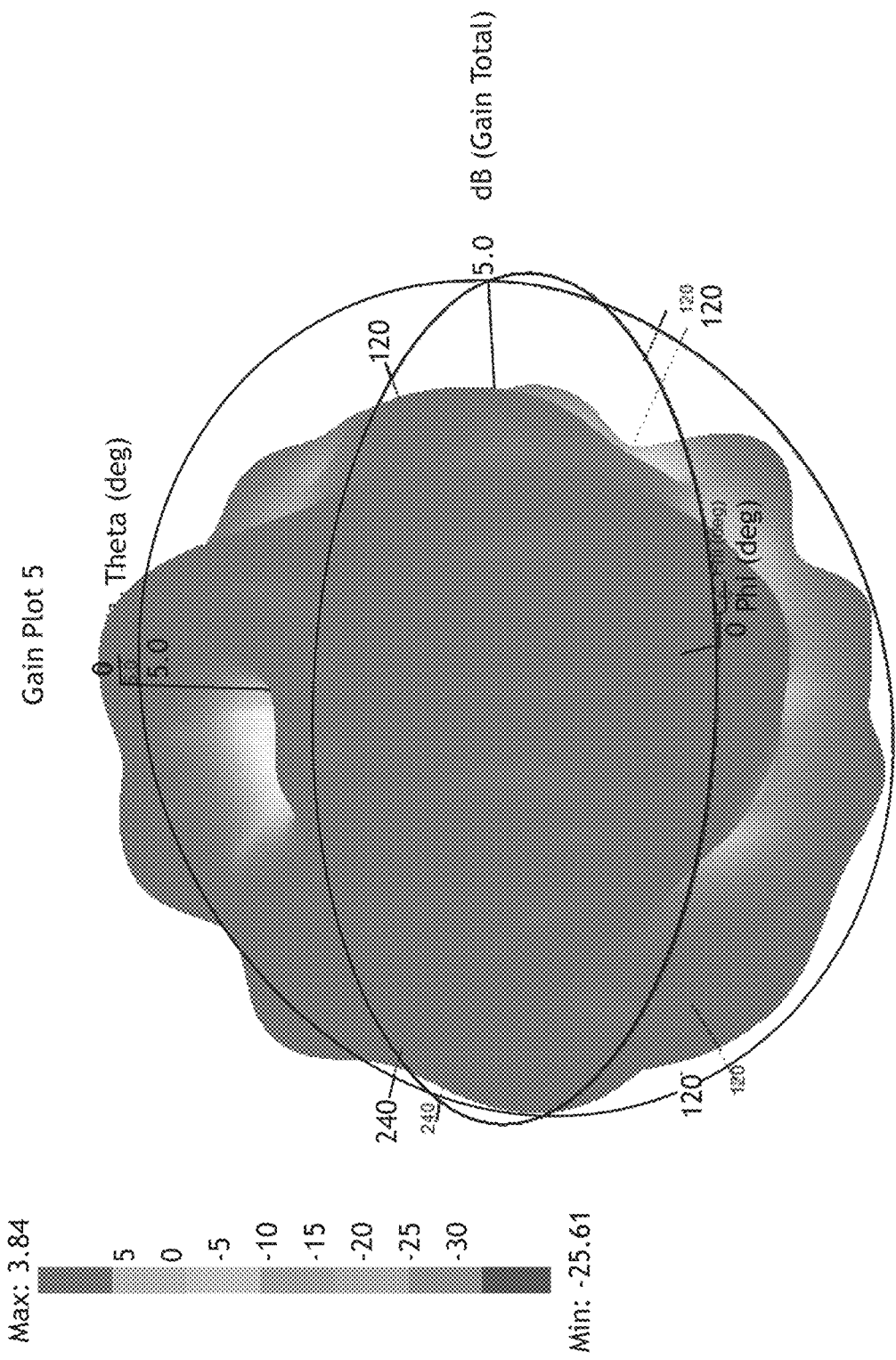
FIG. 17B shows a 3D radiation pattern produced by a log periodic antenna according to an exemplary embodiment.
Figure 17C:
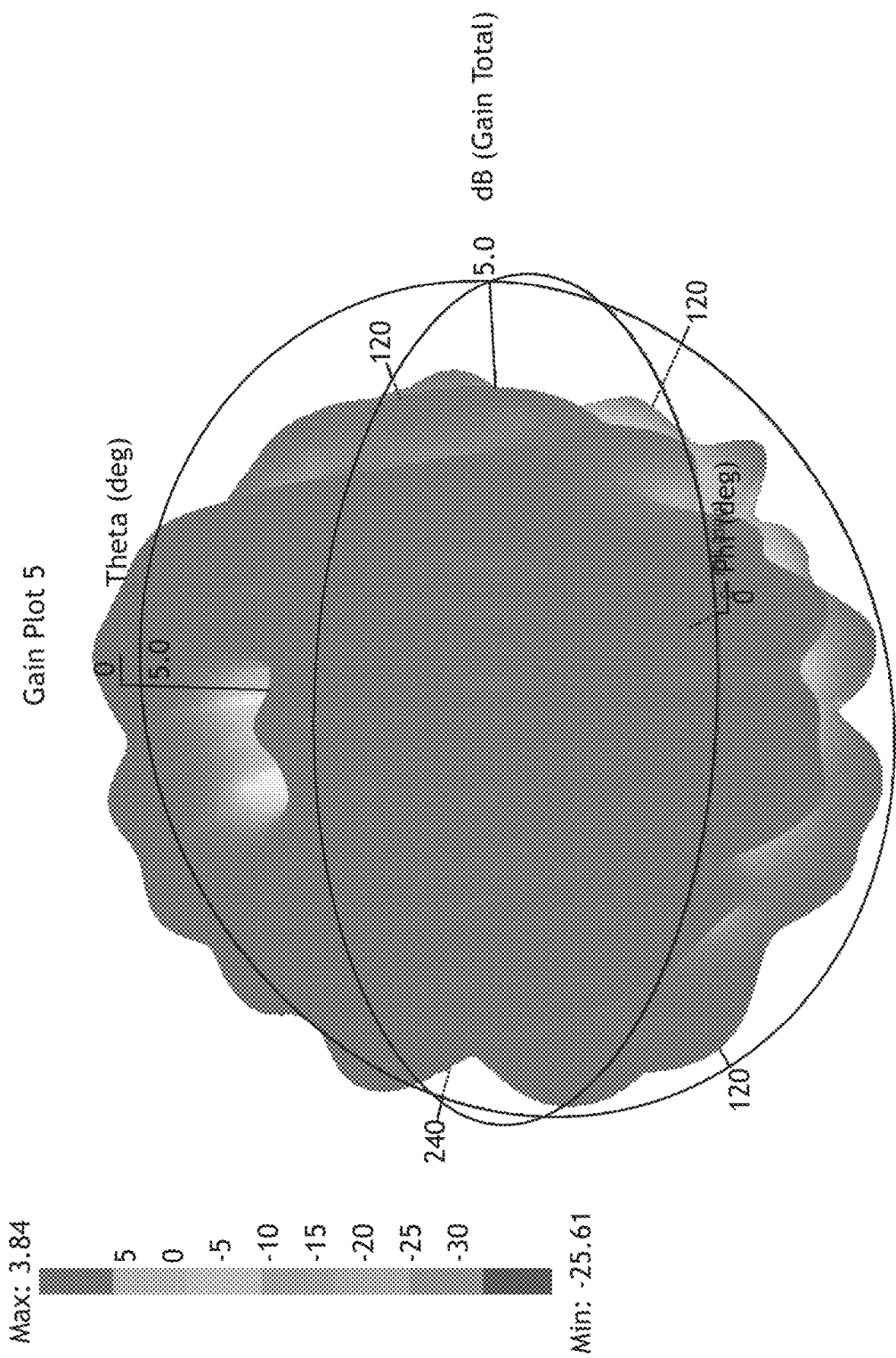
FIG. 17C shows a 3D radiation pattern produced by a log periodic antenna according to an exemplary embodiment.
Figure 17D:
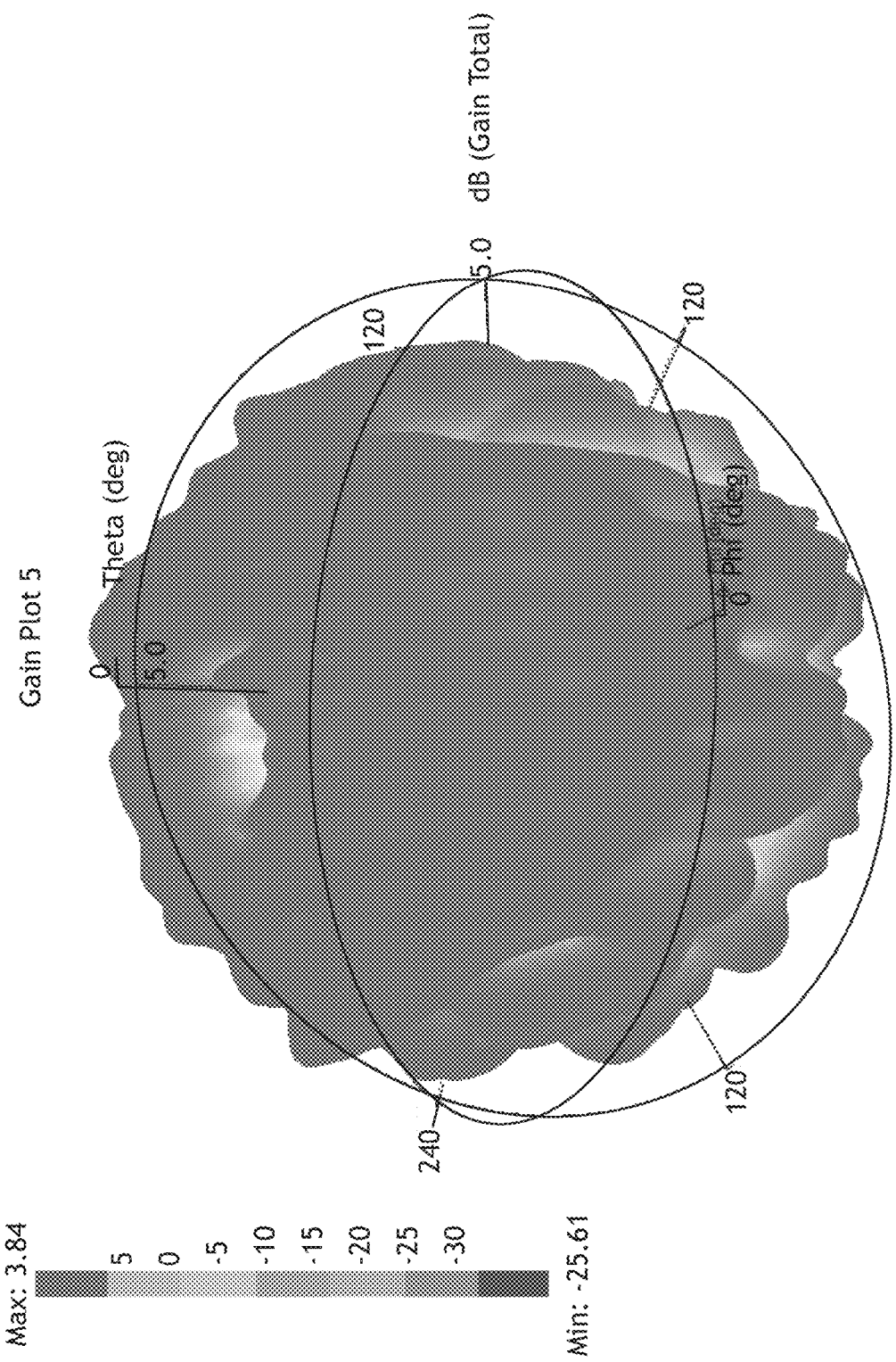
FIG. 17D shows a 3D radiation pattern produced by a log periodic antenna according to an exemplary embodiment.
Figure 18A:
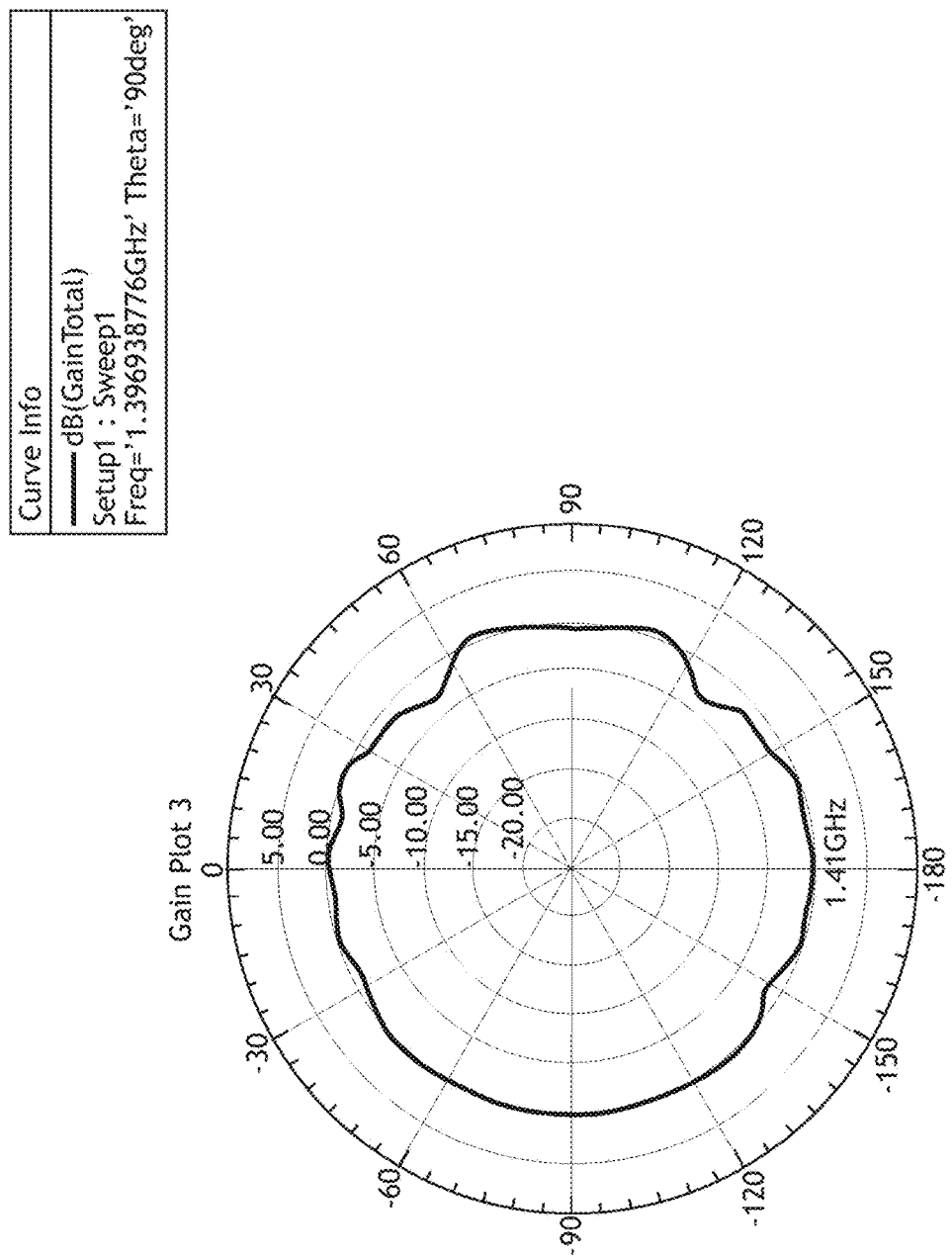
FIG. 18A shows a Φ=90° (Elevation cut) radiation pattern produced by a log periodic antenna according to an exemplary embodiment.
Figure 18B:
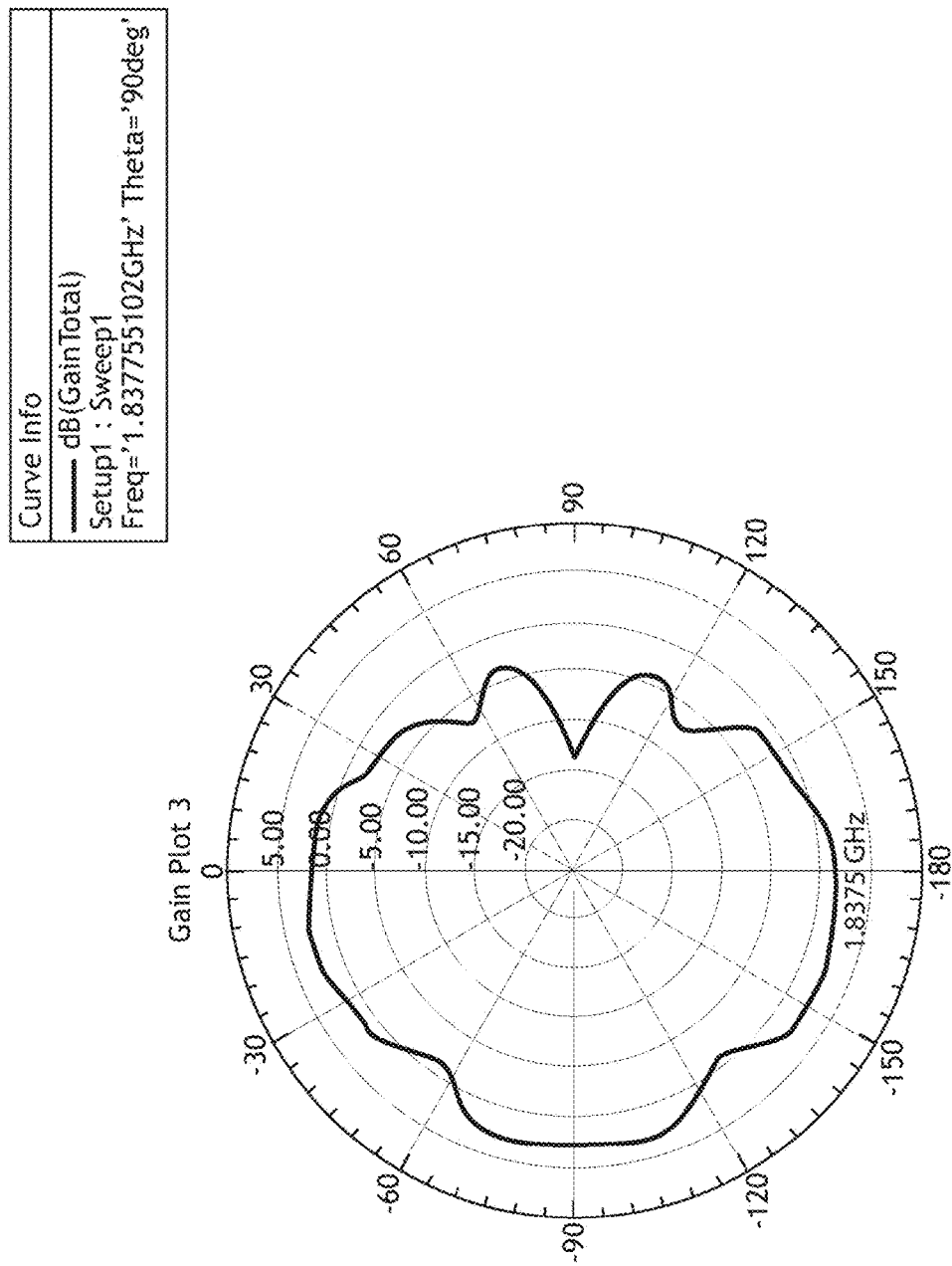
FIG. 18B shows a Φ=90° cut radiation pattern produced by a log periodic antenna according to an exemplary embodiment.
Figure 18C:
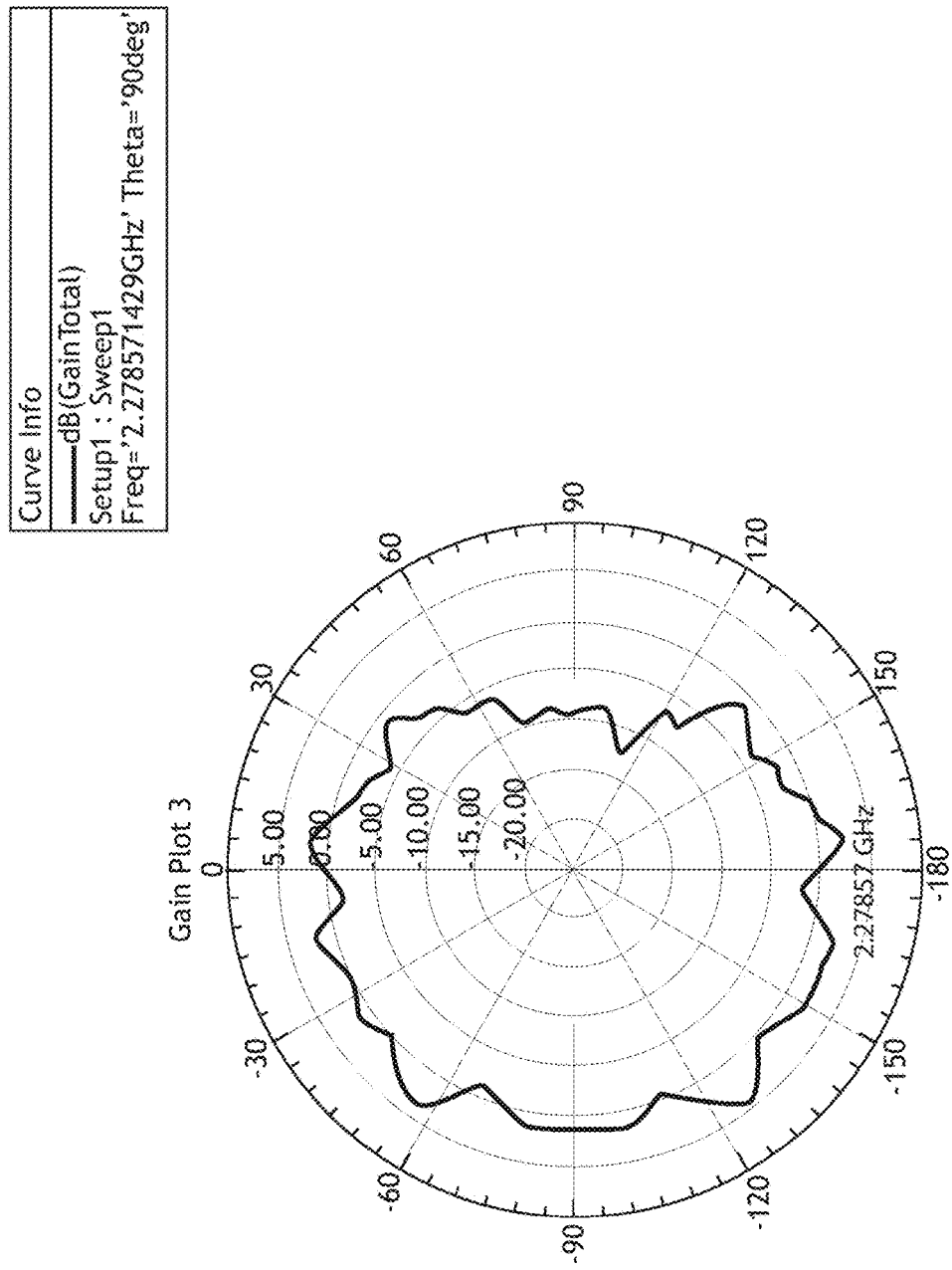
FIG. 18C shows a Φ=90° cut radiation pattern produced by a log periodic antenna according to an exemplary embodiment.
Figure 18D:
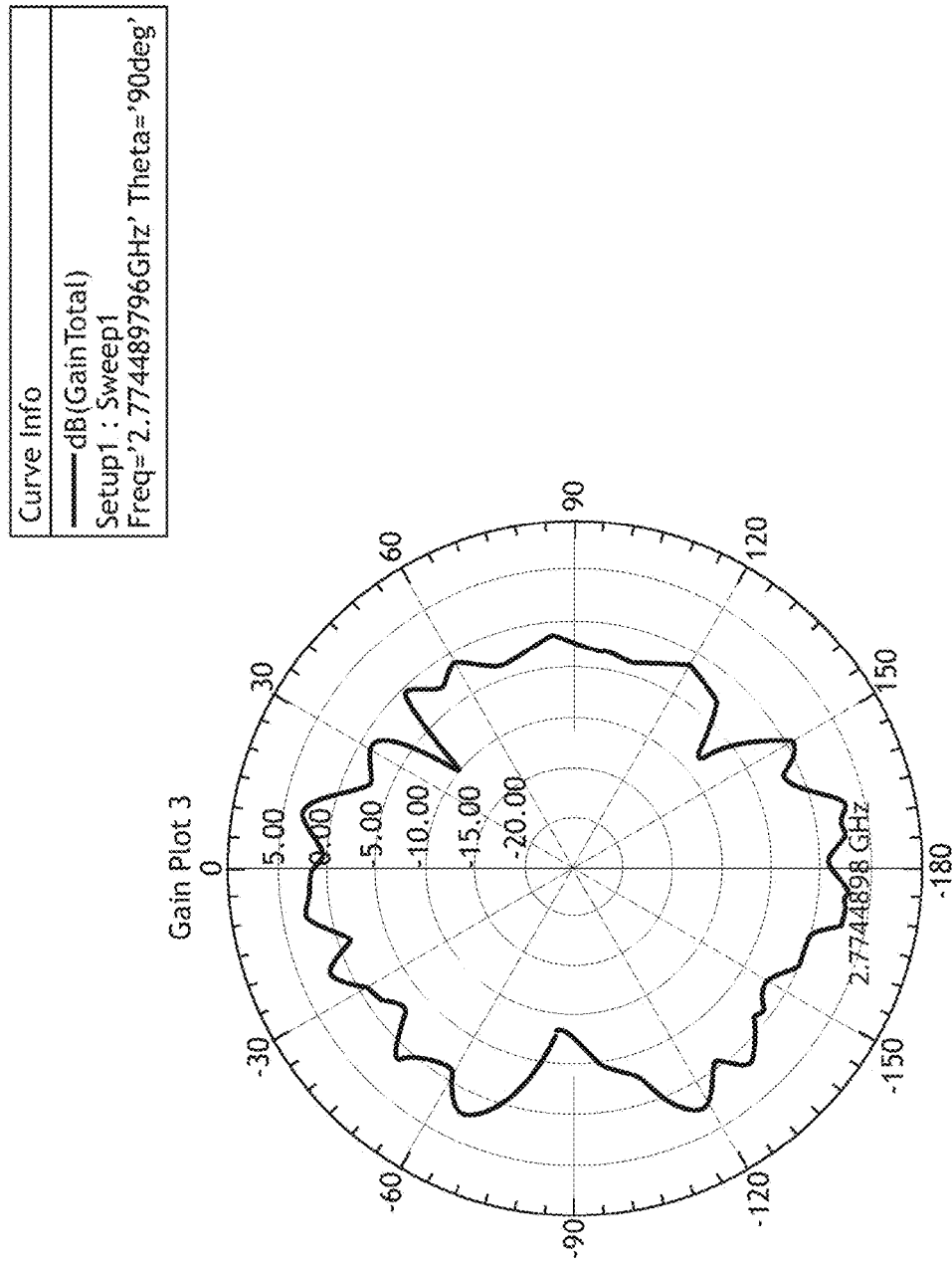
FIG. 18D shows a Φ=90° cut radiation pattern produced by a log periodic antenna according to an exemplary embodiment.
Figure 18E:
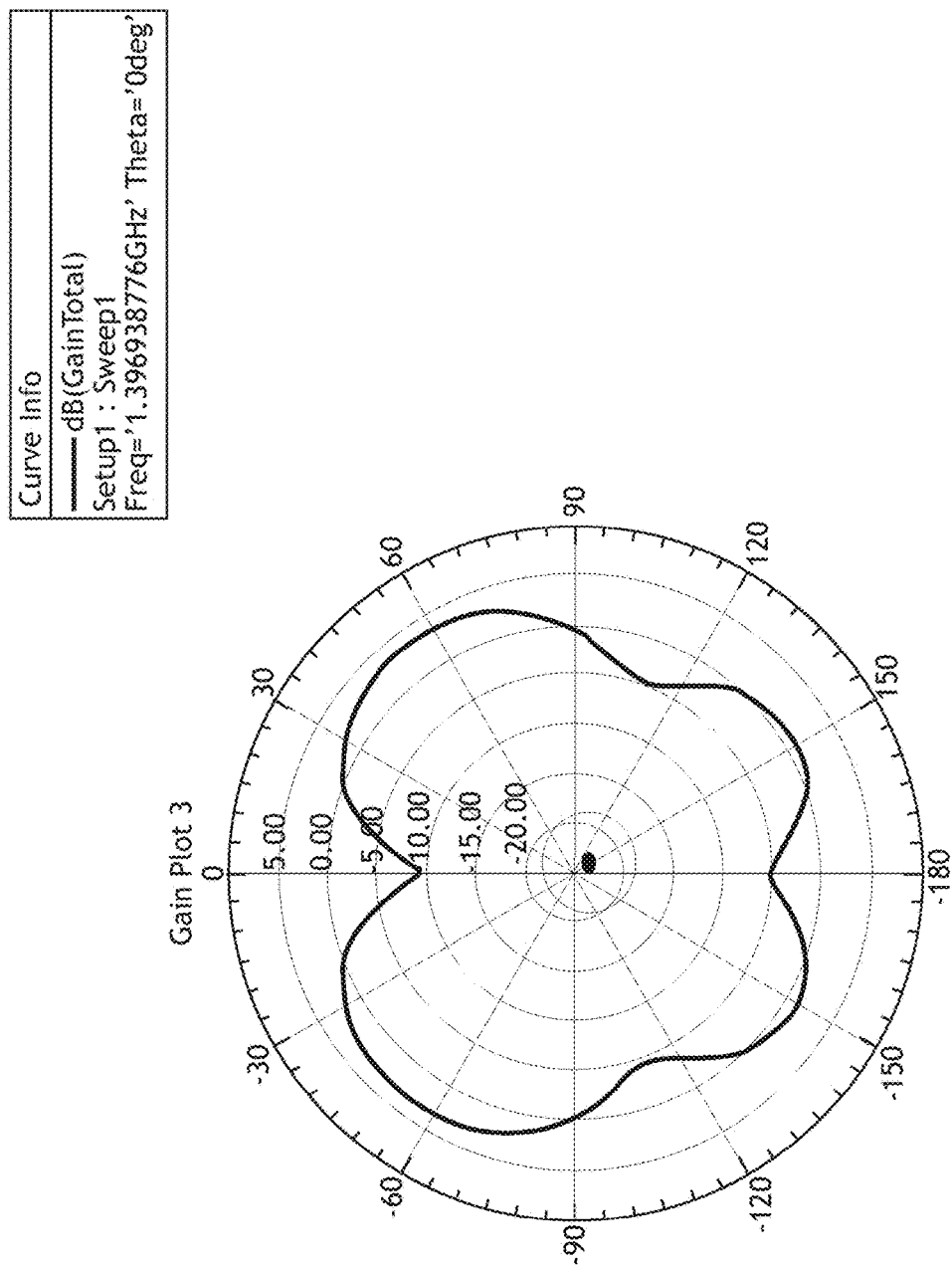
FIG. 18E shows a Φ=0° (Roll cut) radiation pattern produced by a log periodic antenna according to an exemplary embodiment.
Figure 18F:
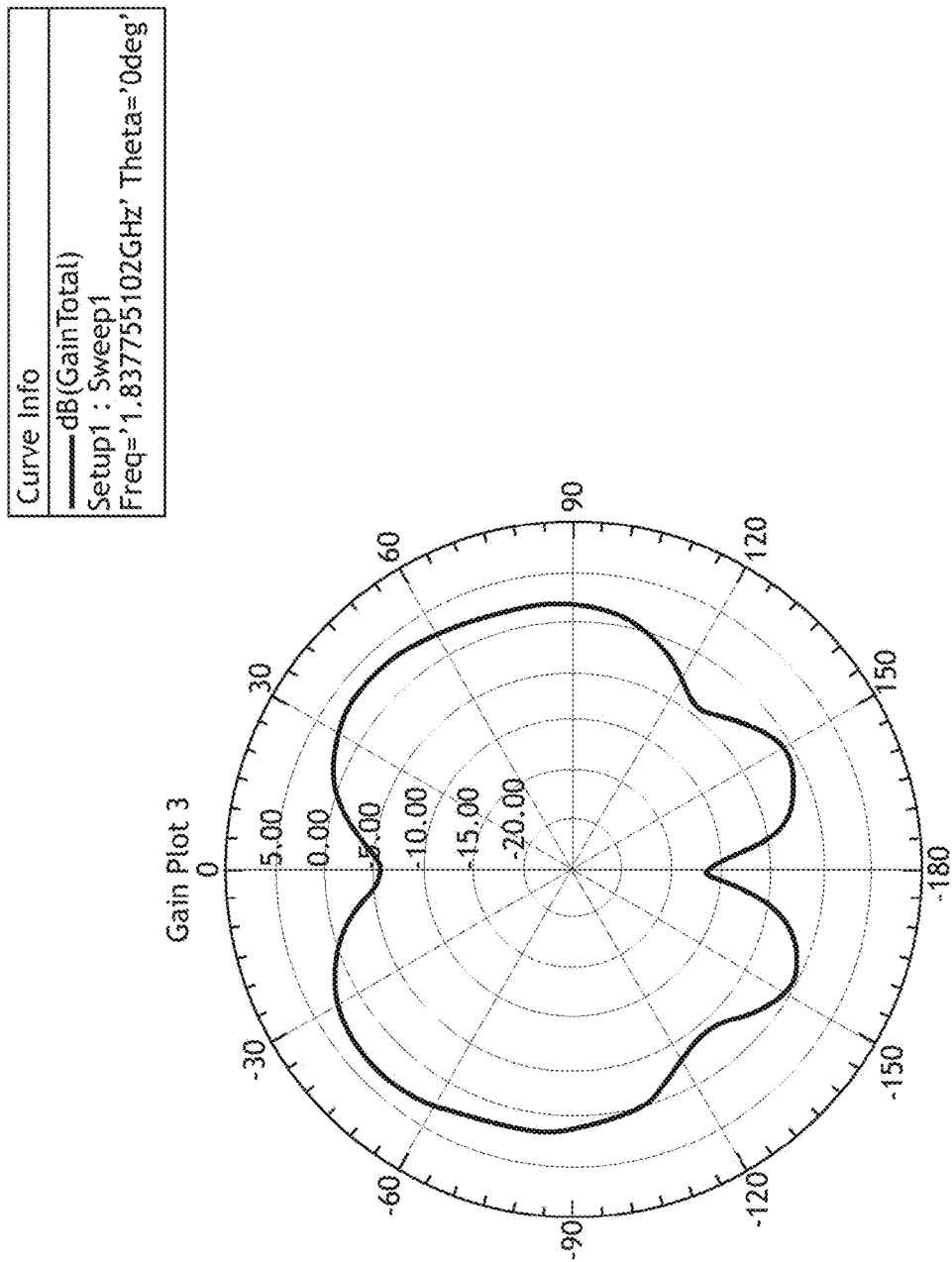
FIG. 18F shows a Φ=0° cut radiation pattern produced by a log periodic antenna according to an exemplary embodiment.
Figure 18G:
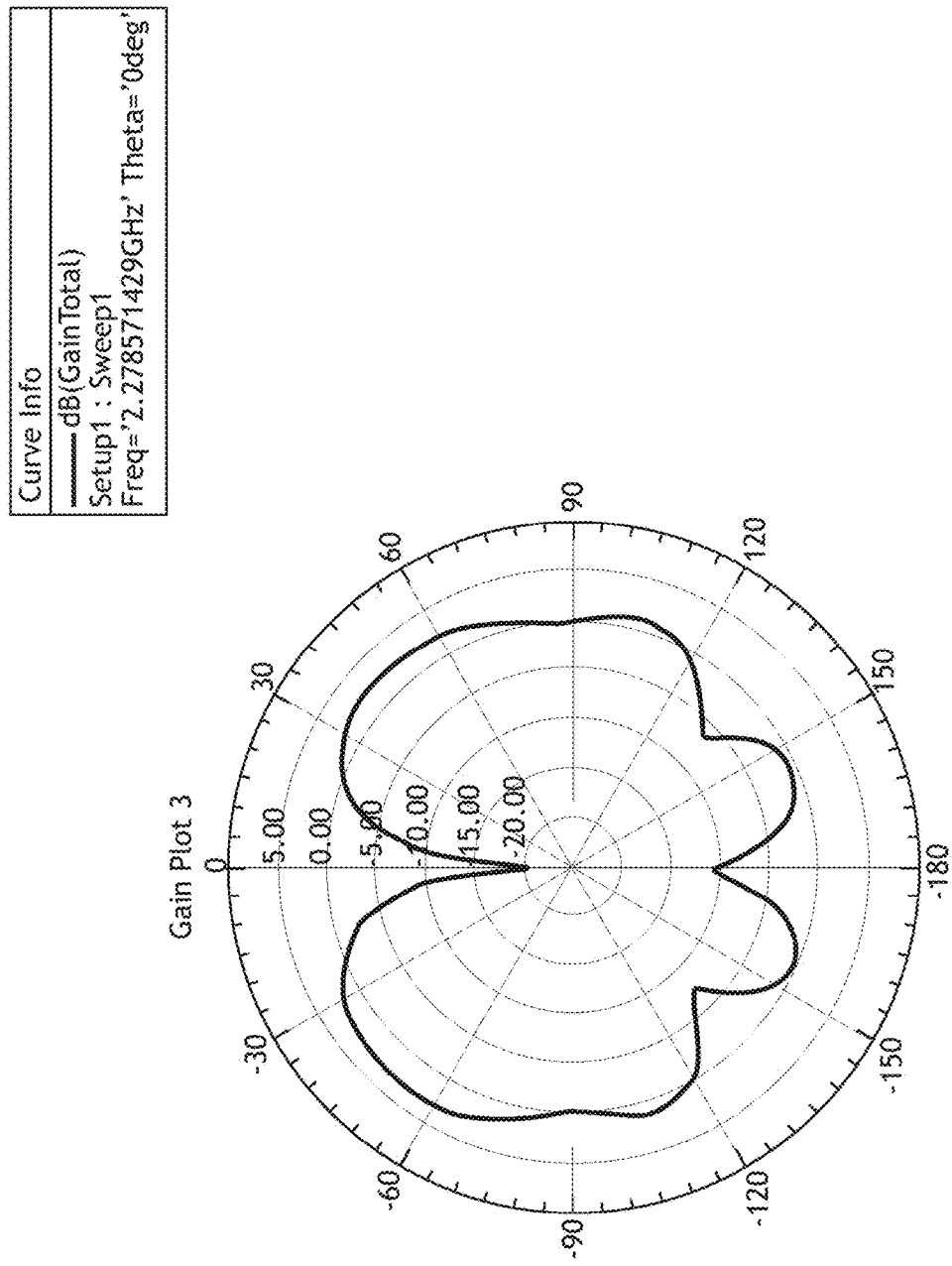
FIG. 18G shows a Φ=0° cut radiation pattern produced by a log periodic antenna according to an exemplary embodiment.
Figure 18H:
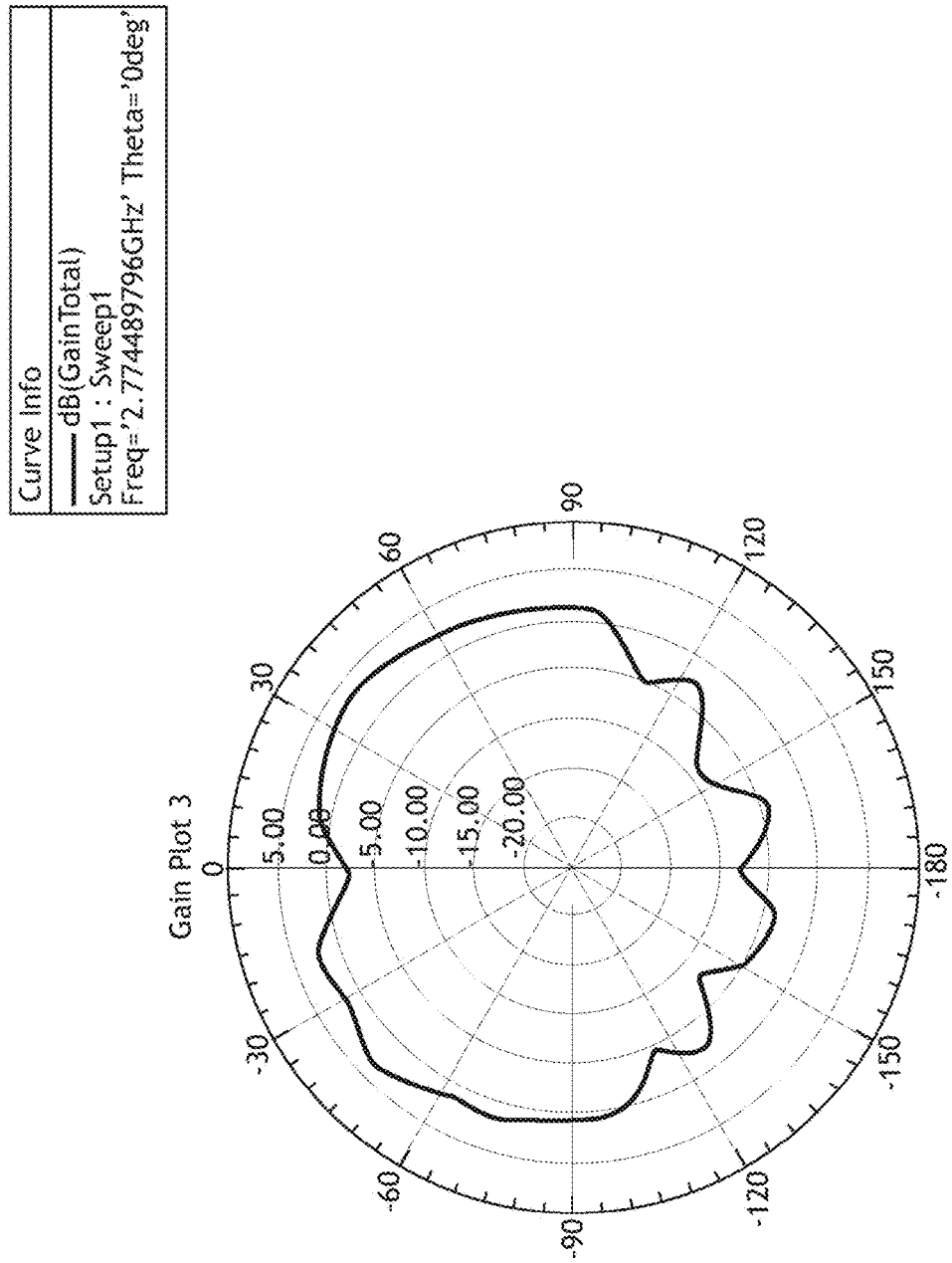
FIG. 18H shows a Φ=0° cut radiation pattern produced by a log periodic antenna according to an exemplary embodiment.

Referring to FIG. 13, a perspective view of an antenna with conformal log periodic radiating elements according to an exemplary embodiment is shown. The radiating elements 1302, 1304, 1306, 1308, 1310, 1312, 1314, 1316, 1318, 1320 generally conform to the shape of the antenna 1300 structure. In at least one embodiment, the antenna 1300 structure may comprise diminishing radii associated with each radiating element 1302, 1304, 1306, 1308, 1310, 1312, 1314, 1316, 1318, 1320. Conformal log periodic radiating elements 1302, 1304, 1306, 1308, 1310, 1312, 1314, 1316, 1318, 1320 provide an antenna structure with higher gain and bandwidth than available with existing low-profile antennas. Furthermore, the conformal radiating elements 1302, 1304, 1306, 1308, 1310, 1312, 1314, 1316, 1318, 1320 produce a broader field of view than existing log periodic arrays. It may be appreciated that exemplary antennas 1300 shown herein are truncated fuselage tubes, but other embodiments are envisioned with a log periodic array of radiating elements 1302, 1304, 1306, 1308, 1310, 1312, 1314, 1316, 1318, 1320 driven by a feed layer architecture described herein.

With respect to FIGS. 14A-16F, radiation patterns for a 10-element array (such as in FIG. 13) are shown. The amplitude tapering, which may be implemented with low-pass filters has been applied to ensure excitation of the fundamental mode and suppression of all higher order modes. In one exemplary embodiment, where the array is configured to operate between 0.7 GHz and 2.0, all of the radiating element are driven with a phase shift of 0°. Between 0.7 GHz and 1.0 GHz, all radiating elements are driven at a magnitude of 1; at 1.2 GHz, the first radiating element is driven at a magnitude of 0.5 and the fifth and sixth radiating elements are driven at a magnitude of 0 while the rest of the elements are driven at a magnitude of 1; at 1.48 GHz, the first, second, and third radiating elements are driven at a magnitude of 0 while the fourth radiating element is driven at a magnitude of 0.5 and the rest of the elements are driven at a magnitude of 1; at 1.7 GHz, the first, second, third, and fourth radiating elements are driven at a magnitude of 0 while the fifth radiating element is driven at a magnitude of 0.5 and the rest of the elements are driven at a magnitude of 1; and at 2.0 GHz, the first, second, third, fourth, and fifth radiating elements are driven at a magnitude of 0 while the sixth radiating element is driven at a magnitude of 0.5 and the rest of the elements are driven at a magnitude of 1.

Referring to FIGS. 14A-14F, a perspective view of radiation patterns produced by a ten element log periodic antenna according to an exemplary embodiment are shown. Radiation patterns at 0.7 GHz (FIG. 14A), 1 GHz (FIG. 14B), 1.2 GHz (FIG. 14C), 1.48 GHz (FIG. 14D), 1.7 GHz (FIG. 14E), and 2 GHz (FIG. 14F) are shown. As compared to five element arrays, ten element conformal log periodic antennas demonstrate low ripple across the frequency range, higher gain, and narrower beam width.

Referring to FIGS. 15A-15F, elevation cut of radiation patterns produced by a ten element log periodic antenna according to an exemplary embodiment are shown. Radiation patterns at 0.7 GHz (FIG. 15A), 1 GHz (FIG. 15B), 1.2 GHz (FIG. 15C), 1.48 GHz (FIG. 15D), 1.7 GHz (FIG. 15E), and 2 GHz (FIG. 15F) are shown. Where the radiating elements are disposed along the fuselage axis, mobile platform may affect beam elevation.

Referring to FIGS. 16A-16F, roll cut of radiation patterns produced by a ten element log periodic antenna according to an exemplary embodiment are shown. Radiation patterns at 0.7 GHz (FIG. 16A), 1 GHz (FIG. 16B), 1.2 GHz (FIG. 16C), 1.48 GHz (FIG. 16D), 1.7 GHz (FIG. 16E), and 2 GHz (FIG. 16F) are shown. In an end view along the axis of the antenna, the conformal radiating element produce a highly symmetrical radiating pattern about the antenna axis. Additional rotationally/axial symmetry can be achieved with additional log periodic arrays disposed on the antenna and offset radially about the axis.

With respect to FIGS. 17A-18H, radiation patterns for a 5-element array (such as in FIG. 5B) are shown. The radiating elements are excited such that a higher order mode is excited while a directly-injected fundamental mode is suppressed. In one exemplary embodiment, where the array is configured to operate between 1.41 GHz and 2.77, all radiating elements are driven with a phase shift of 0°. At 1.41 GHz the first radiating element is driven at a magnitude of 1 while the rest are driven at a magnitude of 0; at 1.8375 GHz the second radiating element is driven at a magnitude of 1 while the rest are driven at a magnitude of 0; at 2.28 GHz the first radiating element is driven at a magnitude of 0.5, third radiating element is driven at a magnitude of 1, and the rest are driven at a magnitude of 0; and at 2.77 GHz the fourth radiating element is driven at a magnitude of 1 while the rest are driven at a magnitude of 0.

Referring to FIGS. 17A-17D, radiation patterns produced by a five element log periodic antenna according to an exemplary embodiment are shown. With selective excitation of a higher-order mode and suppression of a directly-injected fundamental mode as described herein, the antenna may produce lower peak gain but wider beam width than existing log periodic arrays. The cardioid radiation pattern is rotated 90° with respect to the fundamental mode excitation. Because higher-order mode is excited at a frequency which is double the frequency of the fundamental mode, the array may cover the range of 1.4 GHz to 4 GHz. In at least one embodiment, several modes may be combined to enable advanced beam forming.

Referring to FIGS. 18A-18H, radiation patterns produced by a five element log periodic antenna according to an exemplary embodiment are shown. Selective excitation of a higher-order mode and suppression of the directly-injected fundamental mode produces consistent beam elevation (FIGS. 18A-18D) and a high degree of beam symmetry (FIGS. 18E-18H).

Embodiments of the present disclosure generally preserve the radiation pattern across the entire frequency range of the antenna by exciting only the fundamental mode in each radiating element and isolating each element. Alternatively, higher order modes may be excited and fundamental modes suppressed.

The novel log periodic feed concepts as described herein are generally applicable to any class of radiating elements that are generally applicable to log periodic period array application. The parasitic higher order modes of the simple probe fed microstrip patch of the exemplary array shown herein illustrates the power of the mode suppression log periodic array feed innovation.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A feed array for a conformal antenna comprising:
a plurality of phase shifters, each phase shifter associated with a radiating element; and
a plurality of filters, each filter associated with a radiating element,
wherein:
each of the plurality of filters operates in an operating frequency corresponding to a radiating element in a log periodic array of radiating elements to select a desired mode of excitation and suppress undesired modes of excitation;
a first set of phase shifters, filters, and corresponding radiating elements are operated with a first sub-channel isolated polarization; and
a second set of phase shifters, filters, and corresponding radiating elements are operated with a second sub-channel isolated polarization distinct from the first sub-channel isolated polarization.

2. The feed array of claim 1, wherein each of the plurality of filters comprises a bandpass filter.

3. The feed array of claim 2, wherein a pass band of each bandpass filter is defined by an operating frequency of the corresponding radiating element.

4. The feed array of claim 1, wherein each of the plurality of filters comprises a low-pass filter.

5. The feed array of claim 4, wherein a cut off frequency of each low-pass filter is defined by an operating frequency of the corresponding radiating element.

6. The feed array of claim 4, wherein the low-pass filters taper an amplitude of a signal from the corresponding radiating element.

7. A conformal antenna comprising:
a plurality of conformal log periodic radiating elements, each conformal log periodic radiating element being curved to conform to a non-planar surface; and
a feed array comprising:
a plurality of phase shifters, each phase shifter associated with a radiating element in the plurality of log periodic radiating elements; and
a plurality of filters, each filter associated with a radiating element in the plurality of log periodic radiating elements,
wherein:
each of the plurality of filters operates in an operating frequency corresponding to the associated radiating element to select a desired mode of excitation and suppress undesired modes of excitation;

a first set of phase shifters, filters, and corresponding conformal log periodic radiating elements are operated with a first sub-channel isolated polarization; and a second set of phase shifters, filters, and corresponding conformal log periodic radiating elements are operated with a second sub-channel isolated polarization distinct from the first sub-channel isolated polarization.

8. The conformal antenna of claim 7, wherein each of the plurality of filters comprises a bandpass filter.

9. The conformal antenna of claim 8, wherein a pass band of each bandpass filter is defined loan operating frequency of the corresponding radiating element.

10. The conformal antenna of claim 7, wherein each of the plurality of filters comprises a low-pass filter.

11. The conformal antenna of claim 10, wherein a cut off frequency of each low-pass filter is defined by an operating frequency of the corresponding radiating element.

12. The conformal antenna of claim 10, wherein the low-pass filters taper an amplitude of a signal from the corresponding radiating element according to a disposition of the corresponding radiating element with respect to other radiating elements.

13. A mobile platform comprising:
a conformal antenna comprising:
   a plurality of conformal log periodic radiating elements, each conformal log periodic radiating element being curved to conform to a non-planar surface; and
   a feed array comprising:
      a plurality of phase shifters, each phase shifter associated with a radiating element in the plurality of log periodic radiating elements; and
      a plurality of filters, each filter associated with a radiating element in the plurality of log periodic radiating elements,
wherein:
   each of the plurality of filters operates in an operating frequency corresponding to the associated radiating element to select a desired mode of excitation and suppress undesired modes of excitation;
   a first set of phase shifters, filters, and corresponding conformal log periodic radiating elements are operated with a first sub-channel isolated polarization; and
   a second set of phase shifters, filters, and corresponding conformal log periodic radiating elements are operated with a second sub-channel isolated polarization distinct from the first sub-channel isolated polarization.

14. The mobile platform of claim 13, wherein each of the plurality of filters comprises a bandpass filter.

15. The mobile platform of claim 14, wherein a pass band of each bandpass filter is defined by an operating frequency of the corresponding radiating element.

16. The mobile platform of claim 13, wherein each of the plurality of filters comprises a low-pass filter.

17. The mobile platform of claim 16, wherein a cut off frequency of each low-pass filter is defined by to an operating frequency of the corresponding radiating element.

18. The mobile platform of claim 16, wherein the low-pass filters taper an amplitude of a signal from the corresponding radiating element according to a disposition of the corresponding radiating element with respect to other radiating elements.

* * * * *